US011363916B2

(12) United States Patent
He

(10) Patent No.: US 11,363,916 B2
(45) Date of Patent: Jun. 21, 2022

(54) AUTOMATIC KITCHEN SYSTEM

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 658 days.

(21) Appl. No.: 16/180,051

(22) Filed: Nov. 5, 2018

(65) Prior Publication Data
US 2019/0069722 A1 Mar. 7, 2019

Related U.S. Application Data

(63) Continuation-in-part of application No. 15/921,908, filed on Mar. 15, 2018, which is a
(Continued)

(51) Int. Cl.
A47J 37/12 (2006.01)
A47J 27/14 (2006.01)
(Continued)

(52) U.S. Cl.
CPC .......... *A47J 37/1228* (2013.01); *A47J 27/14* (2013.01); *A47J 36/00* (2013.01); *A47J 36/321* (2018.08);
(Continued)

(58) Field of Classification Search
CPC .......... A47J 27/14; A47J 36/00; A47J 36/321; A47J 37/1228; A47J 44/02; A47J 47/01;
(Continued)

(56) References Cited

U.S. PATENT DOCUMENTS 4,229,136 A * 10/1980 Panissidi .............. B25J 19/0012
414/673

2016/0059412 A1 * 3/2016 Oleynik ............... B62D 57/032
700/257

* cited by examiner

Primary Examiner — Ibrahime A Abraham
Assistant Examiner — Joe E Mills, Jr.

(57) ABSTRACT

The present application discloses an automated kitchen system comprising a first computer and a plurality of second computers which are connected so that the first computer may communicate with any of the second computers. The automated kitchen system also comprises: a plurality of ingredient containers each configured to contain or store food ingredients; caps configured to close on the ingredient containers; a storage apparatus comprising compartments each configured to store a plurality of ingredient containers and refrigeration mechanism configured to cool the food or food ingredients in the containers of the storage apparatus; transport boxes each configured to contain capped ingredient containers; a transportation apparatus configured to move the transport boxes wherein the transportation apparatus comprises motors and sensors; a cap opening apparatus configured to remove a cap from a capped container wherein the cap opening apparatus comprises motors and sensors; a first transfer apparatus configured to move a capped ingredient container from a transport box to the storage apparatus, and also configured to move a capped ingredient container to a location on the cap opening apparatus, wherein the first transfer apparatus comprises motors and sensors; a cyclic transport apparatus comprising a cycle of container holders each configured to hold an ingredient container; a transfer apparatus configured to move an ingredient container from the location of cap opening apparatus to a position on a container holder of the cyclic transport apparatus wherein the second transfer apparatus comprises motors and sensors; and a plurality of cooking systems. Each cooking system comprises a cooking container configured to hold food or food ingredients during a cooking process, a stirring motion mechanism configured to produce a motion in the cooking container as to stir, mix or distribute food or food ingredients held in the cooking container, wherein the stirring motion comprising motors, sensors, and a stove; a cyclic transport apparatus comprising a cycle of container holders each configured to hold an ingredient container; an unloading (Continued)

apparatus configured to unload food ingredients from an ingredient. The above mechanisms and apparatuses comprise electrical or electronic devices and sensors, which are configured to be connected to the second computers. The first computer is configured to store various sub-programs and other lists that are useful to control the electric or electronic devices in the mechanisms, apparatuses or systems in the kitchen system.

27 Claims, 49 Drawing Sheets

Related U.S. Application Data continuation-in-part of application No. 15/798,357, filed on Oct. 30, 2017, now Pat. No. 11,096,514.

(60) Provisional application No. 62/597,096, filed on Dec. 11, 2017, provisional application No. 62/480,334, filed on Mar. 31, 2017, provisional application No. 62/466,294, filed on Mar. 2, 2017, provisional application No. 62/422,022, filed on Nov. 14, 2016.

(51) Int. Cl.
| | |
|---|---|
| *A47J 36/00* | (2006.01) |
| *A47J 44/02* | (2006.01) |
| *G07F 17/00* | (2006.01) |
| *B25J 15/08* | (2006.01) |
| *F16H 55/17* | (2006.01) |
| *F16H 55/26* | (2006.01) |
| *A47J 47/01* | (2006.01) |
| *B25J 15/00* | (2006.01) |
| *A47J 36/32* | (2006.01) |
| *G07F 13/06* | (2006.01) |
| *B25J 15/02* | (2006.01) |

(52) U.S. Cl.
CPC ............... *A47J 44/02* (2013.01); *A47J 47/01* (2013.01); *B25J 15/0057* (2013.01); *B25J 15/0226* (2013.01); *B25J 15/086* (2013.01); *F16H 55/17* (2013.01); *F16H 55/26* (2013.01); *G07F 13/06* (2013.01); *G07F 17/0078* (2013.01)

(58) Field of Classification Search
CPC .. B25J 15/0057; B25J 15/0226; B25J 15/086; G07F 13/06; G07F 17/0078
See application file for complete search history.

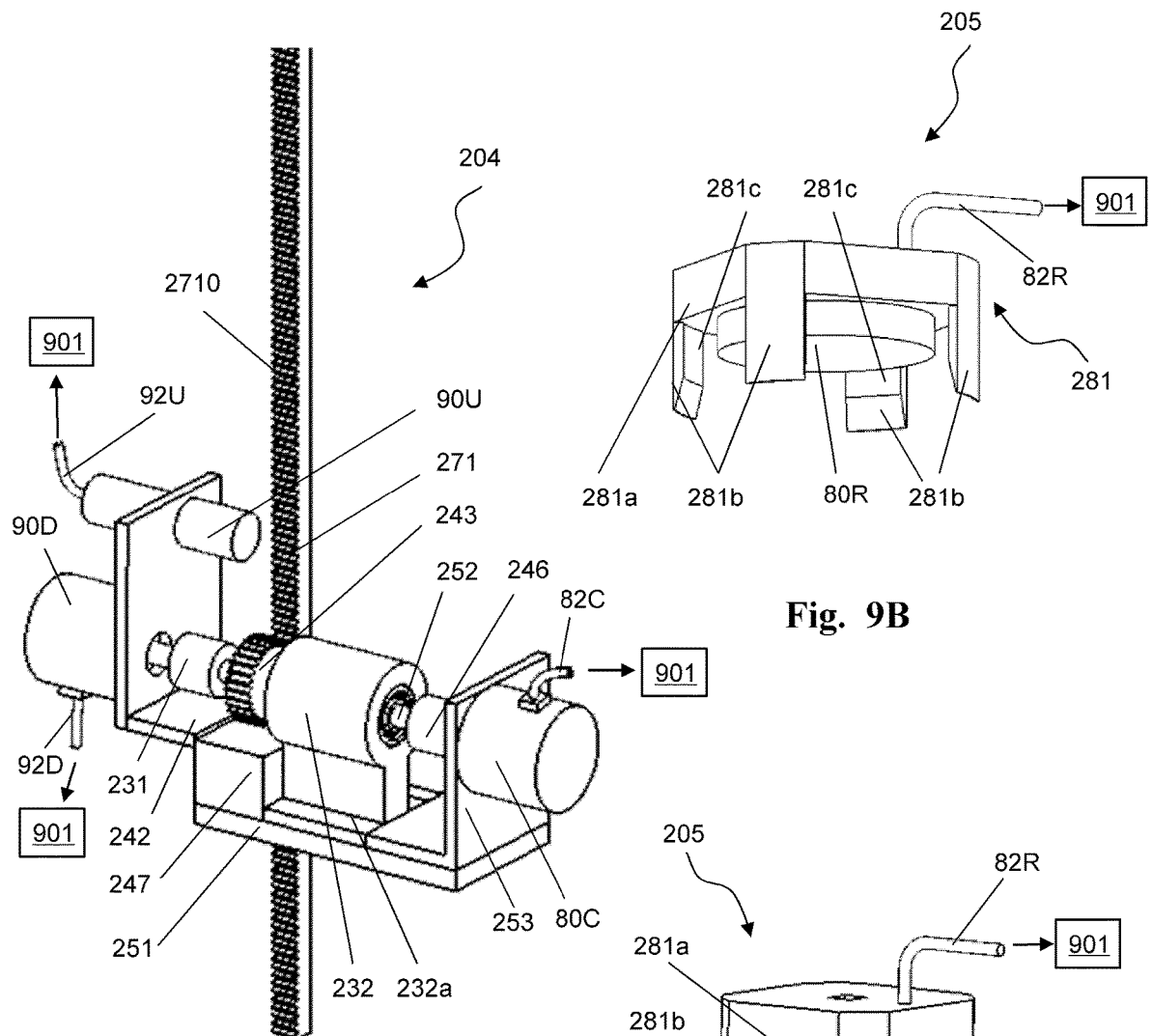
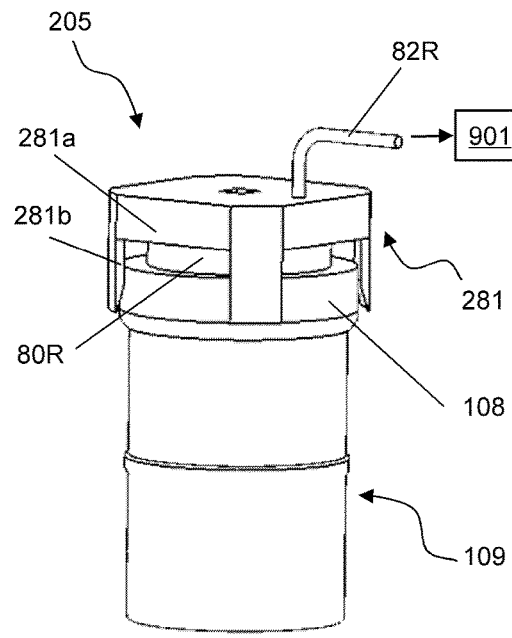
Fig. 9A
Fig. 9B
Fig. 9C

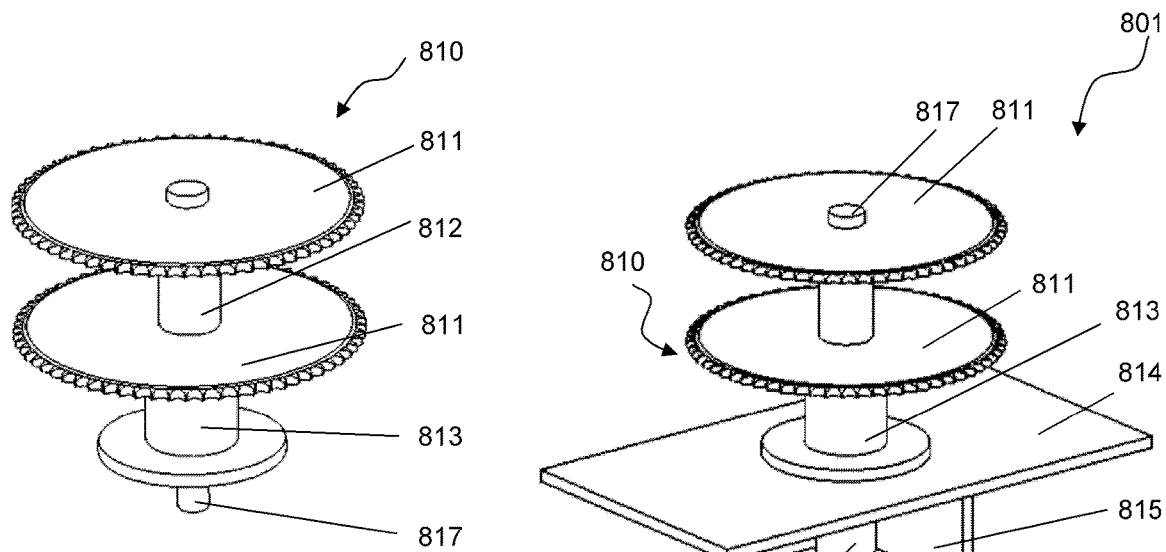
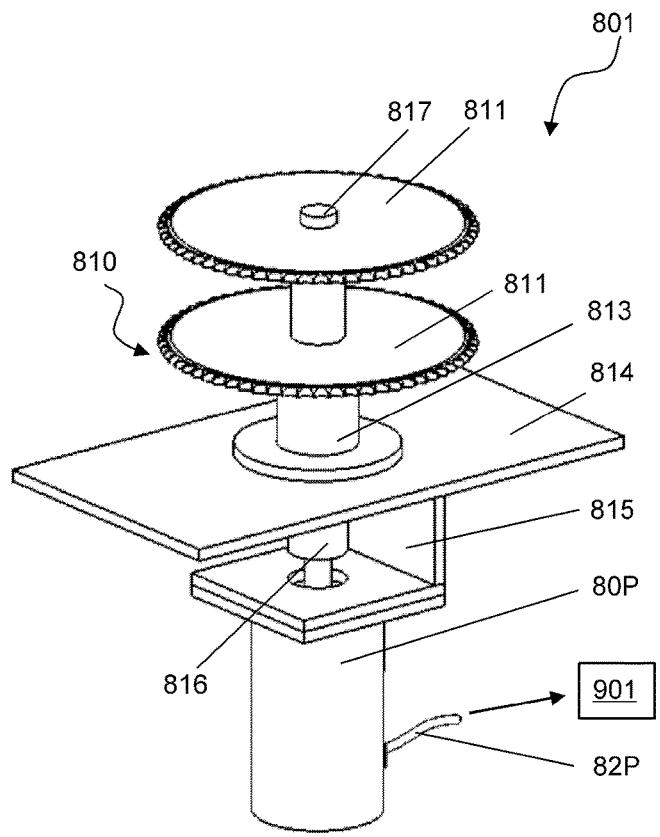
Fig. 25A
Fig. 25B
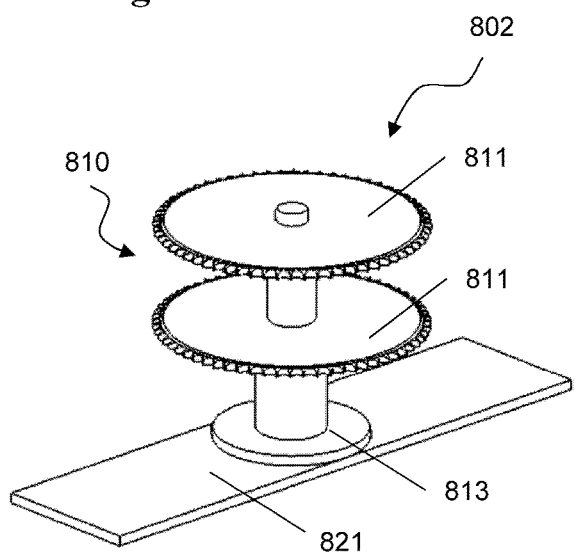
Fig. 25C
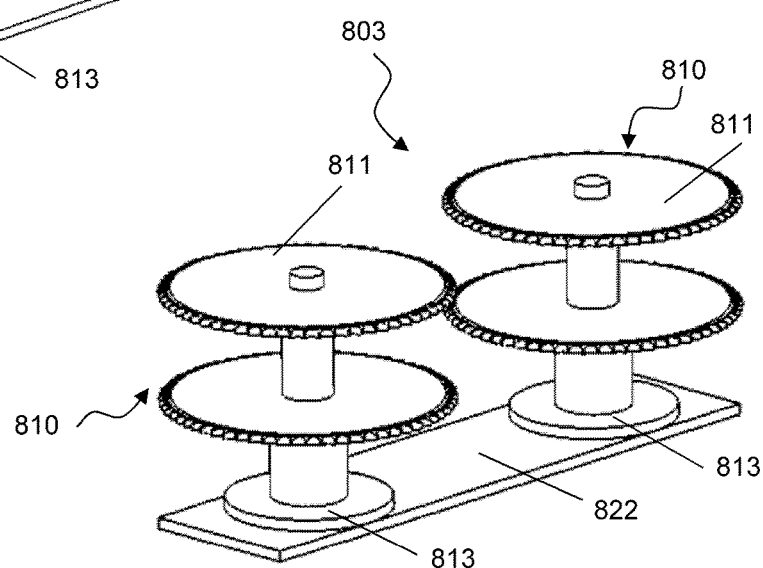
Fig. 25D

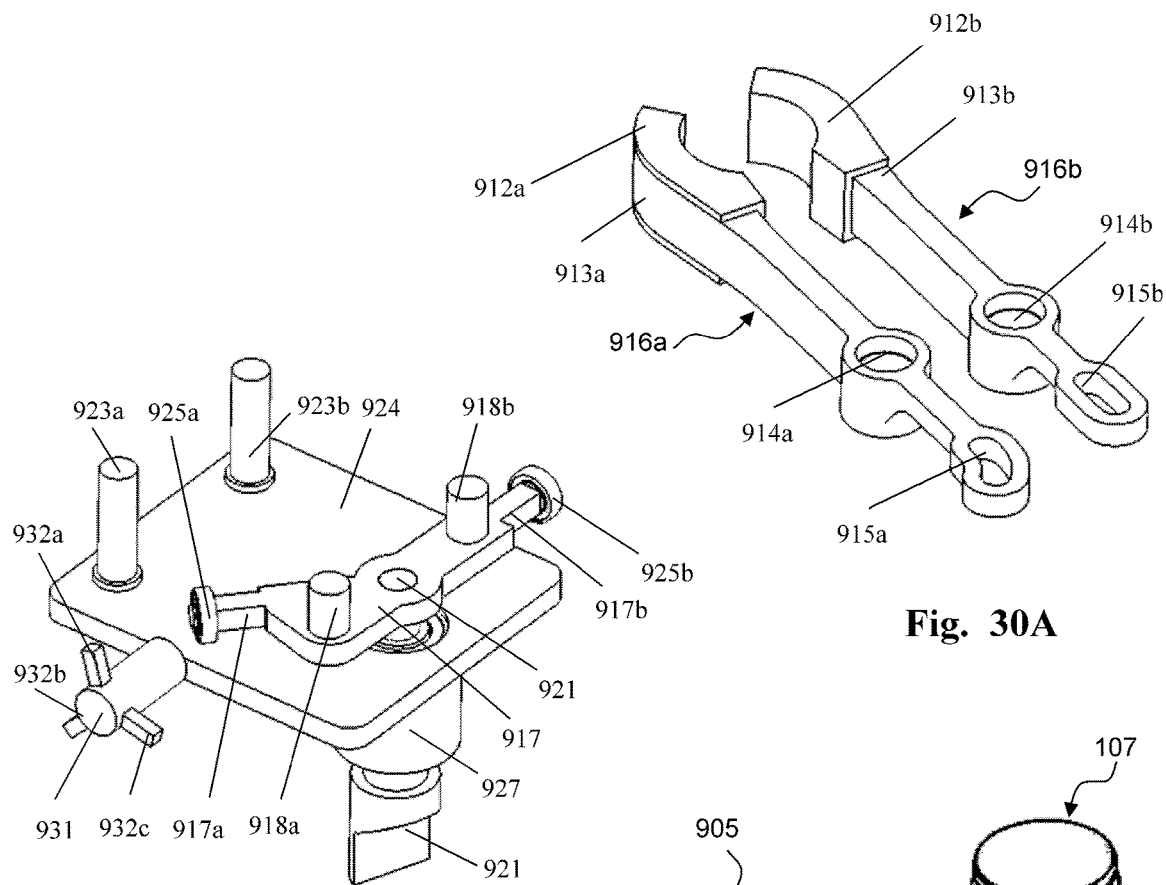
Fig. 30A
Fig. 30B
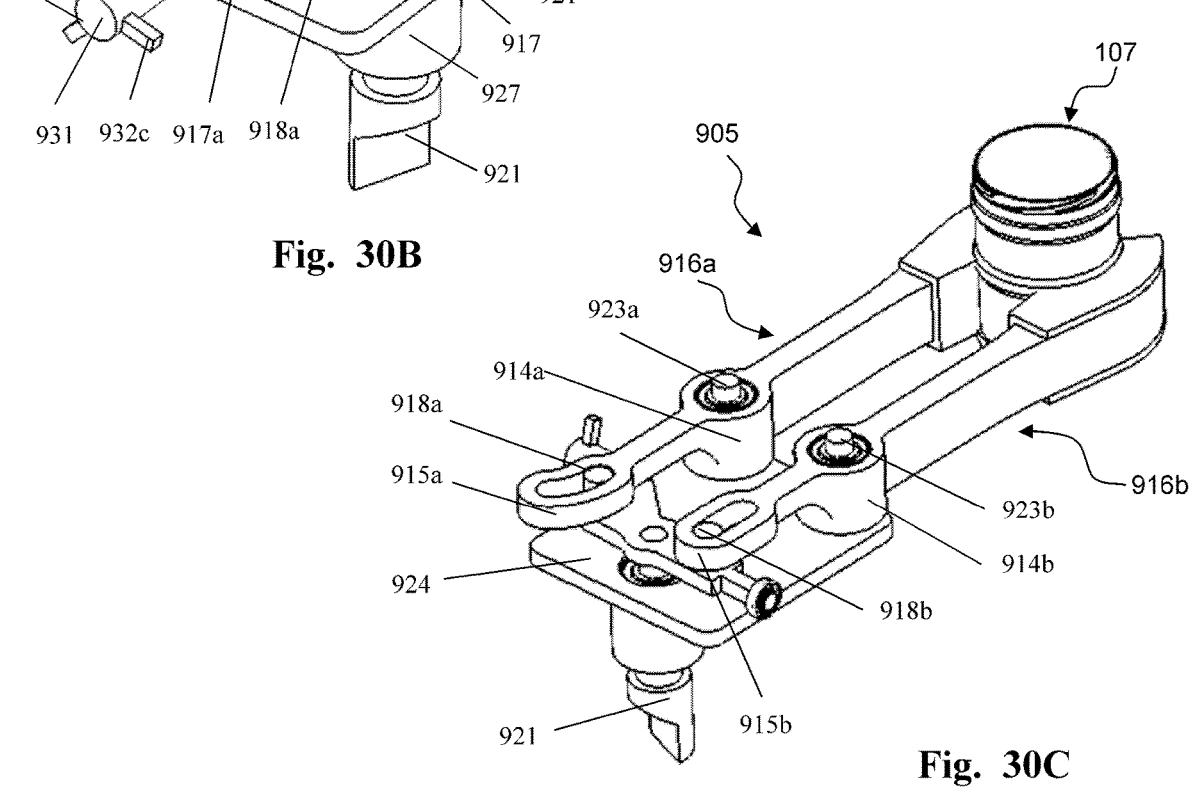
Fig. 30C

| Store sub-programs in each computer 902, wherein each sub-program is configured to control some motor(s) and/or other electric or electronic devices connected to the computer 902. Install a database in computer 901. Store the IDs of the cooking systems and IDs of second computers 902 in the computer 901. 760 |
|---|

↓

| Store a "list of container content types" in the computer 901. Store a menu, which is a list of foods which can be cooked by a cooking system, in the computer 901. 761 |
|---|

↓

| For each food in the menu and each cooking system, store a recipe comprising: (1) a "list of cooking sub-programs, second computer ID and relative timings," where each sub-program controls the timing and functions of some motor(s) and/or other electric or electronic device(s) in the cooking system; and (2) a "list of container content types, numbers and timings." 762 |
|---|

↓

| Store in the computer the information of the structure of the storage apparatuses 192 and 192b, including a list of positions for storing containers of food ingredients. Also store the information of the positions of the cyclic transport apparatuses 800 in all cooking systems. 763 |
|---|

↓

| For each position of the container in the storage apparatus 192 or 192b, and for each position of the cyclic transport apparatus 800, and for each cooking system (600 or 600x), the computer 901 stores a " list of transfer and cap-opening sub-programs, second computer ID and relative timings" for controlling some motors and/or other electric and electronic devices in the container transfer apparatuses 340 and 340b, cap opening apparatuses 360, the transfer apparatuses 703, 703a, 703x and 703b, for the purpose that a container in the said position in the storage apparatus 192 or 192b is transferred out, uncapped, then transferred to a container holder in the transfer apparatus 800 in the said position, and then, assuming the cooperation of the transfer apparatus 800 which is moved by a certain number of steps, transferred to a position on the cyclic transport apparatus 650 of the said cooking system. 764 |
|---|

↓

| For each transport box 193 or 193b, create a "transport box content information" which include the information of the containers of ingredients in the transport box, including information of the bar code or QR code of the container, and the type of food ingredients contained in the container. Store the "transport box content information" of the transport boxes in the first computer 901. 765 |
|---|

↓

| When a transport box 193 or 193b is placed in the unloading position next to the storage apparatus 192 or respectively 192b, the transfer apparatus 340 or 340b moves each container in the transport box to a position in the storage apparatus, and the QR code or barcode on the container is decoded. The computer 901 matches the code with the container in the "transport box content information," and add the container's information to a "list of ingredient containers in storage." 766 |
|---|

Figure 38

Dynamically store the information on the time dependent positions of all cyclic transport apparatuses 800 and 650 in the database of the computer 901. 770

When an inquiry is made for a food on the menu, the computer is configured to read the "list of ingredient container types and numbers and timings" of the cooked food, and determine if there are enough containers of each type in the "list of containers in storage." If yes, then allow an order for the cooked food. If not, then do not allow an order for the cooked food. 771

For each food ordered in Step 711, the computer 901 is configured to determine the positions of the needed containers and then remove these containers from the "list of containers in storage." 772

Following Step 772, for the food ordered, schedule the following: (1) the cooking of the ordered food at a cooking system; (2) for each container of food ingredient that is needed for cooking the ordered food, the position of the container in the storage apparatus 192, and the position of the container holder to hold the container on the cyclic transport apparatus 800 of the "next available cooking system" as scheduled in Part (1); (3) intermittent motions of the cyclic transport apparatuses 800 and 650. 773

Following Step 773, for the food ordered, add the following to the "list of instructions" on the computer system 901: (1) the "list of cooking sub-programs, second computer IDs and relative timings" with relative timings substituted by real timings per the schedule in Step 773; (2) the " list of transfer and cap-opening sub-programs, second computer IDs and relative timings" with relative timings substituted by real timings as scheduled in Step 773. (3) sub-programs at second computers, the second computers' IDs, and timings, configured to produce the intermittent motions of the cyclic transport apparatuses 800, 650, 703a and703x as scheduled in Step 773. 774

Let the computer system 901 send the sub-programs and the timings in "list of instructions" to the second computers 902 of the ID specified in the said list, and the second computers 902 store these in their memories. The computers 902 are configured to dynamically run these sub-programs at the specified timings. 775

Figure 39

AUTOMATIC KITCHEN SYSTEM

This application is a continuation-in-part of the U.S. application Ser. No. 15/921,908 filed Mar. 15, 2018, which was a continuation-in-part of the U.S. application Ser. No. 15/798,357 filed Oct. 30, 2017, which claimed the benefit of U.S. Provisional Applications, Ser. No. 62/422,022 filed Nov. 14, 2016, Ser. No. 62/466,294 filed Mar. 2, 2017 and Ser. No. 62/480,334 filed Mar. 31, 2017. The U.S. application Ser. No. 15/921,908 filed Mar. 15, 2018, claimed the benefit of U.S. Provisional Applications, Ser. No. 62/597,096 filed Dec. 11, 2017. Entire contents of all the above applications are incorporated herein by reference.

CROSS-REFERENCE TO RELATED APPLICATIONS

U.S. Patent Applications

Ser. No. 15/921,908, Filed Mar. 15, 2018; Inventor: Zhengxu He;
Ser. No. 15/798,357, Filed Oct. 30, 2017; Inventor: Zhengxu He;
Ser. No. 15/157,319, Filed May 17, 2016; Inventor: Zhengxu He.

U.S. Provisional Patent Applications

Ser. No. 62/597,096; Filed Dec. 12, 2017, Inventor: Zhengxu He;
Ser. No. 62/422,022; Filed Nov. 14, 2016, Inventor: Zhengxu He;
Ser. No. 62/466,294; Filed Mar. 2, 2017, Inventor: Zhengxu He;
Ser. No. 62/480,334; Filed Mar. 31, 2017, Inventor: Zhengxu He.

BACKGROUND OF THE INVENTION

The present application relates to automatic control techniques for storage, transportation and dispensing of food ingredients into a cooking container of a cooking apparatus, and related automatic control techniques in an automated kitchen.

In the cooking of a dish by an automated cooking apparatus in a kitchen, certain types and amounts of food ingredients need to be dispensed into a cooking container. The preparation or preliminary processing of food ingredients, especially in the case of chained restaurants, may be done at a location which may be different from the kitchen. The food ingredients are then transported to, and stored at, a storage in the kitchen, and at time of cooking, be transferred out from the storage and dispensed into a cooking container.

Traditionally, food ingredients are packaged into plastic bags or other containers. They are easily transported to a storage (often a refrigerator) in a kitchen. Afterwards, these are partially or entirely handled by humans.

Due to cost savings or improvement in food safety, it is desirable to automate the process of transfer and dispensing of the food ingredients from storage to a cooking container. Furthermore, there is a need for an algorithm to control this and related processes.

BRIEF SUMMARY OF THE INVENTION

In the cooking of a food, some food ingredients need to be dispensed into a cooking container. Depending on the recipe, the timing of dispensing may be different for different food ingredients. The food ingredients are often prepared or processed at a processing location and then transported to a storage (often refrigerated) in a kitchen, and then transferred out of the storage and dispensed into a cooking container during cooking. Applying the system and method disclosed in the present patent application, the transfer and dispensing of the food ingredients from the storage to the cooking container are fully automated.

Our automated kitchen system may comprise one or more of the following: a plurality of ingredient containers each configured to contain food ingredients, wherein an ingredient container may be capped by a cap after the ingredient container is loaded with food ingredients; transport boxes configured to contain capped ingredient containers; a transport apparatus configured to move the transport boxes; a storage apparatus comprising a plurality of compartments each configured to store one or more capped ingredient containers; a cap opening apparatus configured to remove the cap of an ingredient container; a transfer apparatus configured to move an ingredient container from a storage apparatus to the cap opening location of a cap opening apparatus; a cyclic transport apparatus comprising a cycle of container holders each configured to position an ingredient container, and a motion mechanism configured to cyclically move the cycle of container holders; wherein the transfer apparatus is configured to move an ingredient container from the cap opening location of a cap opening apparatus to the position on a container holder of the cyclic transport apparatus.

The automated kitchen system may comprise a plurality of cooking systems each comprising one or more of the following: a cooking apparatus comprising a cooking container configured to contain food or food ingredients, and a stirring motion mechanism configured to produce a motion in the cooking container to stir, mix or distribute the food or food ingredients contained in the cooking container during a cooking process; and an unloading apparatus configured to unload the food ingredients from an ingredient container which is located at an "unloading position" into the cooking container; etc.

Each apparatus or mechanism of the automated kitchen system may comprise: (1) electrical or electronic devices including but not limited to: motors, refrigeration mechanisms, shut-off valves; inductive or other types of stoves, vacuum generators, etc.; and (2) sensors including but not limited to: encoders, pressure sensors, locational sensors, infrared sensors, temperature sensors or other sensors.

The automated kitchen system also comprises a control center. The control center comprises a server and a plurality of computers, wherein each computer comprises a plurality of input/output ports. An input/output port of a computer may be connected to a motor, or a refrigeration mechanism, or stoves, or a vacuum generator, etc., of the kitchen system. An input/output port of a computer may be connected to an encoder, or a pressure sensor, or a locational sensor, or an infrared sensor, or a temperature sensor etc. The control center is configured to process the data sent by the sensors, and then send signals to control the motors, or refrigeration mechanisms, or stoves, or vacuum generator, etc., of the kitchen system as to control the respectively mechanisms or apparatus of the kitchen system to complete progresses. The control center also store menu of various types of recipe. The control center may control the kitchen system to complete a dish in accordance with a corresponding recipe of the menu.

The automated cooking system may also comprise a first computer (e.g. a server or a workstation) and a plurality of second computers (e.g., microcontrollers or PLCs), wherein each second computer is configured to be connected to the first computer, so that the second computer may communicate with the first computer. Each second computer comprises a plurality of i/o ports, wherein the i/o ports are configured to be connected to the electrical or electronic devices and sensors, so that the second computer may send electrical or electronic signals to the electrical or electronic devices and may receive electrical or electronic signals from the sensors.

Depending on the type of the electrical or electronic device, the connection between a second computer and an electrical or electronic device may comprise a wire, a wireless communication device, a controller, a driver, a relay, a breaker, a contractor, and/or a switch. These components may be housed in an electrical cabinet.

In another general aspect, the present invention relates to an algorithm which may control the electrical or electronic devices via the computers.

These and other aspects, their implementations and other features are described in detail in the drawings, the description and the claims.

BRIEF DESCRIPTION OF THE SEVERAL VIEWS OF THE DRAWINGS

FIG. 9A shows an aerial view of a vertical motion mechanism. FIG. 9B shows an aerial view of a container gripping mechanism. FIG. 9C shows an aerial view of the container gripping mechanism which grips a capped container.

FIG. 25A shows an aerial view of a chain wheel sub-mechanism. FIG. 25B shows an aerial view of a chain driving mechanism which comprising the chain wheel sub-mechanism FIG. 25C shows an aerial view of a chain wheel sub-mechanism. FIG. 25D shows an aerial view of a chain wheel sub-mechanism.

FIG. 30A shows aerial views of two gripping devices. FIG. 30B shows an aerial view of parts of a container gripping mechanism. FIG. 30C shows an aerial view of the container gripping mechanism.

FIG. 38 is a flow chart showing the procedures of the computer system in preparation of receiving an order for cooked food, in accordance with the present invention.

FIG. 39 is a flow chart showing the procedures of the computer system for controlling the cooking of a cooked food, after a food is ordered.

DETAILED DESCRIPTION OF THE INVENTION

For the present patent application, a shaft always comprises an axis. A shaft can have different shapes at different sections. A sectional shape of a shaft can be round or rectangular, or of another shape. For the present patent application, a rotational movement refers to a rotational movement around an axis.

For the purpose of the present patent application, a motor comprises a powered mechanism configured to produce a relative motion. A motor may be of different types depending on power source, e.g., electric, hydraulic, pneumatic. In our application, a motor always includes an electronic device which may be connected to a computer, and the computer may then be configured to control a motor, e.g. to control the timing, direction and speed of the motion.

In some applications, a motor comprises a base component (e.g., a frame) which is a stationary member of the motor, and a shaft which is a moving member of the motor, so that the powered mechanism of the motor can produce a rotation of the shaft relative to the base component around the axis of the shaft. A motor may be connected to a computer via wires, and/or through a driver, and/or a controller and/or a relay and/or a wireless communication device. The base component of a motor may be referred to as the support component of the motor.

Similarly, an encoder may comprise a base component, and a shaft which is rotatable relative to the base component, where the encoder can detect the degree of rotation of the shaft relative to the base component, and then inform a computer of the degree by sending signals to the computer.

Our automated cooking system comprises: a computer system; a plurality of ingredient containers; a storage apparatus; transfer apparatuses; and cooking systems, each comprising cooking apparatus and ingredient dispensing apparatus. These will be described in detail in FIGS. 1A-36, before they are assembled into an automated cooking system in FIG. 37.

Figure 1A:
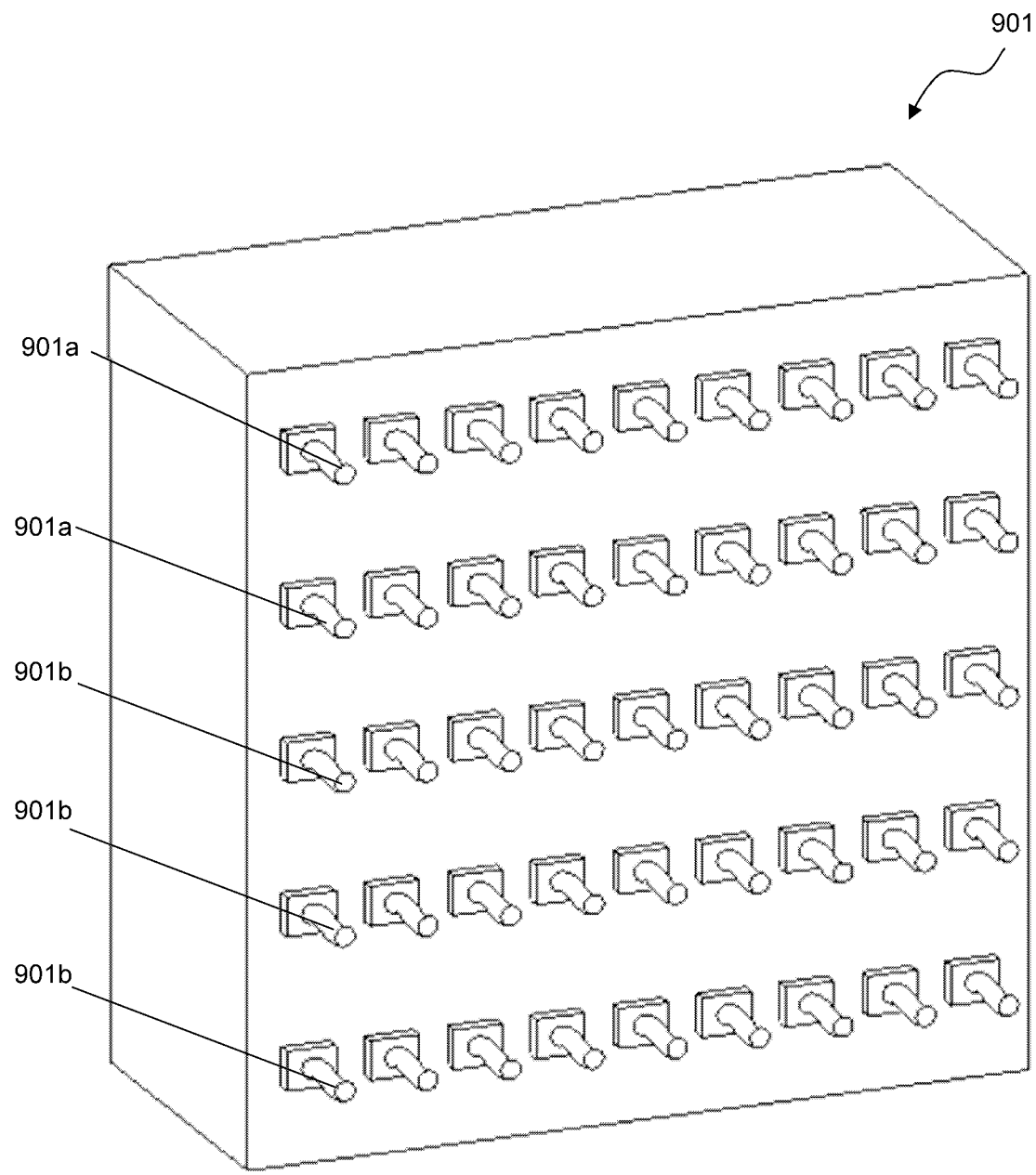
FIG. 1A shows an aerial view of a computer which comprises a plurality of input/output ports.

Referring to FIG. 1A, a computer 901 comprises a plurality of input/output ports 901a and a plurality of input/output ports 901b. The input/output ports 901a of the computer 901 may be connected (either via wires or via wireless communications) to sensors, which can be encoders, pressure sensors, proximity switches, micro switches, infrared sensors, temperature sensors, etc. The input/output ports 901b of the computer 901 may be connected to electrical or electronic devices which can be several types of motors, stoves, refrigeration apparatus, etc. The signals of the sensors may be sent to the computer 901. The computer 901 may control the operations of the electrical or electronic devices by sending signals to the electrical or electronic devices.

Figure 1B:
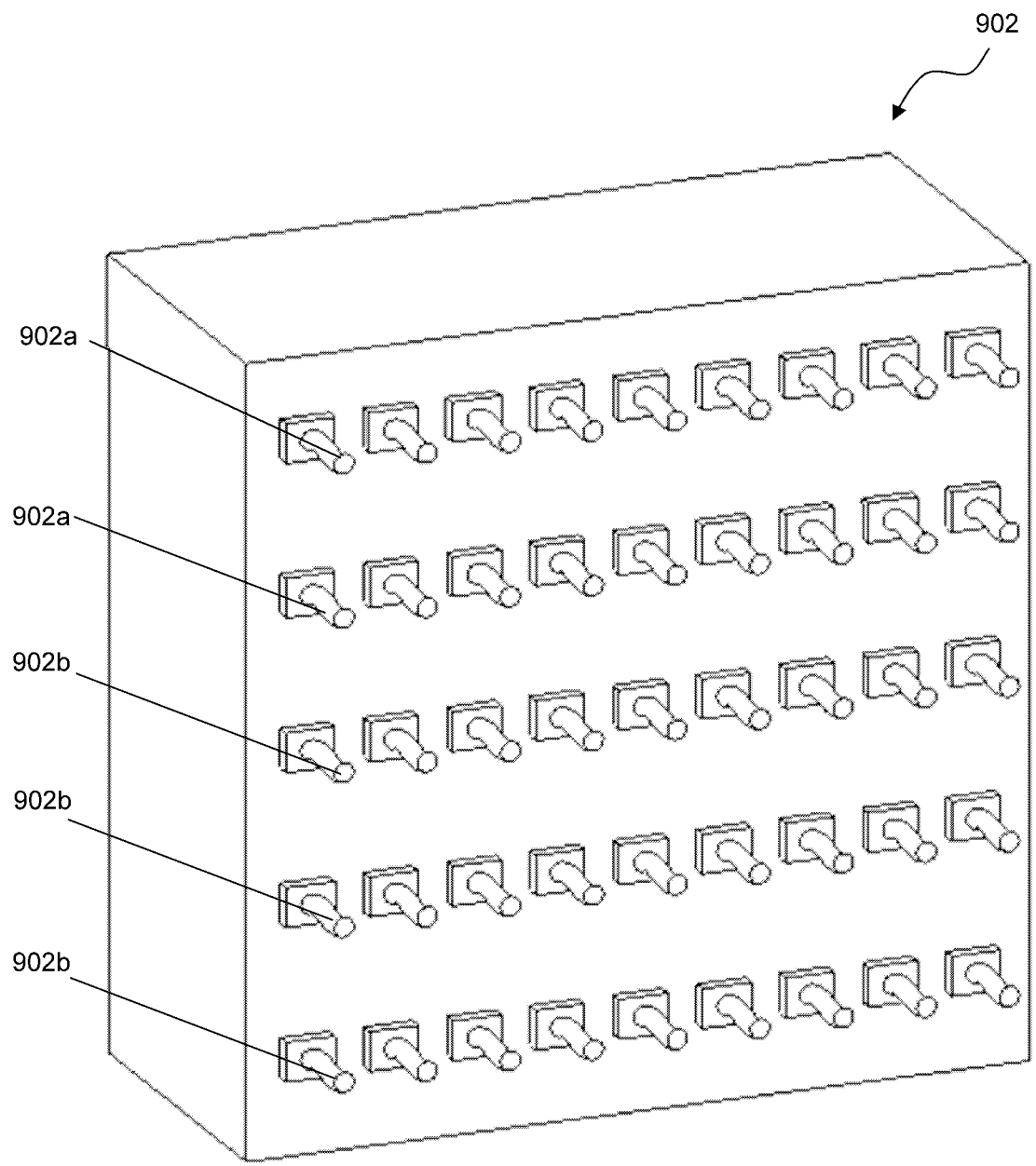
FIG. 1B shows an aerial view of another computer which also comprises a plurality of input/output ports.

Referring to FIG. 1B, a computer 902 also comprises a plurality of input/output ports 902a and a plurality of input/output ports 902b. The input/output ports 902a of the computer 902 may be connected (either via wires or via wireless communications) to sensors, and the input/output ports 902b of the computer 902 may be connected to electrical or electronic devices. The computer 902 may control the operations of the electrical or electronic devices by sending signals to the electrical or electronic devices through the input/output ports of the computer 902. The signals of the sensors may be sent back to the computer 902.

The computer 901 or 902 may comprise a programmable logic controller, or in short, PLC. Alternatively, the computer 901 or 902 may comprise a microcontroller, a circuit board and a plurality of other electronic or electric components.

Figures 1C, 2A, 2B:
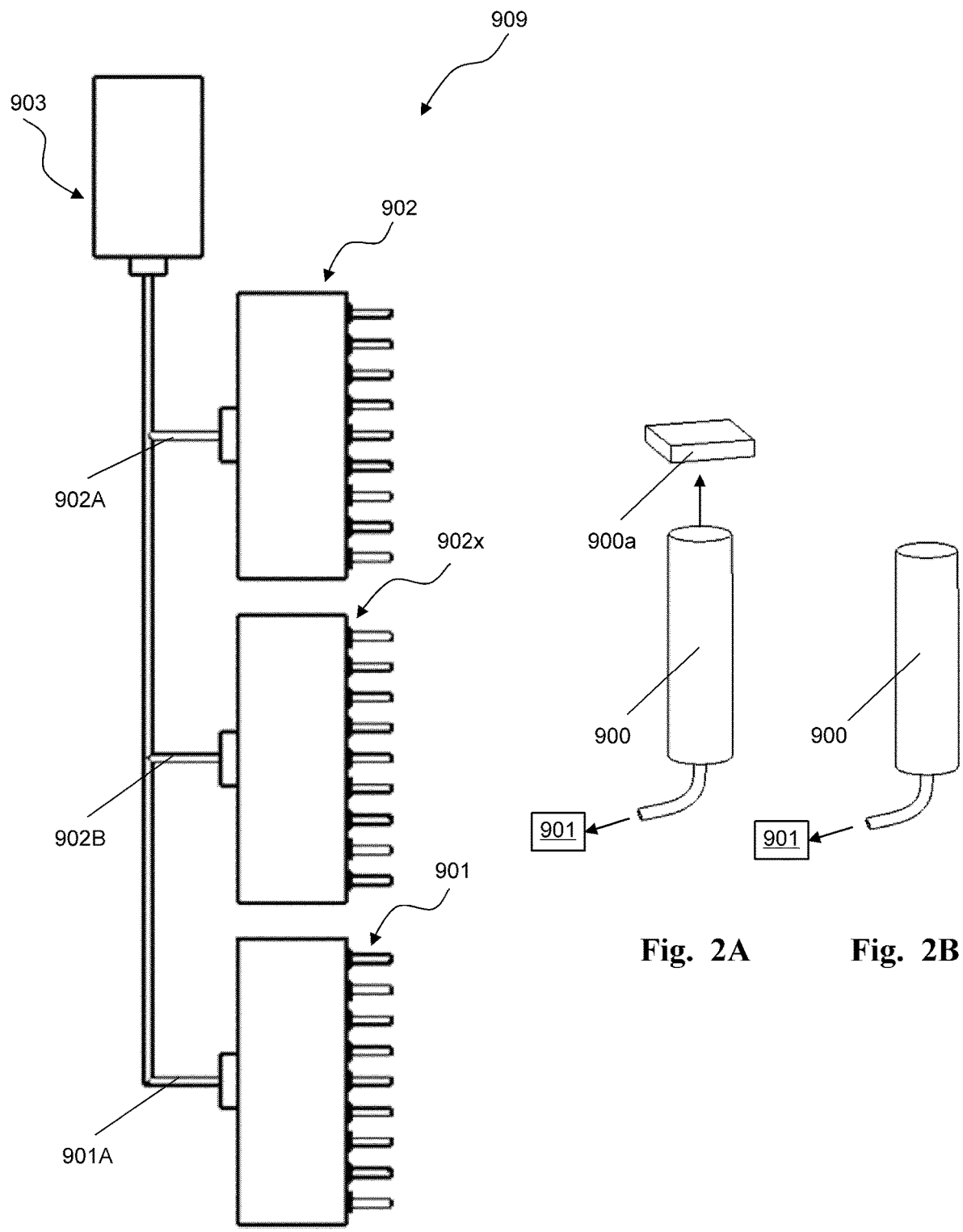
FIG. 1C shows an aerial view of a computer system.
FIG. 2A shows an aerial view of a proximity switch and a target wherein the proximity switch senses the target.
FIG. 2B shows an aerial view of a proximity switch.

Referring to FIG. 1C, a computer system 909 comprises a server 903 as a first computer, and computers 901, 902 and 902x as second computers, wherein the computer 902x is configured identically as the computer 902. The computer 901 can be configured differently than the computer 902. The computers 901, 902 and 902x are connected via wires 901A, 902A and 902B to the server 903, so that digital or analog data may be communicated between the server and any of the computers 901, 902 and 902x.

The server 903 may be referred to as a central computer or an upper computer. The computers 901, 902 and 902x may be referred to as lower computers.

The connection between the server 903 and the computer 901, 902 or 902x may be via RS485 wiring, or RS422 or RS232 wiring, etc., or alternatively, via wireless communications.

The server 903 may be substituted by a PC, or workstation, or other type of computer.

Referring to FIGS. 2A-2B, a proximity switch 900 is configured to sense a target 900a when the target is positioned in a certain range. The proximity switch 900 can be connected (via wires and/or wireless communications) to an input/output port of a computer 901, 902 or 902x. When the proximity switch 900 senses the target 900a, it sends signals to the computer 901, 902 or 902x.

Figure 3A:
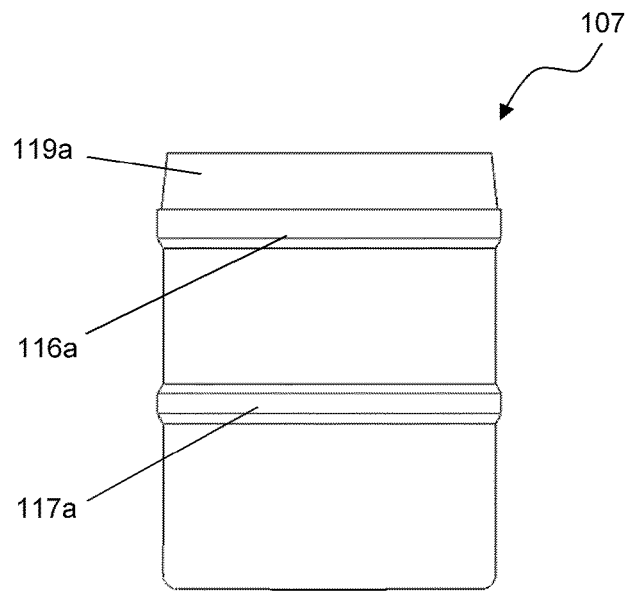
FIG. 3A shows a side view of an ingredient container.
Figure 3B:
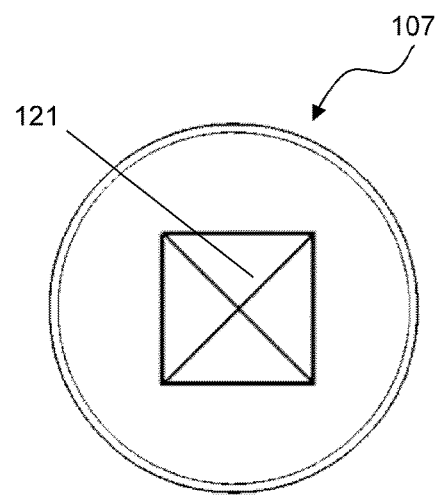
FIG. 3B shows an aerial view of the ingredient container which comprises a QR code.

Referring to FIGS. 3A-3B, an ingredient container 107 comprises ring shaped stiffeners 116a and 117a. The exterior surface of the ingredient container 107 comprises a partial conical surface 119a, some (partial) cylindrical surfaces, etc. The interior surface of the ingredient container 107 is comprised of a cylindrical surface and a flat bottom surface, and the axis of the said cylindrical surface is referred to as the axis of the ingredient container 107. The aperture of the partial conical surface 119a is configured to be relatively small, usually not exceeding 12 degrees; although the limit of 12 degrees is not a strict requirement. The ingredient container 107 is configured to store food ingredients in its interior. The ingredient container 107 also comprises a QR code 121 printed on the bottom surface, at the center, wherein the bottom surface is partially flat. The QR code 121 of each ingredient container 107 is unique.

It should be noted that the partial conical surface 119a of the ingredient container 107 is a rotationally symmetric surface in the sense that the surface is invariant under any rotation around the axis of the cone which contains the partial conical surface 119a. The axis of the cone is referred to as the axis of the rotationally symmetric surface.

Figure 3C:
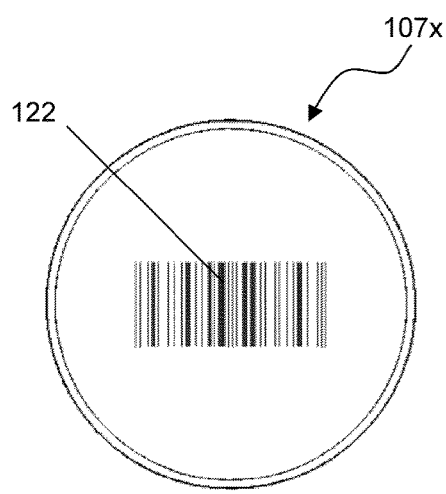
FIG. 3C shows an aerial view of the ingredient container which comprises a barcode.

Referring to FIG. 3C, the ingredient container 107 may be substituted by an ingredient container 107x which is identically configured as the ingredient container 107 except that the QR code 121 is substituted by a barcode 122. The barcode 122 of each ingredient container 107x is unique.

The QR code 121 or barcode 122 of an ingredient container 107 or respectively 107x can be decoded using a device such as camera or scanner.

Figure 3D:
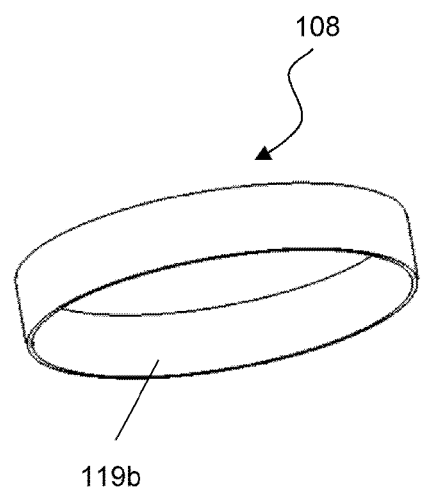
FIG. 3D shows an aerial view of a cap.
Figure 3E:
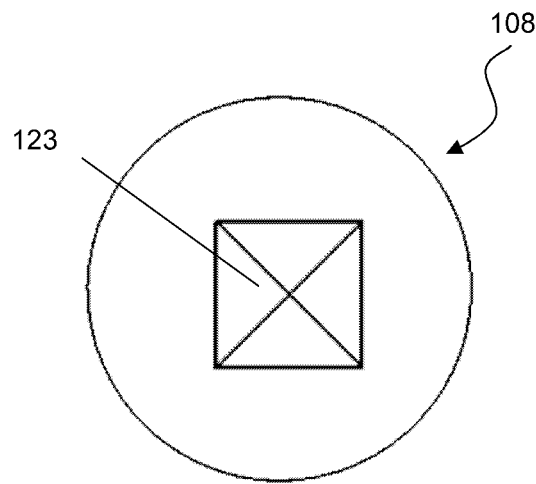
FIG. 3E shows an aerial view of the cap which comprises a QR code.

Referring to FIGS. 3D-3E, a cap 108 comprises an internal surface 119b of a partial conical surface which is configured to be similar as the partial conical surface 119a of the ingredient container 107. The exterior surface of the cap 108 is configured to be a part of a cylindrical surface, and the axis of the cylindrical surface is referred to as the axis of the cap 108. The cap 108 also comprises a QR code 123 printed on the top surface which is flat. The QR code of each cap 108 is unique.

Figure 3F:
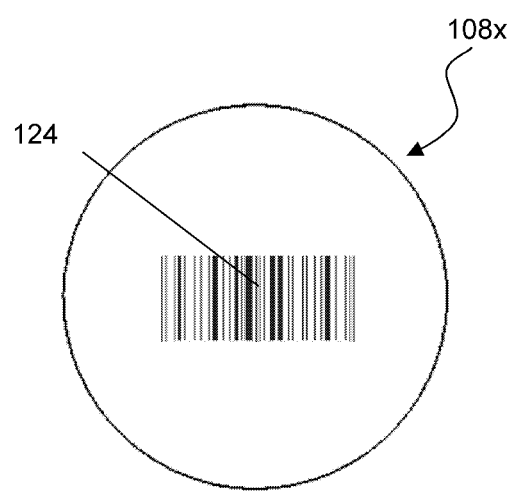
FIG. 3F shows an aerial view of the cap which comprises a barcode.

Referring to FIG. 3F, the cap 108 may be substituted by a cap 108x which is identically configured to the cap 108 except that the QR code 123 is substituted by a barcode 124. The barcode 124 of a cap 108x is unique. The QR code 123 or barcode 124 of a cap 108 or respectively 108x can be decoded using a camera or a scanner.

Figure 4:
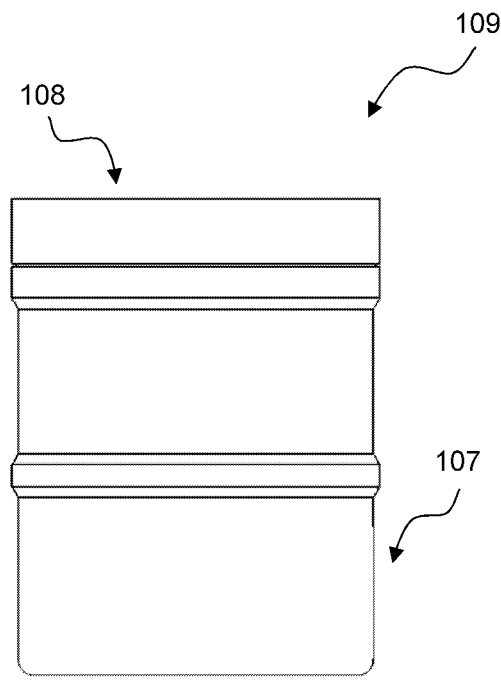
FIG. 4 shows a side view of a capped ingredient container.

Referring to FIG. 4, a capped ingredient container 109 comprises an ingredient container 107 and a cap 108 which is configured to close on the ingredient container 107 when the surface 119b of the cap 108 touches and presses on the surface 119a of the ingredient container 107. The axis of the cap 108 is configured to coincide with the axis of the ingredient container 107. The partial conical surface 119b is configured to touch the partial conical surface 119a so that the air flow between the interior of the ingredient container 107 and the outside is restricted. Thus, the ingredient container 107 can be capped by the cap 108 to seal the interior of the ingredient container 107, wherein the interior may contain food ingredients. The aperture of the partial conical surface 119b may be configured to be the same or nearly the same as the aperture of the partial conical surface 119a. (The aperture of a part of a conical surface refers to the aperture of the conical surface.) The axis of the ingredient container 107 is also referred to as the axis of the capped ingredient container 109. Due to the pressure of the surface 119b on the surface 119a in the capped ingredient container 109, the cap 108 caps on the ingredient container 107 tightly, and a proper force is needed to remove the cap 108 from the ingredient container 107 of the capped ingredient container 109.

It should be noted that the ingredient container 107 comprises a rotationally symmetric surface, and the cap 108 comprises a rotationally symmetric surface, wherein the rotationally symmetric surface of the cap 108 and the rotationally symmetric surface of the ingredient container 107 are configured to be pressed onto each other when the ingredient container 107 is capped by the cap 108.

The ingredient container 107 and the cap 108 in the capped ingredient container 109 do not comprise any helical threads. The cap 108 can be removed from the ingredient container 107 by moving the cap linearly away from the ingredient container 107, in the linear direction which is parallel to the axis of the ingredient container 107. An ingredient container 107 can be capped by a cap 108 by moving the cap linearly towards the ingredient container 107, in the linear direction which is parallel to the axis of the ingredient container 107.

The ingredient container 107 may be configured to be rotationally invariant around the axis of the ingredient container 107, i.e., the ingredient container 107 looks the same if the container is rotated around the axis by any degree. The cap 108 on the capped ingredient container 109 is configured to be rotationally invariant around the axis of the capped ingredient container 109.

The interior surfaces of the ingredient containers 107 discussed above may be textured or rugged. The ingredient containers 107 may be made from metal, plastics (e.g., PC, PP, Teflon, etc.), or other solid material. The interior surfaces of the ingredient container 107 may be coated with polytetrafluoroethylene or other non-stick coating.

At times, an ingredient container may be referred to as a container; and a capped ingredient container may be referred to as a capped container. An ingredient container without a cap may also be referred to as uncapped ingredient container, or uncapped container.

Figure 5:
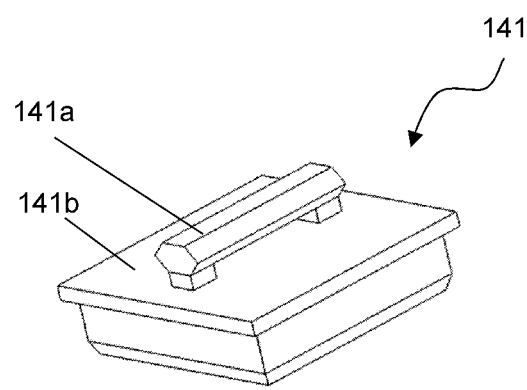
FIG. 5 shows an aerial view of an insulation cover.

Referring to FIG. 5, an insulation cover 141 comprises a handle 141a and a lid 141b which are joined together. It should be noted that the lid 141b may comprise heat insulation material and/or materials such as plastics, metals, etc.

Figure 6A:
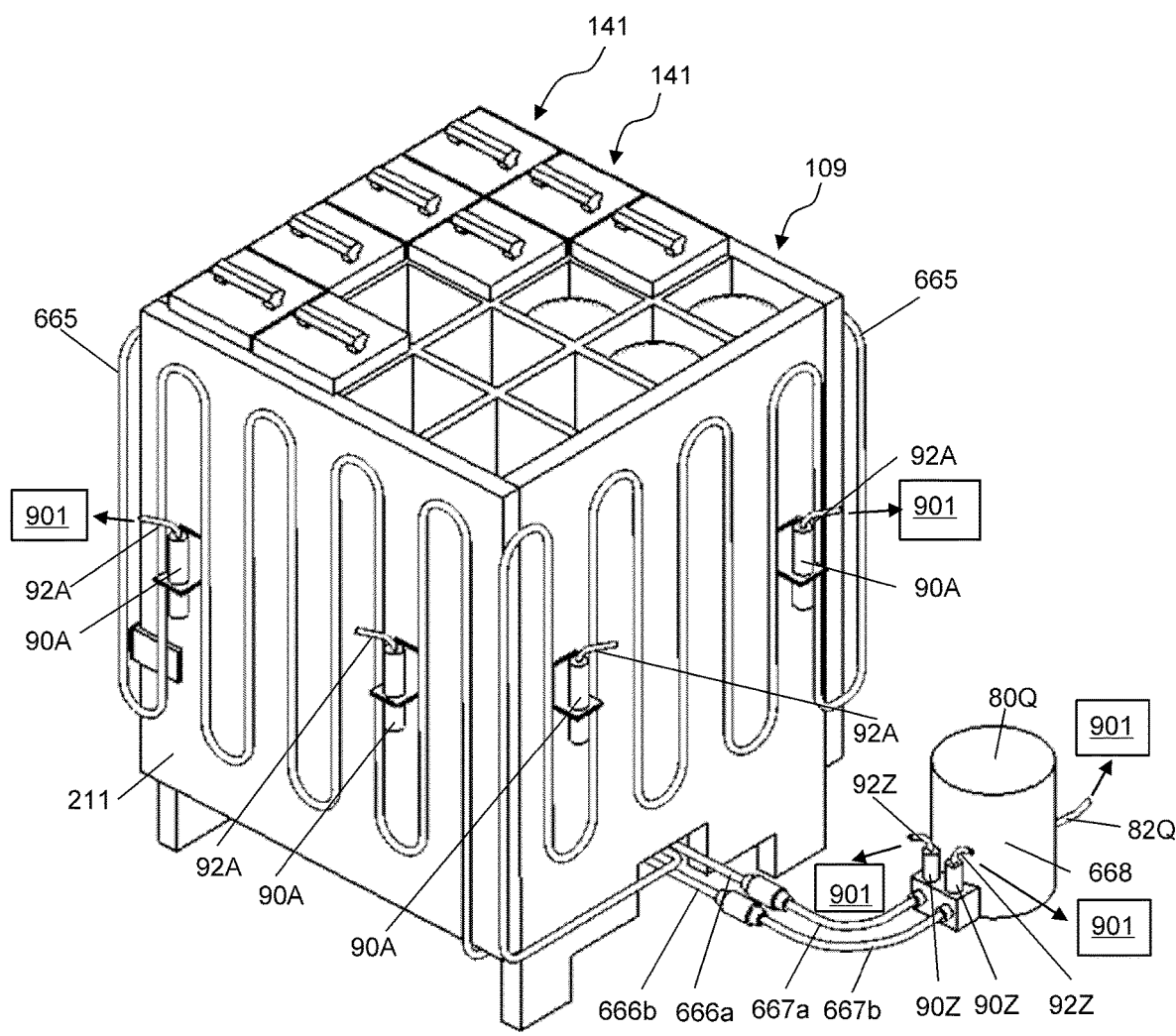
FIG. 6A shows an aerial view of parts of a storage apparatus.
Figure 6B:
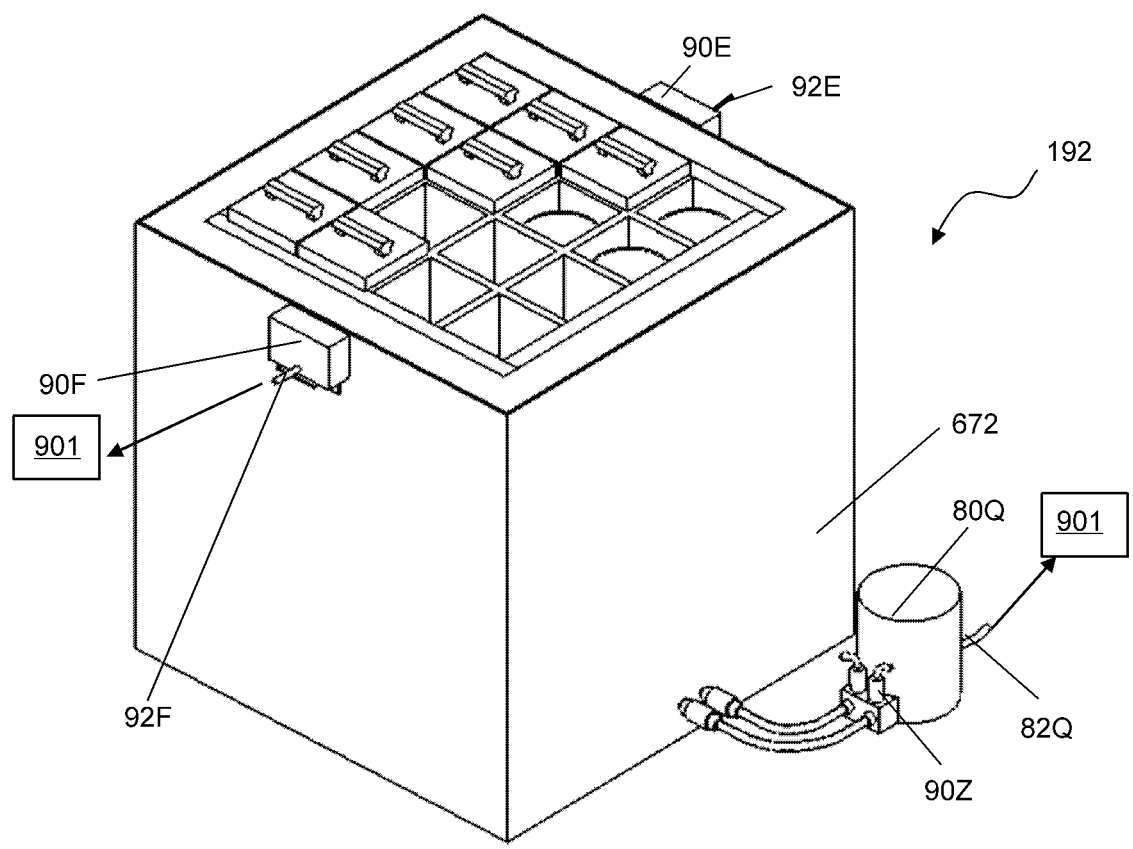
FIG. 6B shows an aerial view of the storage apparatus.

Referring to FIGS. 6A-6B, a storage apparatus 192 comprises a storage box 211 comprising a plurality of compartments arranged in a rectangular or squared grid, wherein each compartment is configured to store a plurality of capped containers 109 wherein the capped containers 109 are stacked vertically in the compartment. The storage apparatus 192 also comprises a plurality of insulation covers 141 each of which is configured to cover or seal the opening (at the top) of a compartment in the storage box 211. Each insulation cover 141 is configured to help limit heat flow between the inside of the corresponding compartment and the outside.

The storage apparatus 192 also comprises a refrigeration mechanism comprising: a coil pipe 665; pipe connectors 666a and 666b; and a sub-mechanism 80Q. The coil pipe 665 is configured to be fixedly connected to the bottom of the storage box 211 by a plurality of accessories (not shown in figure). The sub-mechanism 80Q comprises a pair of pipes 667a and 667b, i.e. one outlet and one inlet. The pipe connector 666a is configured to connect one of the end of the coil pipe 665 to the pipe 667a; and the pipe connector 666b is configured to connect the other end of the coil pipe 665 to the pipe 667b. The sub-mechanism 80Q may pump in refrigerating fluid into the coil pipe 665 through the pipe connector 666a and the pipe 667a, and then the refrigerating fluid may flow from the coil pipe 665 through the pipe connector 666b and the pipe 667b. The refrigerating fluid is configured to flow in the cyclic and airtight system to refrigerate the areas around the storage box 211. The sub-mechanism 80Q is configured to cool the fluid as the fluid flows into the sub-mechanism 80Q. The sub-mechanism 80Q may be water cooled or air cooled. The sub-mechanism 80Q may comprise a compressor, a pipe, a motor, a cooling panel or cooling board, a fan, etc., as in a domestic or commercial refrigerator.

The storage apparatus 192 also comprises a plurality of temperature sensors 90A which are fixedly attached to the exterior or respectively the bottom of the storage box 211 to detect the temperature at a plurality of locations of the storage apparatus 192. As shown in FIG. 6A, the sub-mechanism 80Q is connected to the computer 901 via a wire 82Q (FIG. 6B). The computer 901 is configured to dynamically control the timing and/or power of the sub-mechanism 80Q. The temperature sensors 90A are also connected to the computer 901 by wires 92A, so the computer 901 may receive signals from the temperature sensors 90A (FIGS. 6A-6B). The computer 901 may also send signals to the sub-mechanism 80Q to control the sub-mechanism 80Q. When the computer 901 receives the signals from the temperature sensors 90A and they show that the temperature of the storage box 211 is beyond (or below) the designed temperature range, the computer 901 may control the sub-mechanism 80Q to increase (or respectively reduce) the power (or working time) to keep the temperature in the designed range. Thus, under the control of the computer 901, the temperature of the storage box 211 and the capped containers 109 in it can be kept within a certain range to keep the food ingredients of the ingredient containers stored in the storage apparatus 192 fresh.

The storage apparatus 192 also comprises a heat insulation member 672 configured to help limit heat flow between the storage box 211 and the outside. The heat insulation member 672 is also in the shape of a box.

The storage apparatus 192 also comprises cameras 90E and 90F both of which are fixedly connected to a side of the heat insulation member 672 via accessories. As shown in FIG. 6B, the cameras 90E and 90F are connected to the computer 901 by wires 92E and respectively 92F, so the computer 901 may receive signals from the cameras 90E and 90F. When a capped container 109 or 109x is being moved to the storage box 211 of the storage apparatus 192, it can pass through a position above the camera 90F so that the camera 90F can take an image of the QR code 121 or barcode 122 of the container 107, and then send the image to the computer 901 to decode the code. When a capped container 109 or 109x is being moved away from the storage box 211, the capped container 109 passes through a position above the camera 90E, so that the cameras 90E may take an image of the QR code 121 or bar cade 122 of the container 107, and then send the image to the computer 901 to decode the code. The QR code or barcode information of the capped container 109, which is either moved in or moved out from the storage apparatus 192, is recorded by the computer 901. The QR code or barcode on each container is configured to be unique. So, the identities of the containers can be recorded by the computer 901.

It should be noted that the camera 90E or 90F may be substituted by a device, such as a scanner, configured to take an image of the QR code or barcode on the container and to have the complete information on the image or a-processed information on the image sent to the computer 901 to decode the QR code or barcode; wherein a-processed information on the image can be the code. The said device may include a microcomputer capable of analyzing the image.

The sub-mechanism 80Q of the refrigeration mechanism also comprises one or more temperature sensors 90Z, and a heat insulation member 668, wherein the temperature sensors 90Z are configured to detect the temperature of the refrigerating fluid in the sub-mechanism 80Q; wherein the temperature sensors 90Z are configured to be connected to the computer 901 by wires 92Z; wherein the heat insulation member 668 is configured to help limit heat flow in the sub-mechanism 80Q and the outside.

It should be noted that the coil pipe 665, the temperature sensors 90A, and the storage box 211 are in the interior of the heat insulation member 672.

It should also be noted that the storage box 211 may be made from metal such as aluminum or steal, or from plastic, or other durable material.

Figure 7A:
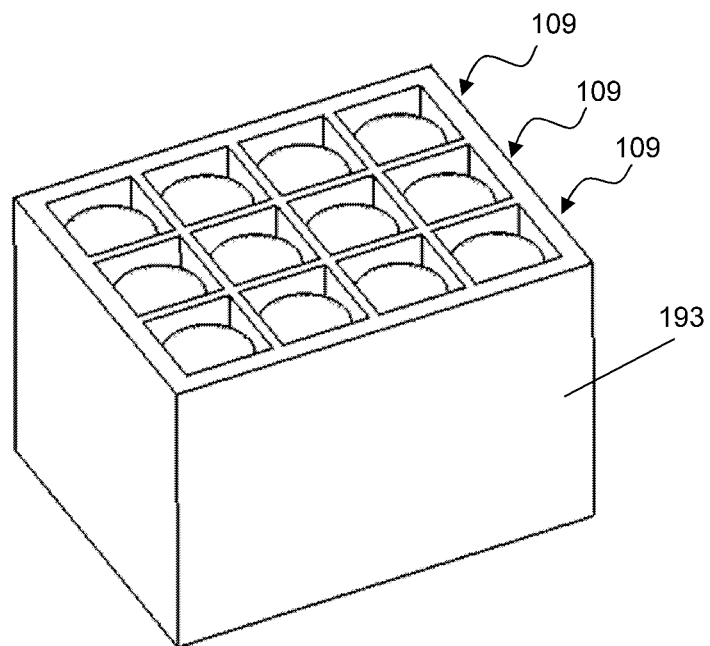
FIG. 7A shows an aerial view of a transport box.

Referring to FIG. 7A, a transport box 193 comprises a plurality of compartments arranged in a square or rectangular grid, wherein each compartment is configured to store a plurality of capped containers 109 where the capped containers 109 are stacked vertically in the compartment. Each compartment has a square shape if viewed from above. In fact, the inside of each compartment has the shape of a square cylinder.

Figure 7B:
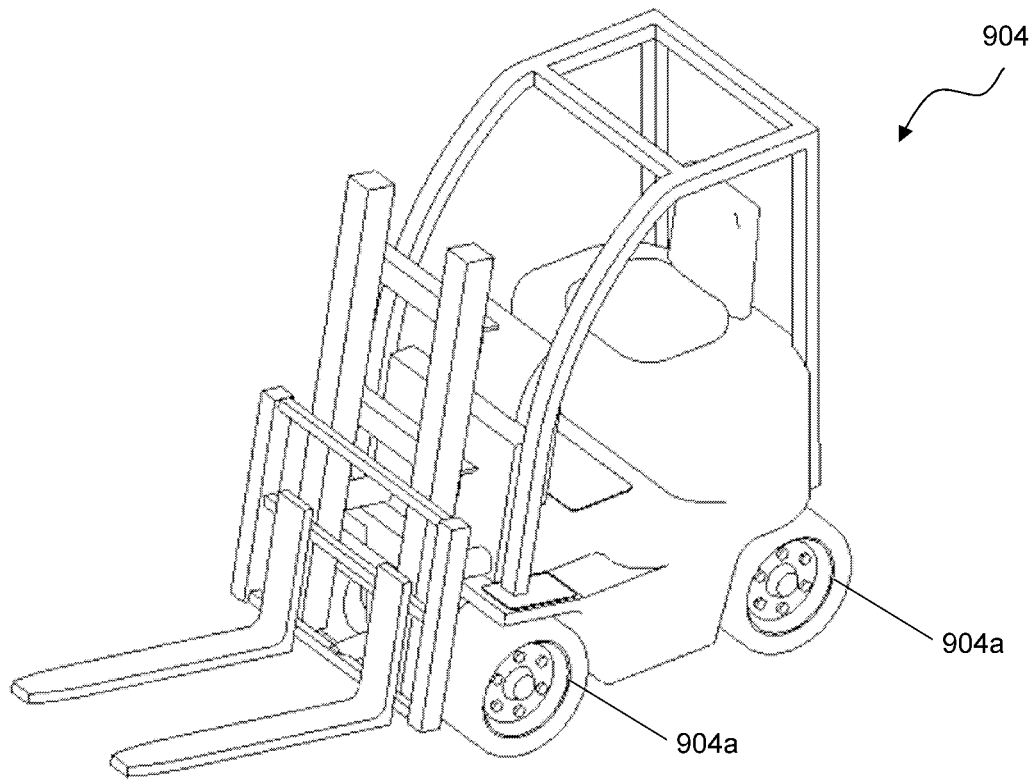
FIG. 7B shows an aerial view of a forklift.

Referring to FIG. 7B, a forklift 904 comprises a vertical lifting mechanism wherein the vertical lifting mechanism comprises a support component; wherein the vertical lifting mechanism is configured to vertically move a transport box 193 relative to the support component; wherein the transport box 193 may hold a plurality of capped container 109. The forklift 904 also comprises a mini-vehicle comprising a plurality of wheels 904a and a motorized mechanism configured to rotate some or all the wheels.

Figure 8A:
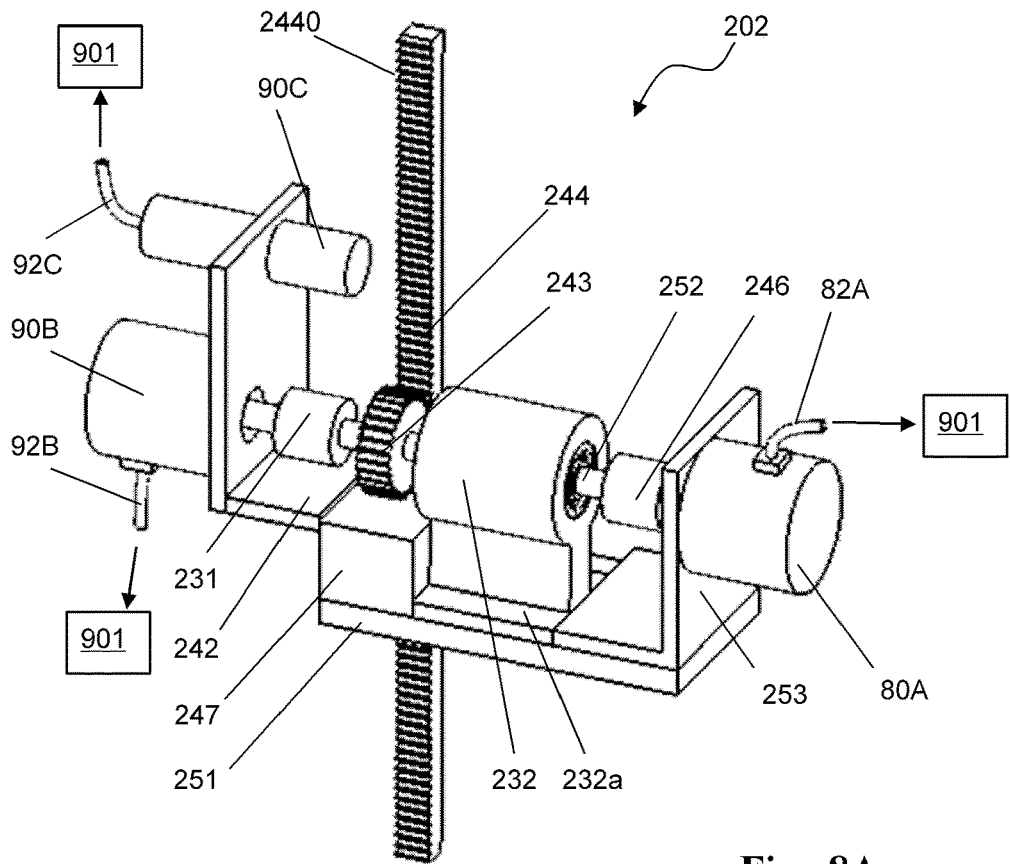
FIG. 8A shows an aerial view of a vertical motion mechanism

Referring to FIG. 8A, a vertical motion mechanism 202 comprises a support component 251 in the shape of a board, a shaft 252 comprising a horizontal axis, a bearing housing 232 comprising a base component 232a as a support component, a sliding device 247 which is rigidly connected to the support component 251, a rack 244 configured to be positioned vertically, and a gear 243. The base component 232a of bearing housing 232 is configured to be fixedly or rigidly connected to the support component 251. The gear 243 is configured to be fixedly connected to the shaft 252 and the axis of the gear 243 is the same as the axis of the shaft 252. The shaft 252 is configured to be constrained to rotate relative to the bearing housing 232 (or equivalently, relative to the support component 251) around the axis of the shaft 252, hence the gear 243 is constrained to rotate relative to the bearing housing 232 around the axis of the shaft 252. The rack 244 is configured to slide relative to the sliding device 247 (or equivalently, relative to the support component 251) along a vertical axis. The gear 243 is engaged with the rack 244. Thus, when the gear 243 is rotated, the rack 244 is moved linearly relative to the sliding device 247 (or equivalently, relative to the support component 251) along a vertical axis.

The vertical motion mechanism 202 also comprises a motor 80A comprising a shaft and a base component, a connecting component 253 configured to connect the base component of the motor 80A to the support component 251, and a coupling 246. The shaft 252 is fixedly connected to the shaft of the motor 80A via the coupling 246. When the motor 80A rotates, the shaft 252 is rotated around the axis of the shaft 252 relative to the support component 251, and hence the gear 243 is rotated around the axis of the shaft 252 relative to the support component 251. As explained before, the gear 243 is engaged with the rack 244, so that the rack 244 is moved linearly relative to the support component 251.

The vertical motion mechanism 202 also comprises an encoder 90B comprising a base component and a shaft, a connecting component 242 configured to rigidly connect the base component of the encoder 90B to the support component 251, a coupling 231, and a proximity switch 90C with a horizontal axis. The shaft of the encoder 90B is fixedly connected to the shaft 252 via the coupling 231. Thus, the shaft of the encoder 90B is rotated with the shaft 252. In other words, the encoder 90B may detect the degree of rotation of the shaft 252 (or equivalently, the degree of rotation of the shaft of the motor 80A). As shown in FIG. 8A, the motor 80A is connected to the computer 901 via wires 82A. The computer 901 is configured to dynamically control the timing and/or speed of the motor 80A. The encoder 90B is also connected to the computer 901 via wires 92B, so the computer 901 may receive signals from the encoder 90B as to be informed of the degree of rotation of the shaft of the motor 80A. The computer 901 may also send signals to the motor 80A to control the degree of rotation of the motor 80A. Furthermore, the degree of rotation of the gear 243 (or the shaft of the motor 80A) can be converted into the sliding distance of the rack 244 relative to the support component 251. Thus, the computer 901 may accurately control the sliding distance of the rack 244 relative to the support component 251. The proximity switch 90C is configured to be fixedly connected to the connecting component 242 wherein the proximity switch 90C senses a part 2440 of the rack 244; wherein the said part 2440 of the rack 244 is referred to as a target. As shown in FIG. 8A, the proximity switch 90C is connected to the computer 901 via wires 92C, so the computer 901 may receive signals from the proximity switch 90C. When the rack 244 is slid by the motor 80A to a position where the part 2440 is out of the sensing range of the proximity switch 90C, the signals are sent to the computer 901. The computer 901 then sends signals to the motor 80A to stop the rotation of the shaft of the motor 80A or to make the shaft of the motor 80A undergo a reverse rotation of a certain angle. Using the information sent by the proximity switch 90C and the encoder 90B, the computer 901 may accurately control the motion of the rack 244.

The support component 251 is referred to as the support component of the vertical motion mechanism 202.

Figure 8B:
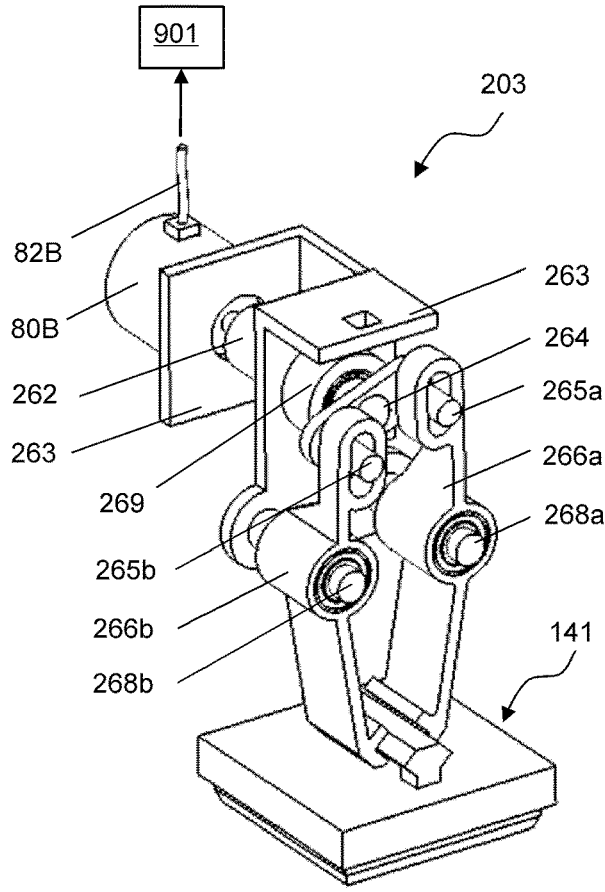
FIG. 8B shows an aerial view of a cover gripping mechanism.

Referring to FIG. 8B, a cover gripping mechanism 203 comprises a support component 263, rotatable components 266a and 266b, a pair of shafts 268a and 268b, and a pair of shafts 265a and 265b. Each of the rotatable components 266a and 266b comprises a bearing housing in the middle, and a curved hole and a V-shaped gripper at the ends. The rotatable component 266a (or 266b) is constrained to rotate relative to the shaft 268a (or respectively 268b) around the axis of the shaft 268a (or respectively 268b). The shafts 268a and 268b are configured to be rigidly connected to the support component 263. The cover gripping mechanism 203 further comprises a shaft 264, a motor 80B comprising a shaft and a base component, a coupling 262 and a bearing housing 269. The shafts 265a and 265b are configured to be rigidly connected to the shaft 264 via a rigid connector; and the axes of the shafts 265a, 265b, 264 are mutually parallel. The bearing housing 269 is configured to be rigidly connected to the support component 263. The shaft 264 is configured to be constrained to rotate relative to the bearing housing 269, around the axis of the shaft 264. The base component of the motor 80B is fixedly connected to the support component 263. The shaft of the motor 80B is fixedly connected to the shaft 264 by the coupling 262, so that the motor 80B may rotate the shaft 264 around the axis of the shaft 264. The curved hole in the rotatable component 266a is configured to be constrained the shaft 265a, so that a movement of (the axis of) the shaft 265a may induce a rotation in the rotatable component 266a around the axis of the shaft 268a. Similarly, the curved hole in the rotatable component 266b is configured to be constrained the shaft 265b, so that a movement of (the axis of) the shaft 265b may induce a rotation in the rotatable component 266b around the axis of the shaft 268b. The motor 80B may drive the rotation of the shaft 264 and hence the shafts 265a and 265b are rotated relative to support component 263 around the axis of the shaft 264, and hence the rotatable components 266a and 266b are rotated relative to the support component 263 around the corresponding axis. As shown in FIG. 8B, the motor 80B is connected to the computer 901 via wires 82B. The computer 901 is configured to send signals to the motor 80B as to dynamically control the timing and/or speed of the motor 80B, Thus, under the control of the computer 901, the rotatable components 266a and 266b can rotate around the axis of the shaft 268a or 268b to accurately grip or release the handle 141a of an insulation cover 141 (see FIG. 8B). It should be noted that the motor 80B may be a stepper motor or a servo motor.

Figure 8C:
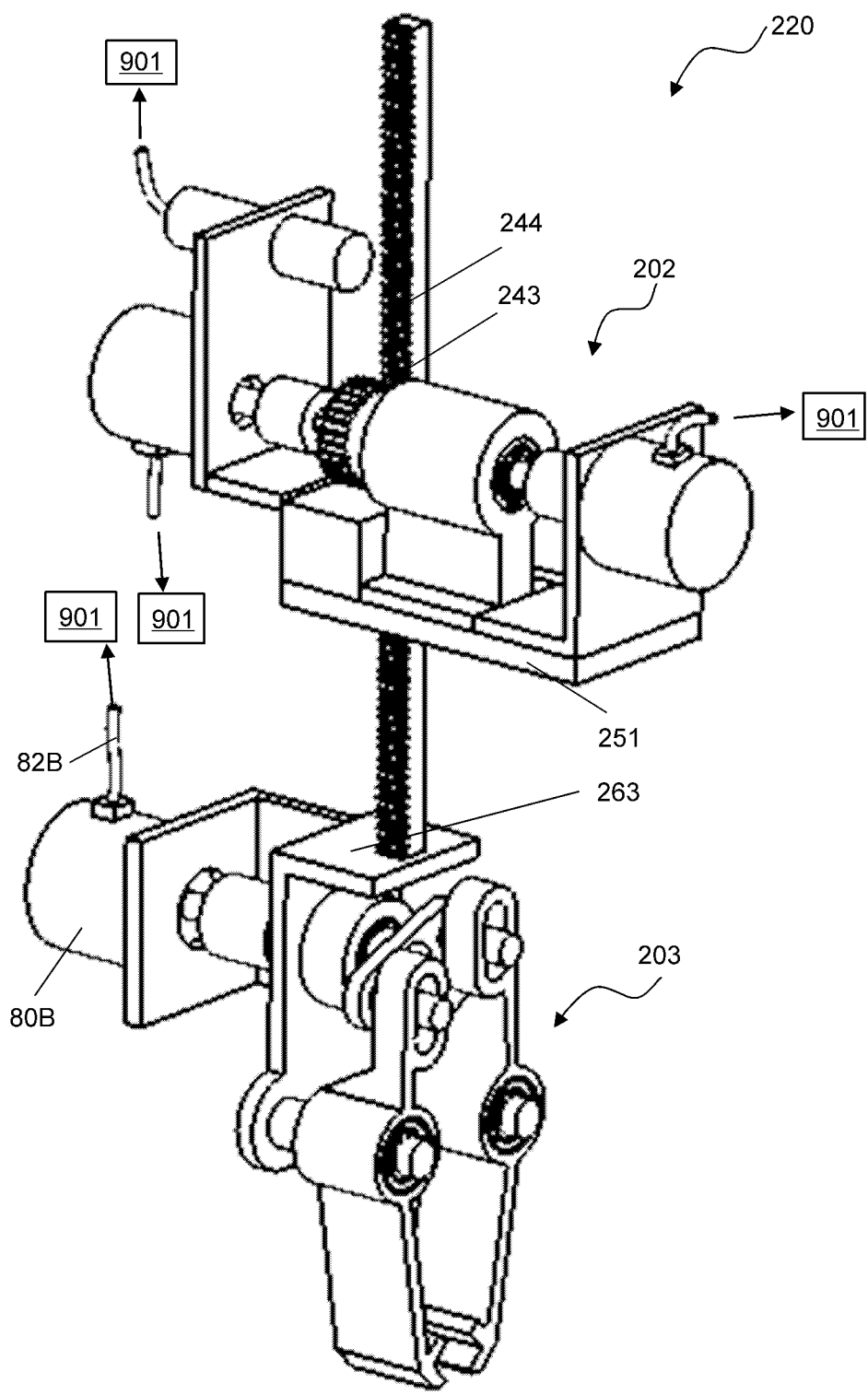
FIG. 8C shows an aerial view of a cover lifting mechanism which comprises the vertical motion mechanism and the cover gripping mechanism.

Referring to FIG. 8C, a cover lifting mechanism 220 comprises the vertical motion mechanism 202 and the cover gripping mechanism 203, wherein the lower end of the rack 244 of the vertical motion mechanism 202 is configured to be fixedly connected to the support component 263 of the cover gripping mechanism 203, wherein the axes of the shafts 268a, 268b, 264, 265a, 265b are configured to be horizontal. As explained before, the rack 244 is configured to be positioned vertically. Thus, the cover gripping mechanism 203 moves up and down in the vertical direction, when the rack 244 is moved up or down, relative to the support component 251 of the vertical motion mechanism 202. As explained before, the computer 901 may accurately control the sliding distance of the rack 244 relative to the support component 251. Thus, the sliding distance of the support component 263 (or equivalently, the cover gripping mechanism 203) relative to the support component 251 of the vertical motion mechanism 202 is accurately controlled by the computer 901. Thus, under the control of the computer 901, the cover gripping mechanism 203 of the cover lifting mechanism 220 can slide to a special position inside a squared compartment (of a storage box 211 in the storage apparatus 192) to grip an insulation cover 141 and then lift it up. Again, under the control of the computer 901, the cover gripping mechanism 203 of the cover lifting mechanism 220 can move down and then release the insulation cover 141 to cover a compartment of the storage box 211. The support component 251 of the vertical motion mechanism 202 is referred to as the base component of the cover lifting mechanism 220.

Referring to FIG. 9A, a vertical motion mechanism 204 is constructed the same way as the vertical motion mechanism 202 except that the rack 244 is substituted by a rack 271 which is longer than the rack 244. Indeed, the vertical motion mechanism 204 comprises a rack 271 comprising a part 2710, a gear 243, a sliding device 247, a support component 251, a motor 80C comprising a shaft and a base component, a coupling 246, an encoder 90D comprising a shaft and a base component, a proximity switch 90U and their mutual connections, if any. The support component 251 is referred to as the base component of the vertical motion mechanism 204. When the motor 80C rotates, the rack 271 is moved linearly in a vertical direction, relative to the support component 251. The proximity switch 90U is configured to sense the part 2710 of the rack 271. The encoder 90D is configured to detect the degree of rotation of the shaft 252 (or equivalently, the degree of rotation of the gear 243). As shown in FIG. 9A, the motor 80C is connected to the computer 901 via wires 82C. The computer 901 is configured to dynamically control the timing and/or speed of the motor 80C. The proximity switch 90U and the encoder 90D are also connected to the computer 901 via wires 92U and 92D, so that the computer 901 may receive signals from the proximity switch 90U and the encoder 90D so as to be informed of the degree of rotation of the shaft of the motor 80C. The computer 901 may also send signals to the motor 80C to control the degree of rotation of the motor 80C. Furthermore, the degree of rotation of the gear 243 (or the shaft of the motor 80C) can be converted into the sliding distance of the rack 271 relative to the support component 251. Thus, the computer 901 may control the sliding distance of the rack 271 relative to the support component 251 (as in the vertical motion mechanism 202). When the rack 271 is moved by the motor 80C to a position where the part 2710 of the rack 271 is out of the sensing range of the proximity switch 90U, the electric and electronic signals are sent to the computer 901. The computer 901 then sends signals to the motor 80C to control the rotation of the motor 80C. Using the information sent by the proximity switch 90U and the encoder 90D the computer 901 may accurately control the motion of the rack 271.

It should be noted that the range of motion of the rack 244 in the vertical motion mechanism 202 may be limited by means of physical barriers. The same applies to the range of motion of the rack 271 in the vertical motion mechanism 204.

Referring to FIGS. 9B-9C, a container gripping mechanism 205 comprises a leading device 281 comprising a shaft 281a and four arms 281b, and a vacuum chuck 80R comprising a vertical axis. The inner surfaces 281c of the four arms 281b are configured to form a part of a cone surface. The four arms 281b are configured to be cyclically positioned under the rotation of 90 degrees around the central axis of the shaft 281a. The leading device 281 is configured to be a rigid component. The axis of the shaft 281a is referred to as the axis of the leading device 281. The vacuum chuck 80R is configured to be of cylindrical shape comprising an axis. The vacuum chuck 80R is configured to be fixedly connected to the shaft 281a of the leading device 281 wherein the axis of the leading device 281 and the axis of the vacuum chuck are configured to be concentric. The container gripping mechanism 205 may grip a cap 108 of a capped container 109 when the vacuum chuck 80R grabs the top of the cap 108 (see FIG. 9C). The axis of the leading device 281 (or the axis of the vacuum chuck 80R) is configured to be concentric (or nearly concentric) with the axis of the cap 108 (or the capped container 109) during the sucking process. The four arms 281b of the leading device 281 can physically restrain the cap 108 prior to or during the sucking process. As shown in FIGS. 9B-9C, the vacuum chuck 80R is connected to the computer 901 via wires 82R. The computer 901 is configured to dynamically control the vacuum chuck 80R to suck and grab a capped container 109. The vacuum chuck 80R is also connected by pipes to a vacuum pump wherein the connections and vacuum pump are not shown in the figures. The leading device 281 may be referred to as the base component of the container gripping mechanism 205.

Figure 9D:
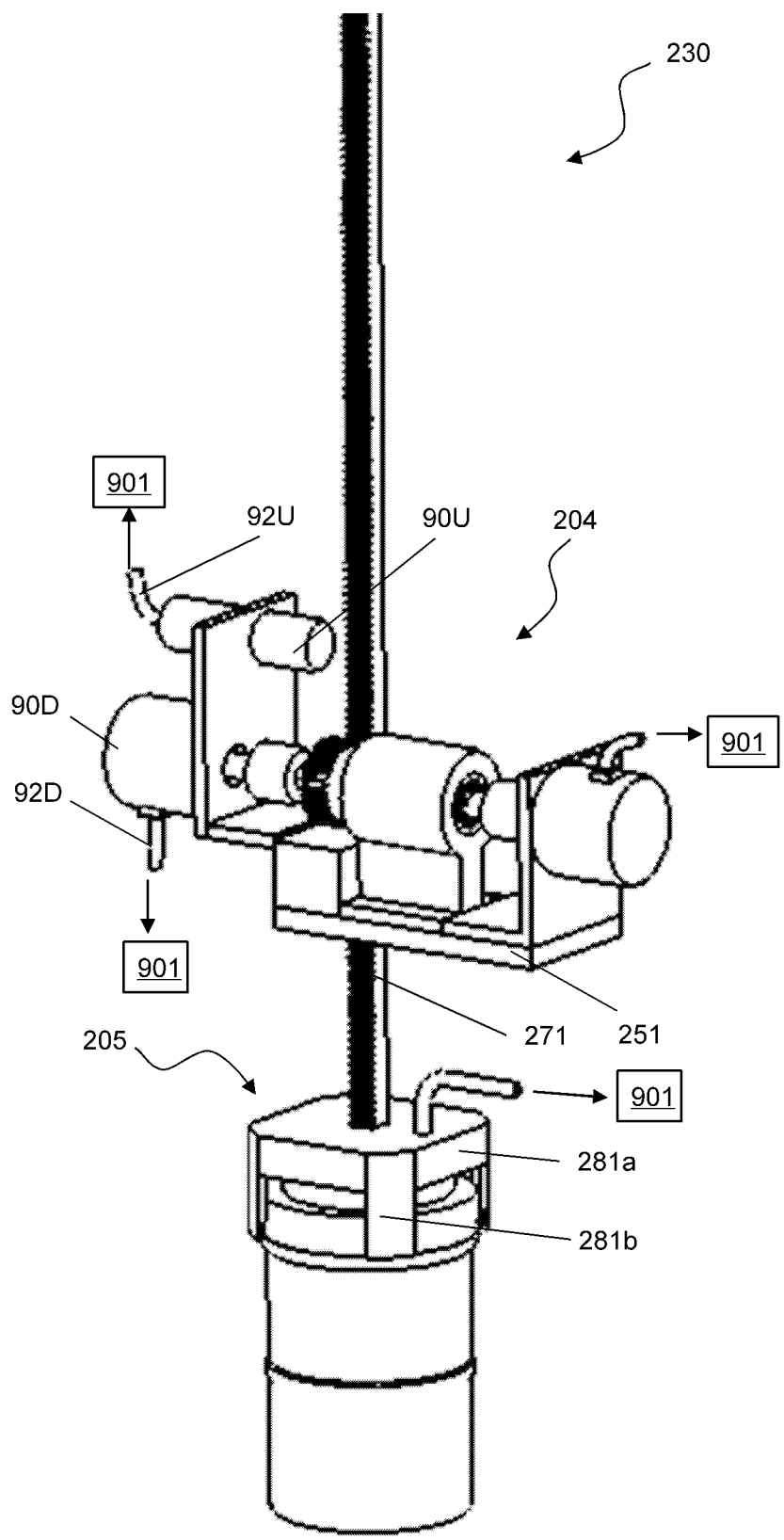
FIG. 9D shows an aerial view of a vertical transfer mechanism which comprises the vertical motion mechanism and the container gripping mechanism.

Referring to FIG. 9D, a vertical transfer mechanism 230 comprises the vertical motion mechanism 204 and the container gripping mechanism 205, wherein the shaft 281a of the leading device 281 of the container gripping mechanism 205 is configured to be fixedly connected to the bottom end of the rack 271 of the vertical motion mechanism 204; wherein the rack 271 is configured to be positioned vertically. The container gipping mechanism 205 is configured to be moved up and down with the rack 271, relative to the support component 251 of the vertical motion mechanism 204. As explained before, the computer 901 may accurately control the sliding distance of the rack 271 of the vertical motion mechanism 204 relative to the support component 251. Thus, the sliding distance of the leading device 281 (or equivalently, the container gripping mechanism 205) relative to the support component 251 of the vertical motion mechanism 204 is accurately controlled by the computer 901. Thus, under the control of the computer 901, the container gripping mechanism 205 of the vertical transfer mechanism 230 can slide to a specific position inside a squared compartment of a storage box 211, and the vacuum chuck 80R of the container gripping mechanism 205 may suck and grab a capped container 109 which is stored at the top in the squared compartment, and then the vertical motion mechanism 204 may lift the container 109 upward. Again, under the control of the computer 901, the container gripping mechanism 205 of the cover lifting mechanism 230 can move down and then release the capped container 109 into a compartment of the storage box 211 in the storage apparatus 192.

The support component 251 of the vertical motion mechanism 204 is referred to as the support component of the vertical transfer mechanism 230.

Figure 10A:
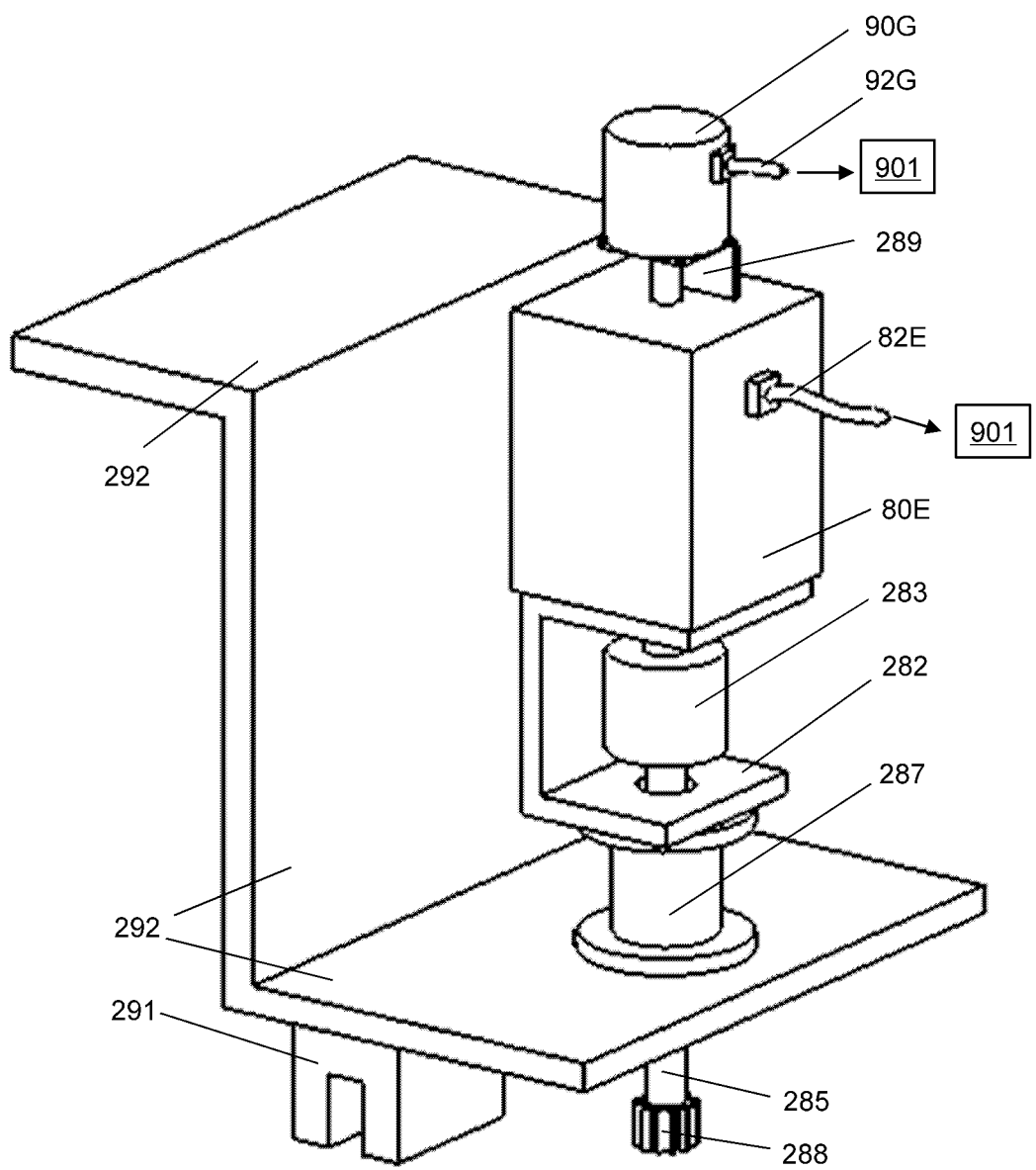
FIG. 10A shows an aerial view of parts of a horizontal motion mechanism
Figure 10B:
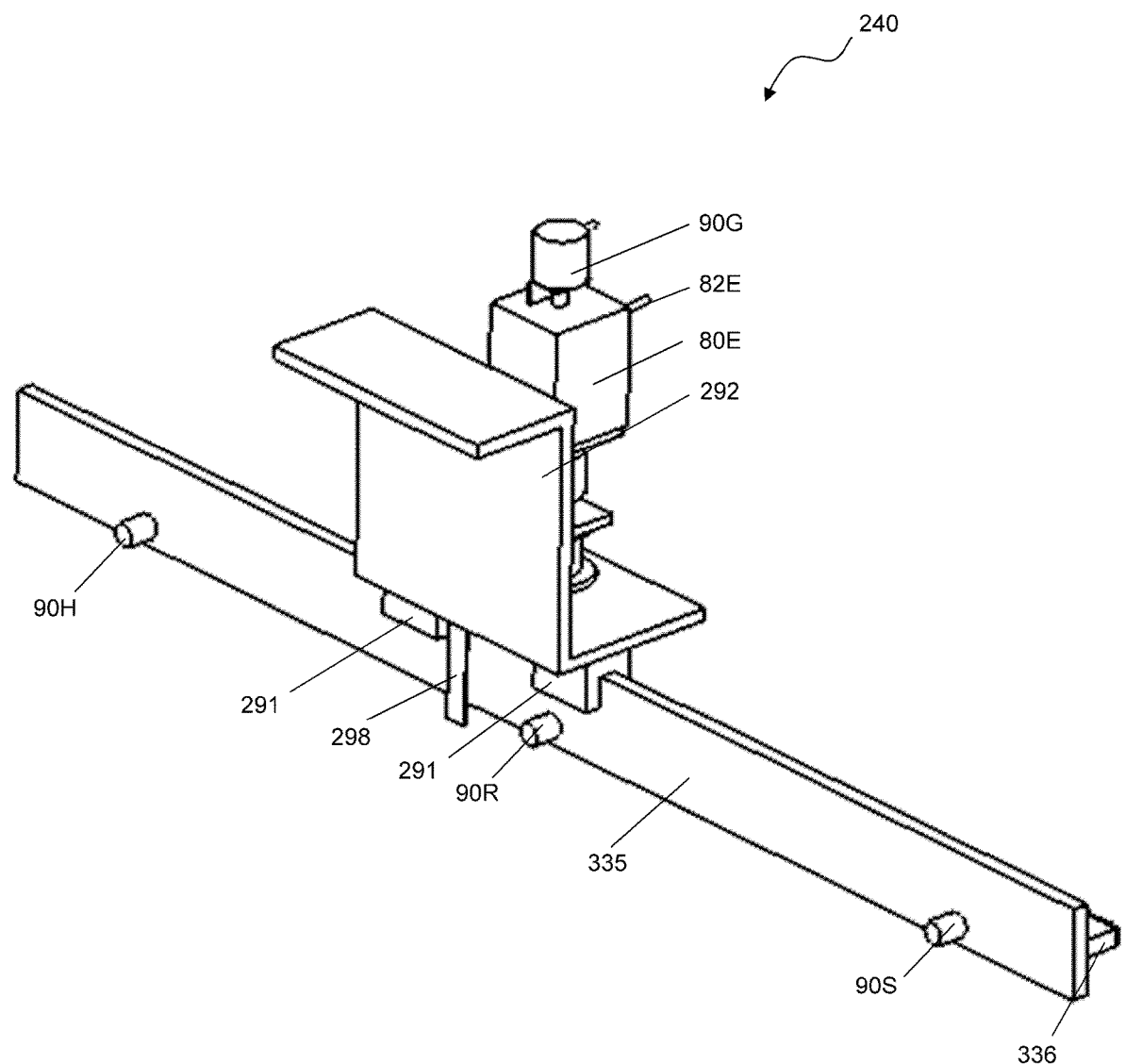
FIG. 10B-10C show aerial views of the horizontal motion mechanism.
Figure 10C:
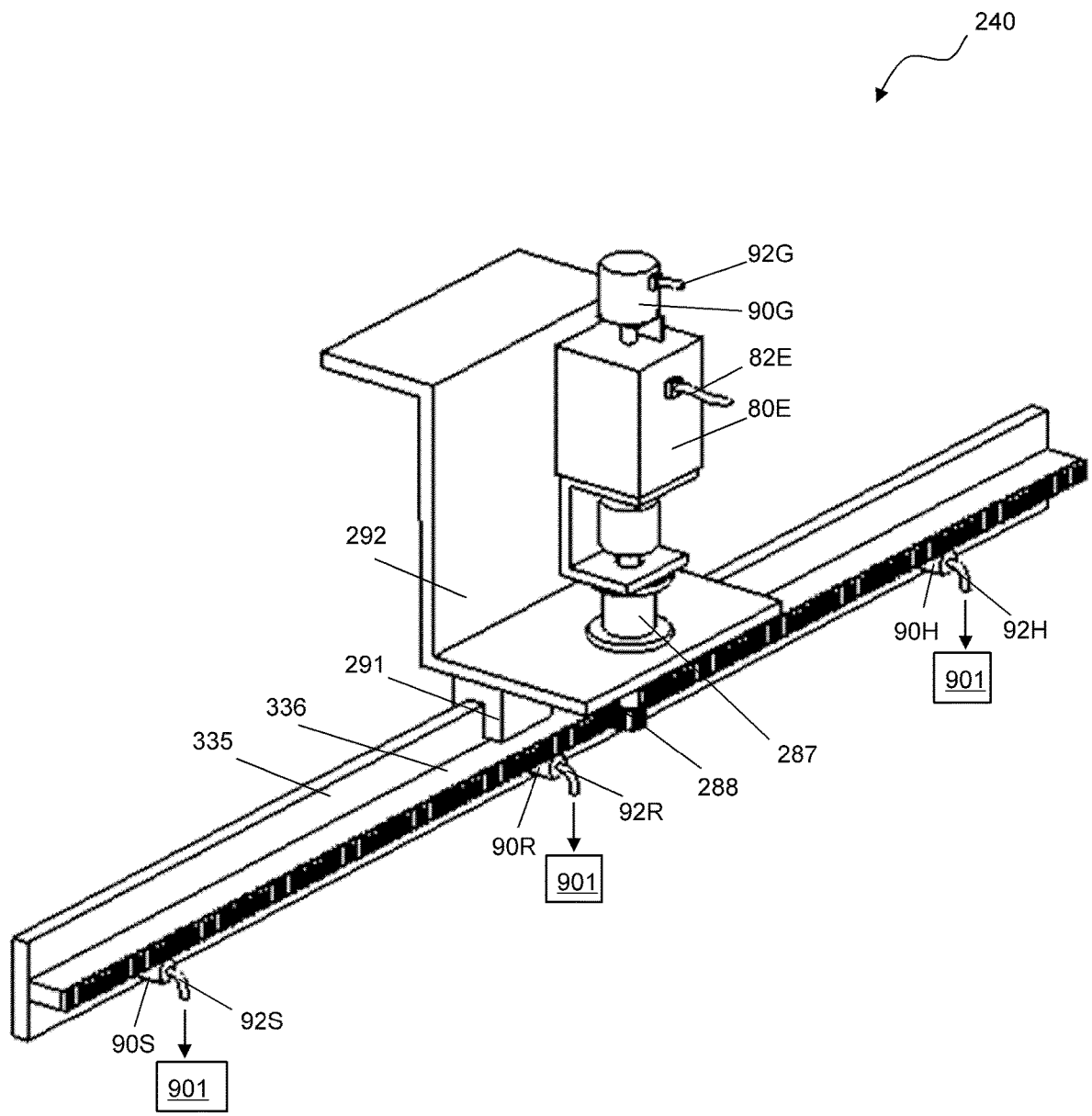

Referring to FIGS. 10A-10C, a horizontal motion mechanism 240 comprises: a rigid component 292; two sliders 291 which are rigidly connected to the bottom of the rigid component 292; a bearing housing 287 with a vertical axis; a shaft 285; a gear 288 rigidly joined and concentric with the shaft 285; and a motor 80E comprising a base component and a shaft. The bearing housing 287 is rigidly connected to the rigid component 292 and the shaft 285 (as well as the gear 288) is constrained to rotate the bearing housing 287 around the axis of the bearing housing 287. The base component of the motor 80E is fixedly connected to the bearing housing 287 via a connecting component 282 and the shaft of the motor 80E is connected to the shaft 285 by a coupling 283. Thus, the motor 80E may drive a rotation of the shaft 285, and hence the gear 288 is rotated around the axis of the shaft 285, relative to the rigid component 292. The horizontal motion mechanism 240 also comprises a linear rail 335 and a rack 336 wherein the rack 336 is rigidly connected to the linear rail 335. The two sliders 291 are configured to be engaged with the linear rail 335, so that the sliders 291 and the rigid component 292 are constrained to move linearly along the linear rail 335. Since the gear 288 is engaged with the rack 336, when the motor 80E drives the rotation of the gear 288, the rigid component 292 moves linearly along the linear rails 335.

It should be noted that the shaft 285 and the gear 288 may optionally be made as a single part.

The horizontal motion mechanism 240 further comprises: an encoder 90G comprising a base component and a shaft; three proximity switches 90H, 90R and 90S; and a target 298 fixedly connected to the rigid component 292. As shows in FIG. 10A, the base component of the encoder 90G is fixedly connected to base component of the motor 80E via a connector, and the shaft of the encoder 90G is fixedly connected to the shaft of the motor 80E. The encoder 90G is used to detect the degree of rotation of the motor 80E (or equivalently, the degree of rotation of the gear 288). As shown in FIG. 10A, the motor 80E is connected to the computer 901 via wires 82E. The computer 901 is configured to dynamically control the timing and/or speed of the motor 80E. The encoder 90G is also connected to the computer 901, so that the computer 901 may receive signals from the encoder 90G to be informed of the degree of rotation of the shaft of the motor 80E. The computer 901 may also send signals to the motor 80E to control the degree of rotation of the motor 80E. Furthermore, the degree of rotation of the gear 288 (or the shaft of the motor 80E) can be converted into the sliding distance of the rigid component 292 relative to the rail 335. Thus, the computer 901 may control the sliding distance of the rigid component 292 relative to the rail 335. The proximity switches 90H and 90S are positioned at the ends (or near to the ends) of the rail 335 and the proximity switch 90R is positioned at the middle of the rail 335. Each of the three proximity switches 90H, 90R and 90S monitors the target 298 when the target 298 is moved with the slider 291. As shown in FIG. 10C, the proximity switches 90H, 90R and 90S are connected to the computer 901 via wires 92H, 92R and 92S, so the computer 901 may receive signals from the proximity switches 90H, 90R and 90S. When one of the proximity switches 90H and 90S senses the target 298, the signals are sent to the computer 901. The computer 901 can figure out the position of the target, and the position of the rigid component 292. When the middle proximity switch 90R senses the target 298, the position may be used for calibration of the encoder 90G, when the angular degree of rotation as recorded by the computer 901 may be set to be a default number, overriding the numbers previously obtained partly by the information sent by the encoder 90G to the computer 901. Thus, using the information sent by the proximity switches 90H, 90R, 90S and the encoder 90G, the computer 901 may accurately control the motion of the rigid component 292 relative to the rail 335.

It should be noted that the linear rail 335 may be considered as the support component of the horizontal motion mechanism 240.

It should also be noted that physical barriers may be installed at both ends of the linear rail 335, so that the linear motion of the rigid component 292 has a limited range.

Figure 10D:
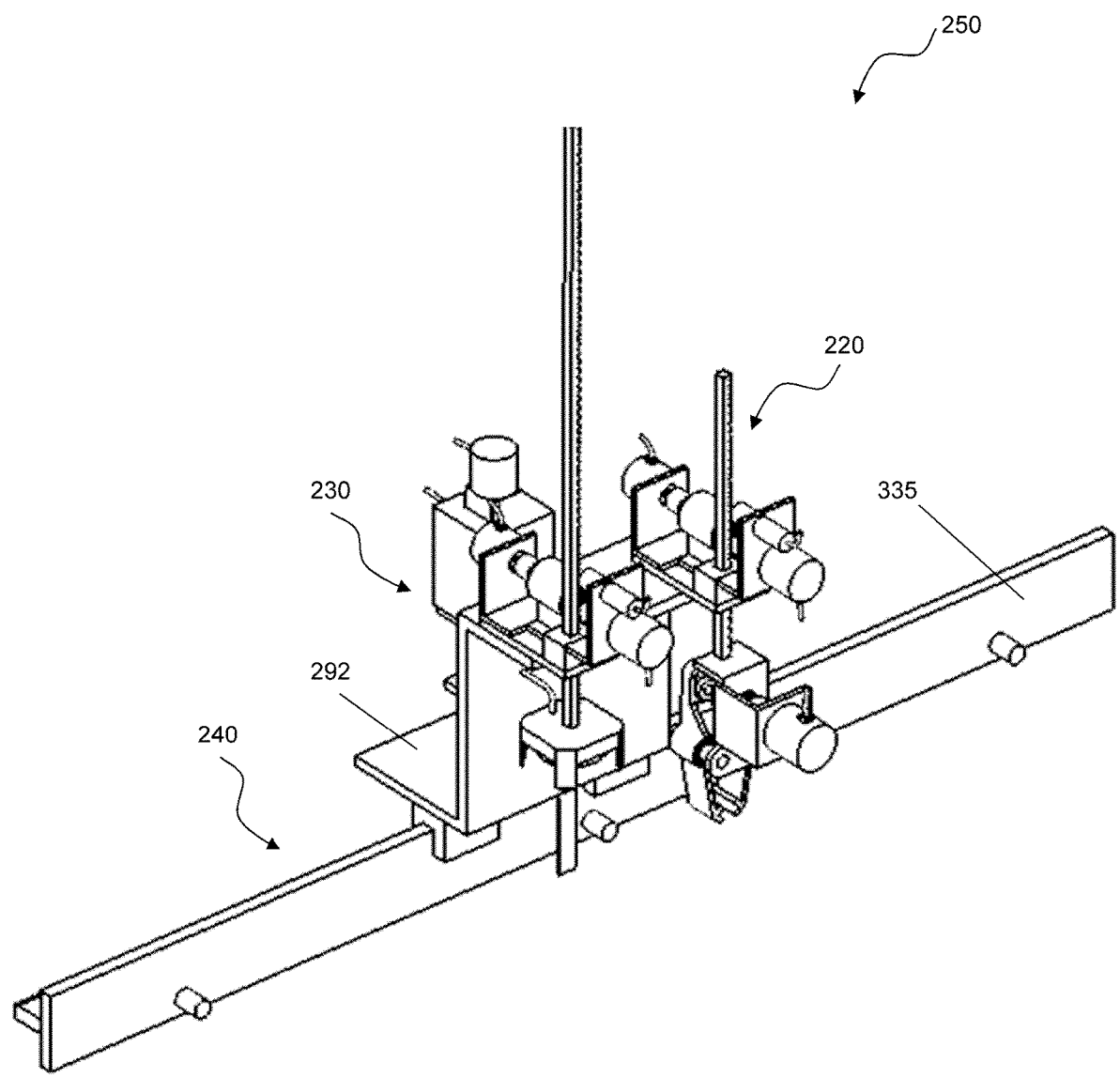
FIG. 10D shows an aerial view of a transfer sub-apparatus comprising the horizontal motion mechanism, the cover lifting mechanism and the vertical transfer mechanism.

Referring to FIG. 10D, a transfer sub-apparatus 250 comprises the horizontal motion mechanism 240, the cover lifting mechanism 220, and the vertical transfer mechanism 230. The support components 251 of the cover lifting mechanism 220 and the vertical transfer mechanism 230 are configured to be rigidly connected to the rigid component 292 of the horizontal motion mechanism 240. As explained before, the computer 901 may control the rigid component 292 to make a horizontal linear motion relative to the rail 335, so that the computer 901 may also control the support component 251 of vertical transfer mechanism 230 and the support component 251 of the cover lifting mechanism 220 to make a horizontal linear motion relative to the rail 335. Each location of the support component 251 of the cover lifting mechanism 220 (or of the vertical transfer mechanism 230) relative to the rail 335 is controlled by the computer 901.

Figure 11A:
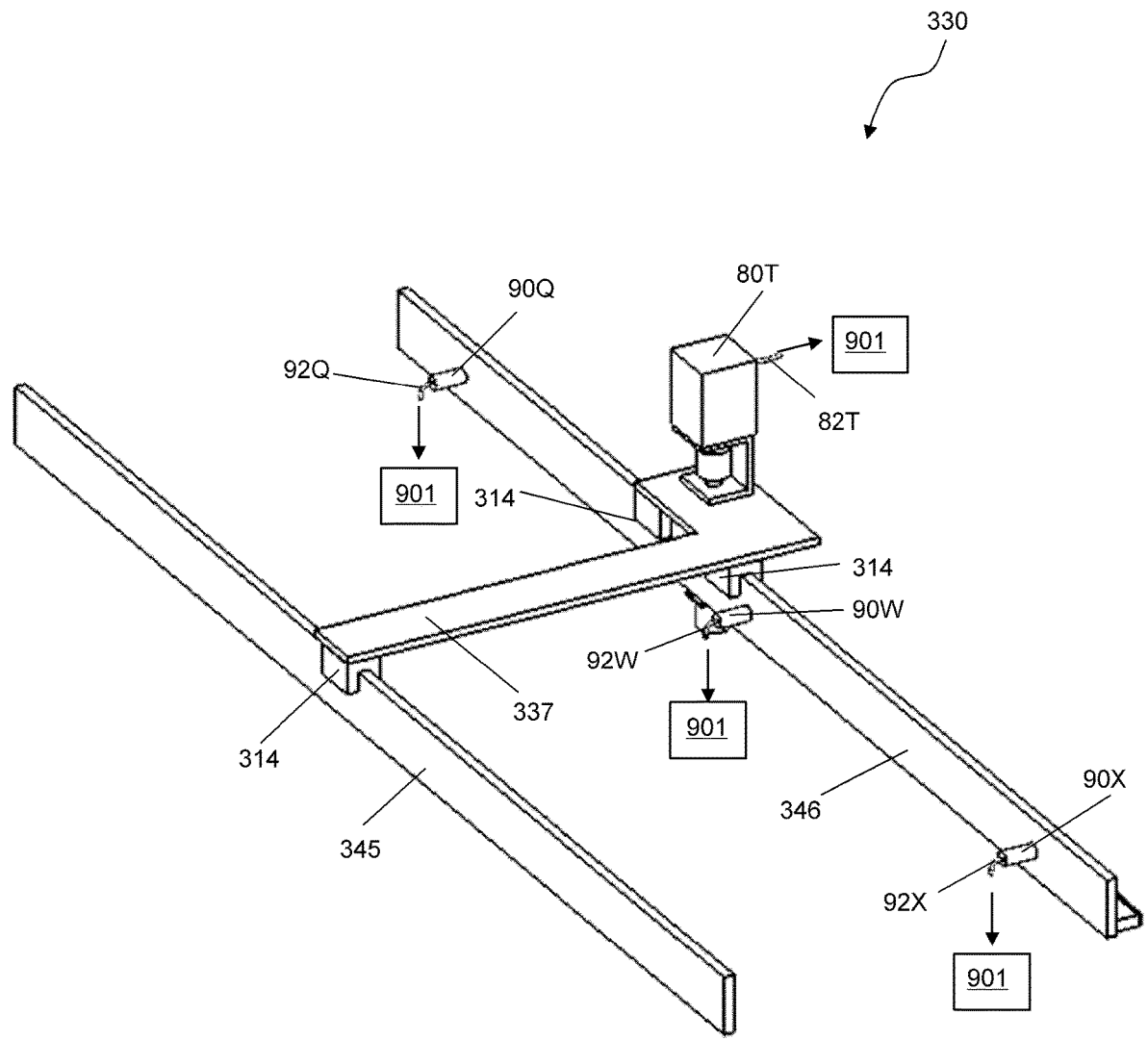
FIG. 11A shows an aerial view of a horizontal motion mechanism
Figure 11B:
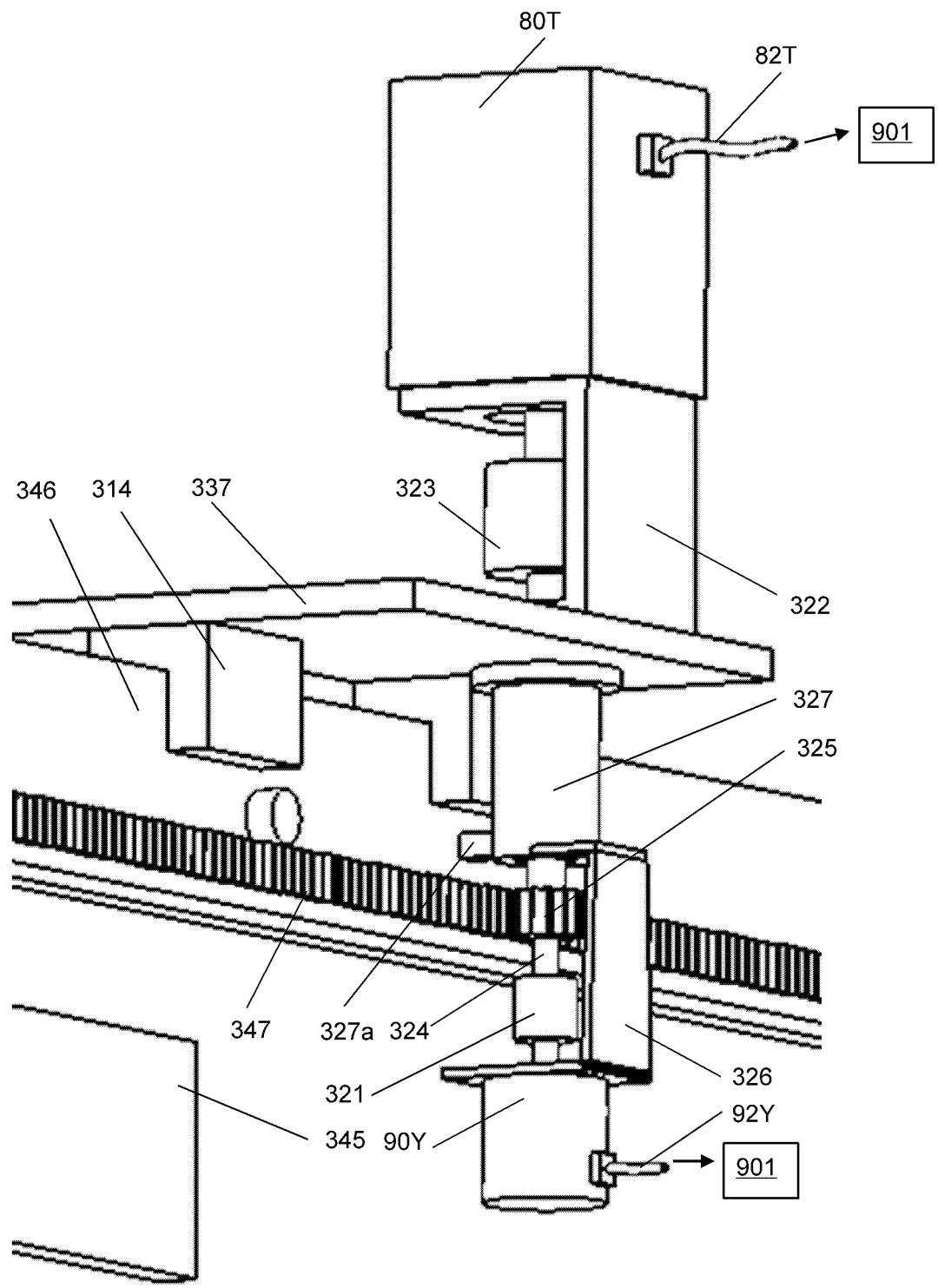
FIG. 11B shows an aerial view of parts of the horizontal motion mechanism.

Referring to FIGS. 11A-11B, a horizontal motion mechanism 330 comprises: a support component 337; three sliders 314 configured to be fixedly connected to the support component 337; two parallel rails 345 and 346; a bearing housing 327 configured to be fixedly or rigidly connected to the support component 337; a shaft 324 comprising a vertical axis; a rack 347 which is configured to be fixedly connected to the rail 346; and a gear 325. One of the sliders 314 is constrained to slide along the rail 345 and the other two sliders 314 are constrained to slide along the rail 346. As explained before, the sliders 314 are configured to be fixedly connected to the support component 337, so that the support component 337 is constrained to slide along the rail 346 (or 345). The shaft 324 is constrained to rotate relative to the bearing housing 327 (or equivalently, relative to the support component 337) by some accessories. The gear 325 is configured to join and be concentric with the shaft 324, so that the gear 325 is constrained to rotate relative to the support component 337 with the shaft 324.

The horizontal motion mechanism 330 also comprises: a motor 80T comprising a shaft and a base component, a connecting component 322 configured to connect the base component of the motor 80T to the support component 337; an encoder 90Y comprising a base component and a shaft; and a connecting component 326 configured to connect the base component of the encoder 90Y to the bearing housing 327. The shaft of the motor 80T is fixedly connected to the shaft 324 via a coupling 323, so that the motor 80T may drive a rotation of the shaft 324 around the axis of the shaft 324, hence the gear 325 is rotated around the axis of the shaft 324. Since the gear 325 is engaged with the rack 347, a rotation of the gear 325 may induce a sliding of the support component 337 along the rail 346. The shaft of the encoder 90Y is fixedly connected to the shaft 324 via a coupling 321, so that the rotation of the shaft 324 (or the shaft of the motor 80T) is sensed by the encoder 90Y. As shown in FIG. 11B, the motor 80T is connected to the computer 901 via wires 82T. The computer 901 is configured to dynamically control the timing and/or speed of the motor 80T. The encoder 90Y is also connected to the computer 901 via wires 92Y, so the computer 901 may receive signals from the encoder 90Y to be informed of the degree of rotation of the shaft of the motor 80T. The computer 901 can send signals to the motor 80T to control the degree of rotation of the motor 80T. Furthermore, the angle of rotation of the gear 325 (or, of the shaft of the motor 80T) can be converted into the sliding distance of the rack 347 relative to the support component 337. Thus, the computer 901 may accurately control the sliding distance of the support component 337 relative to the rack 347 (or equivalently, relative to the rail 346).

It should be noted that the rails 345 and 346 may be configured to be rigidly or fixedly connected to a support component, by known techniques.

The rail 346 may also be referred to as the support component of the horizontal motion mechanism 330.

The horizontal motion mechanism 330 also comprises three proximity switches 90Q, 90W, 90X, wherein the proximity switches 90Q and 90X are positioned at the ends (or, near to the ends) of the rail 346, and the proximity switch 90W is positioned at the middle of the rail 346. A target 327a is configured to be rigidly connected to the bearing housing 327. Each of the three proximity switches 90Q, 90W and 90X are configured to monitor the target 327a when the target 327a is slid with the support component 337. As shown in FIG. 11A, the proximity switches 90Q, 90W and 90X are connected to the computer 901 via wires 92Q, 92W and 92X, so the computer 901 may receive signals from the proximity switches 90Q, 90W and 90X. When one of the proximity switches 90Q and 90X senses the target 327a, the signals of the proximity switch 90Q or 90X are sent to the computer 901, and the computer 901 can figure out the position of the target 327a, and the position of the support component 337. When the middle proximity switch 90W senses the target 327a, the position may be used for calibration of the encoder 90Y, when the angular degree of rotation as recorded by the computer 901 may be set to be a default number, overriding the numbers previously obtained partly by the information sent by the encoder 90Y to the computer 901. Thus, using the information sent by the proximity switches 90Q, 90W, 90X and the encoder 90Y, the computer 901 may accurately control the motion of the support component 337.

It should be noted that the motion of the support component 337 relative to the rail 346 may also be limited by physical barriers.

Figure 12:
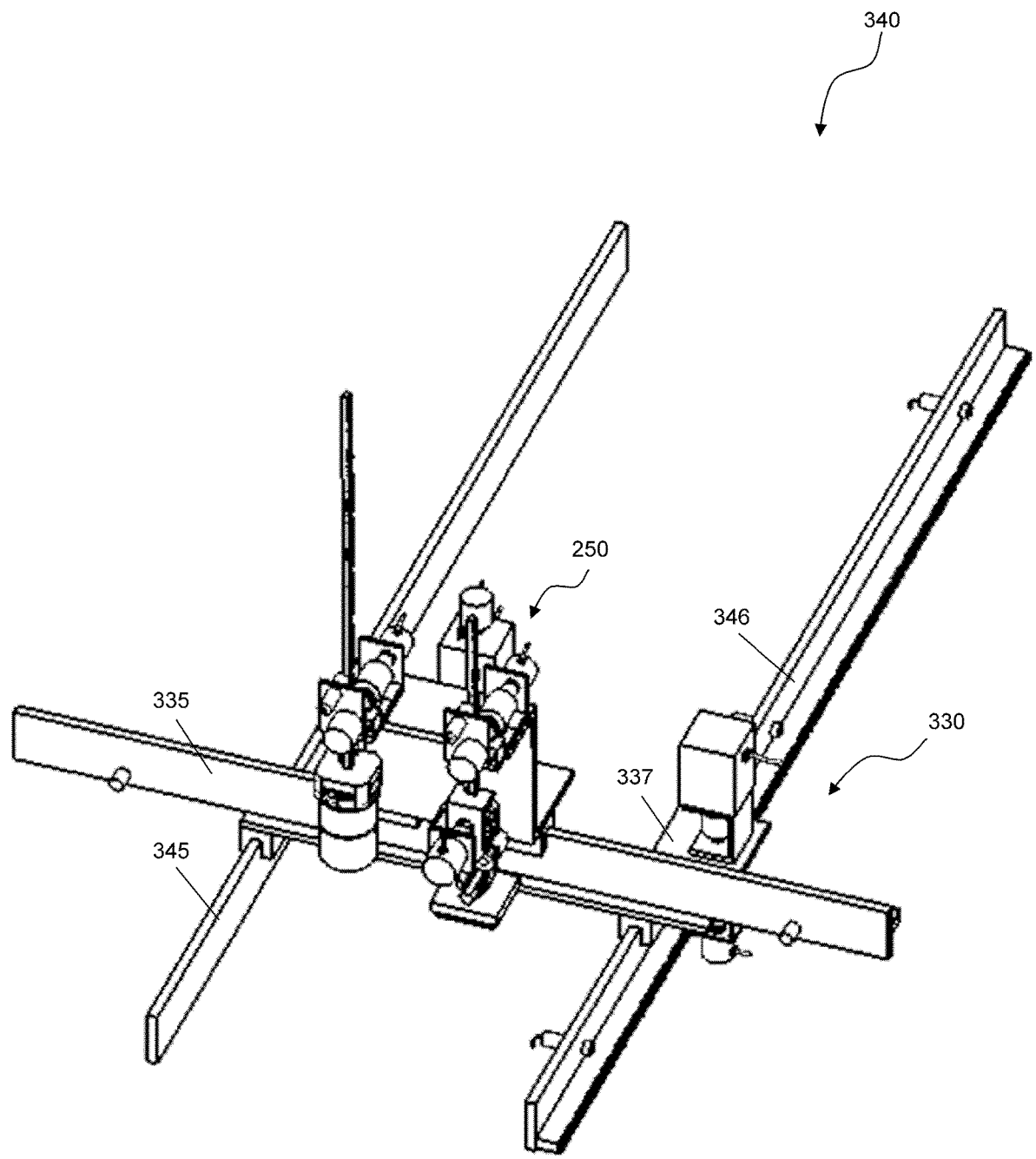
FIG. 12 shows an aerial view of a transfer apparatus.

Referring to FIG. 12, a transfer apparatus 340 comprises the transfer sub-apparatus 250 and the horizontal motion mechanism 330. The linear rail 335 of the sub-mechanism 250 is fixedly connected to the support component 337 of the horizontal motion mechanism 330, so that the transfer sub-apparatus 250 is constrained to slide linearly along the linear rails 345 and 346 by the rotation of the motor 80T of the horizontal motion mechanism 330. The linear rails 345 and 346 of the horizontal motion mechanism 330 are configured to be perpendicular to the linear rail 335 in transfer sub-apparatus 250. As explained above, the linear rails 345, 346 and 335 are configured to be positioned horizontally.

The leading device 281 of the container gripping mechanism 205 will be referred to as a first support component of the transfer apparatus 340; the support component 251 (of the vertical motion mechanism 204) will be referred to as a second support component of the transfer apparatus 340; the rail 335 (of the horizontal motion mechanism 240) will be referred to as a third support component of the transfer apparatus 340; the rail 346 (of the horizontal motion mechanism 330) will be referred to as a fourth support component of the transfer apparatus 340.

It should be noted that the transfer apparatus 340 comprises the following:

(1) the container gripping mechanism 205 configured to grab or release a capped container, wherein the container gripping mechanism 205 comprises the leading device 281, the vacuum chuck 80R, etc.;

(2) the cover gripping mechanism 203, wherein the cover gripping mechanism comprises the support component 263, two V-shaped grippers, and a motorized mechanism configured to rotate the two grippers relative to the support component 263 around the axes of the shafts 268a and 268b, to grip or release an insulation cover 141, wherein the motorized mechanism comprises the motor 80B, the coupling 262, the shafts 265a, 265b, 264, 268a and 268b, etc.;

(3) the vertical motion mechanism 204 referred to as a first motion mechanism configured to move the leading device 281 of the container gripping mechanism 205, linearly in the vertical direction, relative to the second support component 251, wherein the first motion mechanism 204 comprises the second support component 251, the gear 243, the rack 271, the bearing housing 232, the shaft 252, the connecting component 253, the sliding device 247, etc., and their connections to each other if any, and their connections to the other components of the transfer apparatus 340 if any;

(4) the horizontal motion mechanism 240 referred to as a second motion mechanism configured to move the second support component 251 linearly in a first horizontal direction, relative to the third support component 335, wherein the second motion mechanism 240 comprises the third support component 335, the rack 336, the sliders 291, the rigid component 292, the bearing housing 287, the connecting component 282, the motor 80E, etc., and their connections to each other if any, and their connections to the other components of the transfer apparatus 340 if any; wherein the first horizontal direction is the direction which is parallel to the linear rail 335;

(5) the horizontal motion mechanism 330 referred to as a third motion mechanism configured to move the third support component 335 linearly in a second horizontal direction, relative to the fourth support component 346, wherein the third motion mechanism 330 comprises the rails 345 and 346, the support component 337, the rack 347, the sliders 314, the gear 325, the bearing housing 327, the motor 80T, the connecting component 322, etc., and their connections to each other if any, and their connections to the other components of the transfer apparatus 340 if any; wherein the second horizontal direction is the direction which is parallel to the rails 345 and 346;

(6) the vertical motion mechanism 202 configured to move the support component 263 of the cover gripping mechanism 203, linearly in the vertical direction, relative to the support component 251 of the cover lifting mechanism 220, wherein the vertical motion mechanism 202 comprises the support component 251, the gear 243, the rack 244, the bearing housing 232, the shaft 252, the connecting component 253, the sliding device 247, etc., and their connections to each other if any, and their connections to the other components of the transfer apparatus 340 if any.

It should be noted that the second support components 251 of the transfer apparatus 340 are moved horizontally by a combination of two linear motions, relative to the fourth support component 346. The directions of the two linear motions are perpendicular to each other. On the other hand, the leading device 281 of the container gripping mechanism 205 can be moved vertically relative to the second support component 251. Thus, the leading device 281 of the container gripping mechanism 205 can be moved by a combination of three linear motions relative to the fourth support component 346, wherein the directions of movement of the three linear motions are perpendicular to each other. Similarly, the support component 263 of the cover gripping mechanism 203 can be moved vertically relative to the second support component 251. Thus, the support component 263 of the cover gripping mechanism 203 can be moved by a combination of three linear motions relative to the fourth support component 346, wherein the directions of movement of the three linear motions are perpendicular to each other.

The transfer apparatus 340 also comprises the encoders 90B, 90D, 90G, 90Y, the proximity switches 90C, 90U, 90H, 90R, 90S, 90Q, 90W, 90X, etc. and other electrical or electronic devices and accessories, wherein the said sensors are connected via wires to the computer 901; wherein the said sensors are used to detect the degree of rotation of the motors, the relative position of two components, etc., of the transfer apparatus 340 and then send signals to the computer 901. Thus the computer 901 may control the above described mechanisms and apparatuses, especially the functions of the vacuum chuck 80R of the container gripping mechanism 205, (and the degree of rotations or speeds of the motor 80B of the cover gripping mechanism 203) so that the container gripping mechanism 205 (and respectively, the cover gripping mechanism 203) can accurately grip a cap 108 (and respectively, an insulation cover 141); the degree of rotations or speeds of the motor 80C (and 80A) of the vertical motion mechanism 204 (and respectively, the vertical motion mechanism 202), so that sliding speed and the sliding distance of the container gripping mechanism 205 (and respectively the cover gripping mechanism 203) are accurately controlled; the degrees of rotations or speeds of the motors 80E and 80T of the transfer sub-apparatus 250 and respectively the horizontal motion mechanism 330, so that the horizontal position of the cover lifting mechanism 220 (and equivalently, the gripped insulation cover 141) and the vertical transfer mechanism 230 (and equivalently, the gripped capped container 109) are accurately controlled.

Thus, under the control of the computer 901, the container gripping mechanism 205 of the transfer apparatus 340 can move by a combination of three motions relative to the fourth support component 346 to a special position to accurately grip or release a capped container 109. Similarly, under the control of the computer 901, the cover gripping mechanism 203 of the transfer apparatus 340 can move by a combination of three motions relative to the fourth support component 346 to accurately grip or release an insulation cover 141.

Figure 13A:
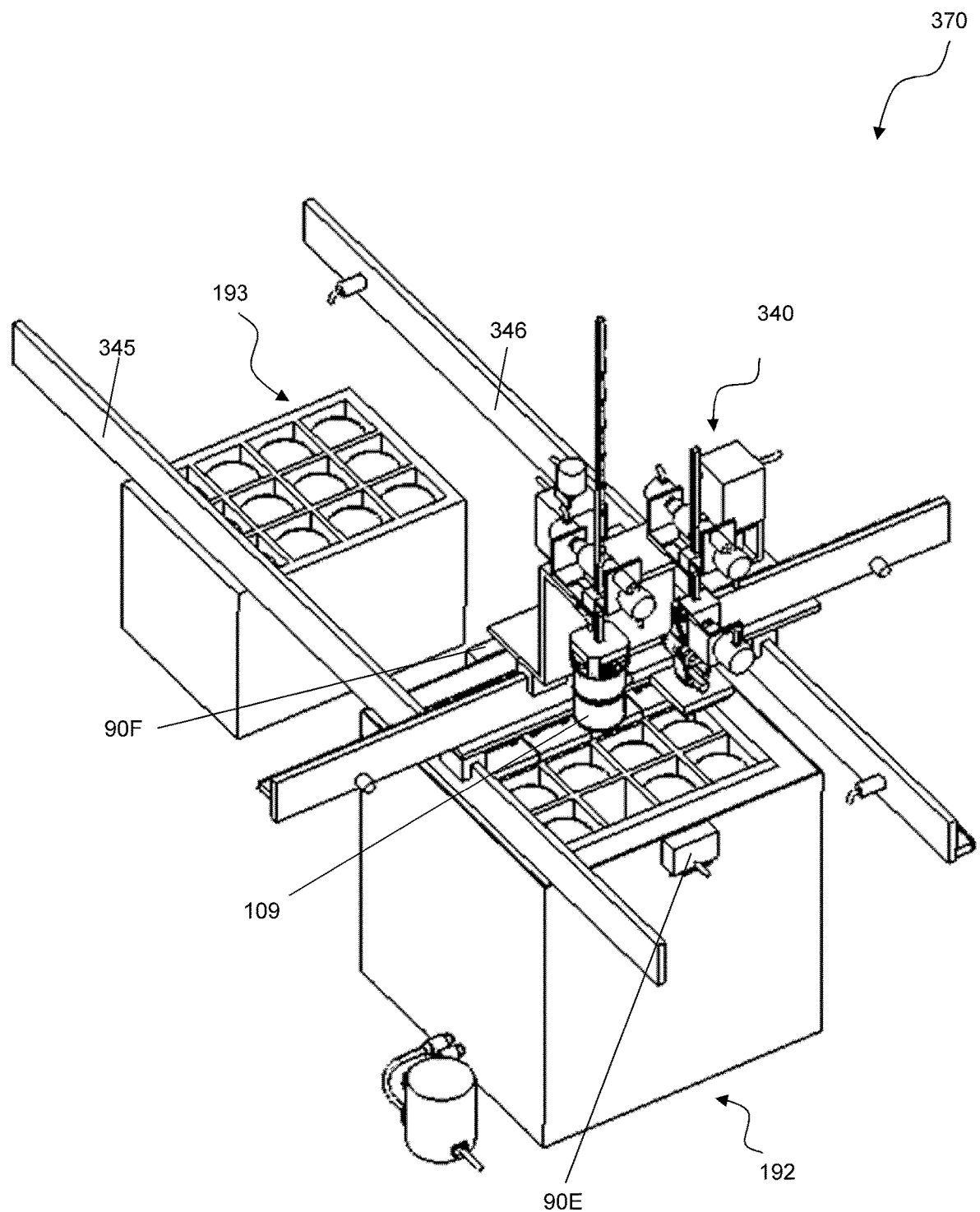
FIG. 13A shows an aerial view of a first transfer system.
Figure 13B:
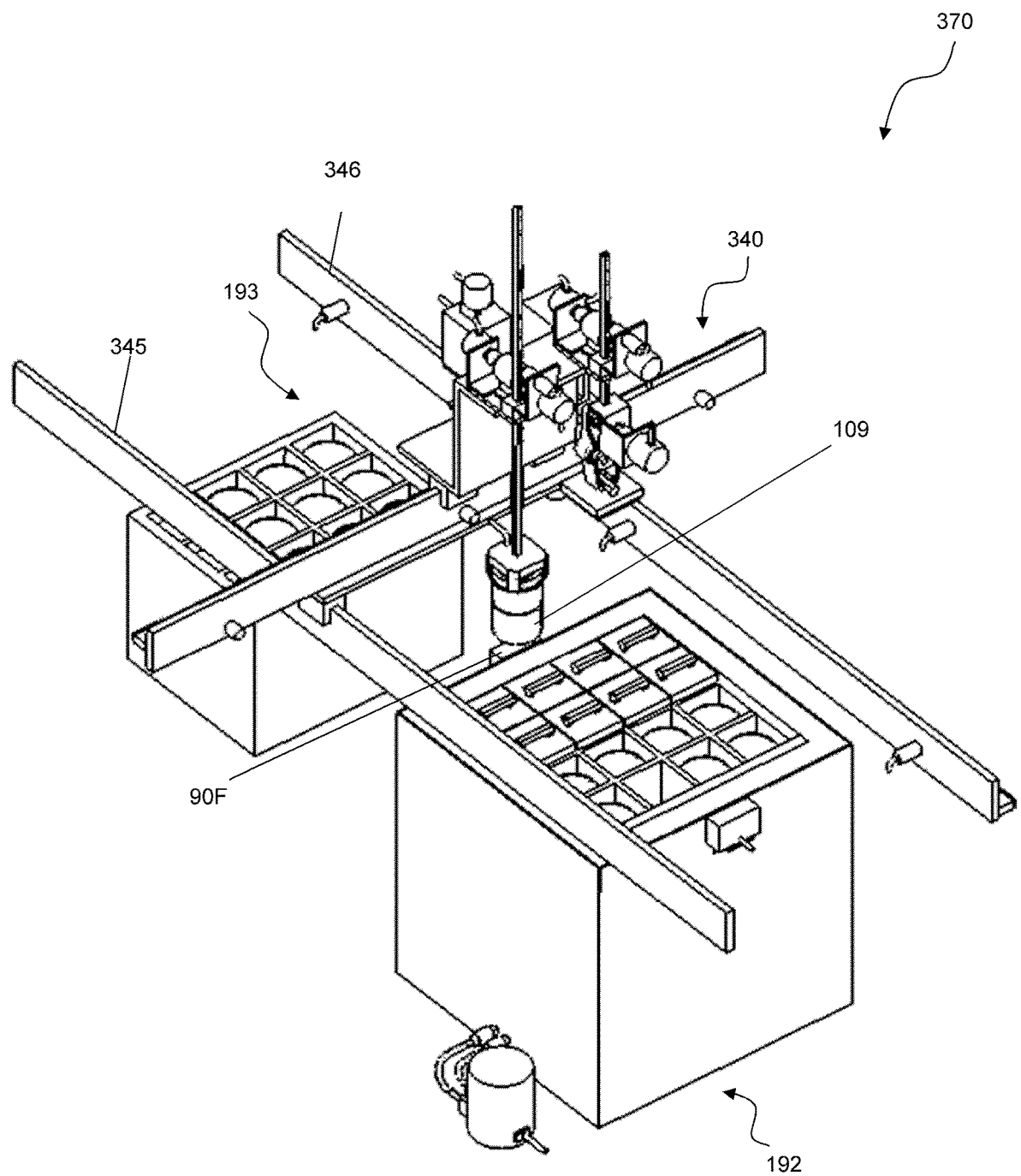
FIG. 13B shows the position of a capped container so its code can be read by a code reader.

Referring to FIG. 13A, a first transfer system 370 comprises one or more storage apparatuses 192, the transfer apparatus 340, and one or more transport boxes 193. The rail 346 of the transfer apparatus 340 is configured to be rigidly or fixedly connected to a support component, or to the ground, by known techniques. The transport box 193 and the storage apparatus 192 are located at certain positions relative to the transfer apparatus 340.

Under the control of the computer 901, the transfer apparatus 340 can transfer a capped container 109 contained in the transport box 193 to a compartment of the storage apparatus 192, as follows. At the first step, the container gripping mechanism 205 of the transfer apparatus 340 may be moved horizontally (by the combination of two horizontal motions) and then vertically down to a position to grip a capped container 109 in a transport box 193. Then, at step 2, the container gripping mechanism 205, together with the gripped capped container 109, may be moved vertically up, so that the gripped capped container 109 is totally outside of the transport box 193. At step 3, the container gripping mechanism 205, together with the gripped capped container 109, may be moved horizontally (by the combination of two horizontal motions), and then vertically down, to a position so that the QR code or barcode on the bottom of the gripped capped container 109 may be read by the camera 90F (see FIG. 13B). The information read by the camera 90F is then sent to the first computer 901. At step 4, the cover gripping mechanism 203 of the transfer apparatus 340 may be moved horizontally (by the combination of two horizontal motions), and then vertically down, to a position to grip an insulation cover 141 of a compartment of a storage apparatus 192, while the container gripping mechanism 205 is moved together by the combination of two horizontal motions. At step 5, the cover gripping mechanism 203 may be moved vertically up, together with the gripped insulation cover 141. At step 6, the container gripping mechanism 205 of the transfer apparatus 340 may be moved horizontally (by the combination of two horizontal motions), and then vertically down, to a position to release the said capped container 109 into the said compartment of the storage apparatus 192 (while the cover gripping mechanism 203 of the cover lifting mechanism 220 may also be moved horizontally together). The capped container 109 is thus moved to the storage apparatus 192. At step 7, the container gripping mechanism 205 is moved vertically up. At step 8, the cover gripping mechanism 203 may be moved horizontally (by the combination of two horizontal motions), and then vertically down, to a position to release back the gripped insulation cover 141 on the said compartment of the storage apparatus 192. Thus, the transfer apparatus 340 has transferred a capped container 109 from a transport box 193 to the said compartment of the storage apparatus 192.

In the first transfer system 370 as shown in FIG. 13A, under the control of the computer 901, the transfer apparatus 340 can transfer a capped container 109 contained in a specific compartment of the storage apparatus 192 to a location where the capped container 109 may be removed of its cap, as follows. First step, the cover gripping mechanism 203 of the cover lifting mechanism 220 of the transfer apparatus 340 may be moved horizontally (by the combination of two horizontal motions, produced by the second and third motion mechanisms) and then vertically down, to a position as to grip the insulation cover 141 which covers the specific compartment. Second step, the cover gripping mechanism 203, together with the gripped insulation cover 141, are moved vertically up. Then the container gripping mechanism 205 in the transfer apparatus 340 may be moved horizontally (by the combination of two horizontal motions) and then vertically down, to the inside of the compartment, and then may grip the highest positioned capped container 109 therein. In other words, the container gripping mechanism 205 may grip and hold the said capped container 109.

Third step, the container gripping mechanism 205, together with the gripped capped container 109, are moved vertically up, to the outside of the compartment. Fourth step, the container gripping mechanism 205 is moved horizontally (by the combination of two horizontal motions) and then vertically down, to the position above the camera 90E, so that the QR code or barcode on the container 107 can be read by the camera 90E. Fifth step, the container gripping mechanism 205, together with the gripped capped container 109, are moved vertically up, and then the cover gripping mechanism 203 and the gripped insulation cover 141 are moved horizontally (by the combination of two horizontal motions), and then vertically down to the position to release the said insulation cover 141 to cover the said compartment. Sixth step, the cover gripping mechanism 203 is moved vertically up. Seventh step, the container gripping mechanism 205 and the gripped capped container 109 may be moved horizontally (by the combination of two horizontal motions) and then vertically down, as to place the gripped capped container 109 at the location where the capped container 109 may be uncapped.

As explained before, each time a capped container 109 is put into or taken away from the storage apparatus 192, the QR code 121 of the said capped container 109 is decoded by the cameras 90E or 90F. The signals of the cameras 90E and 90F are sent to the computer 901, so that the data of the capped containers 109 in the storage apparatus 192 are stored and dealt by the computer 901.

Two containers of food ingredients are said to have the same "container content type," if they contain the same types of food ingredients, and the weight of the food ingredient of each type is the same for both containers. Although this is not strictly necessary, a single compartment in the storage apparatus 192 may be configured to store containers of the same container content type.

It should also be noted that the transfer apparatus 340 may move a container from one compartment to another.

Figure 14A:
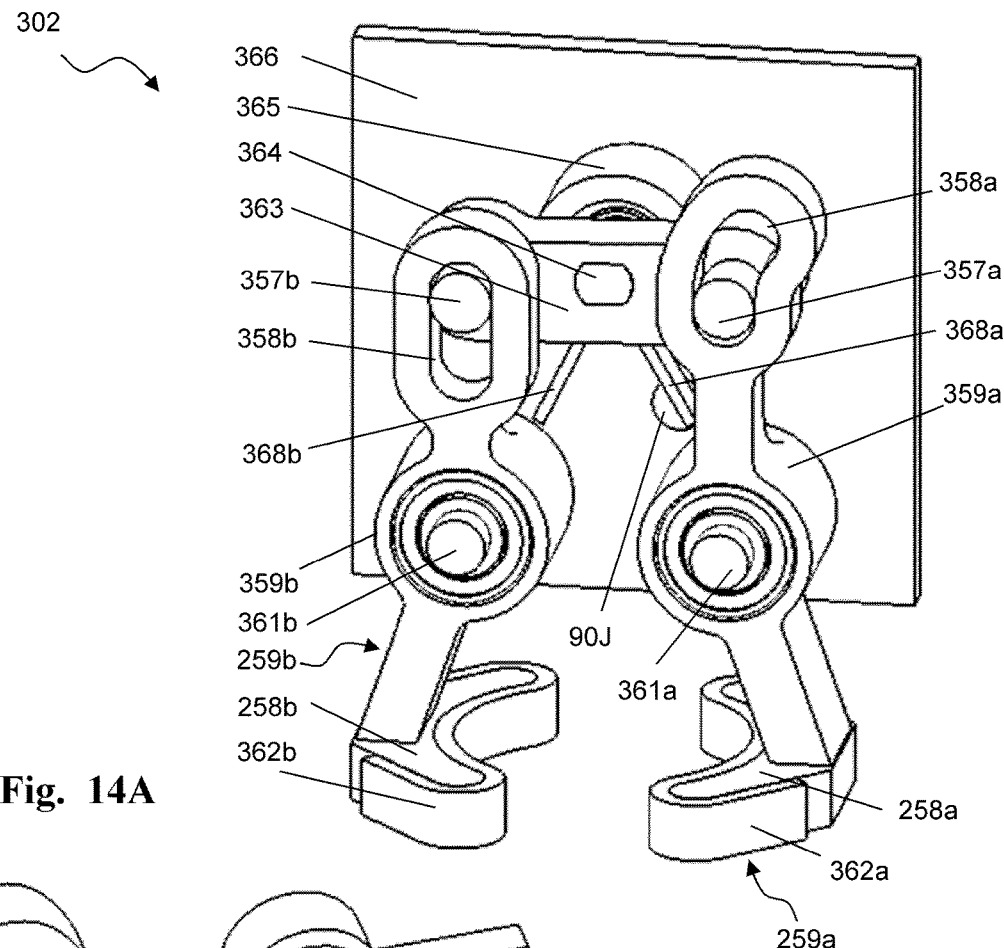
FIGS. 14A-14B show aerial views of a cap gripping mechanism.
Figure 14B:
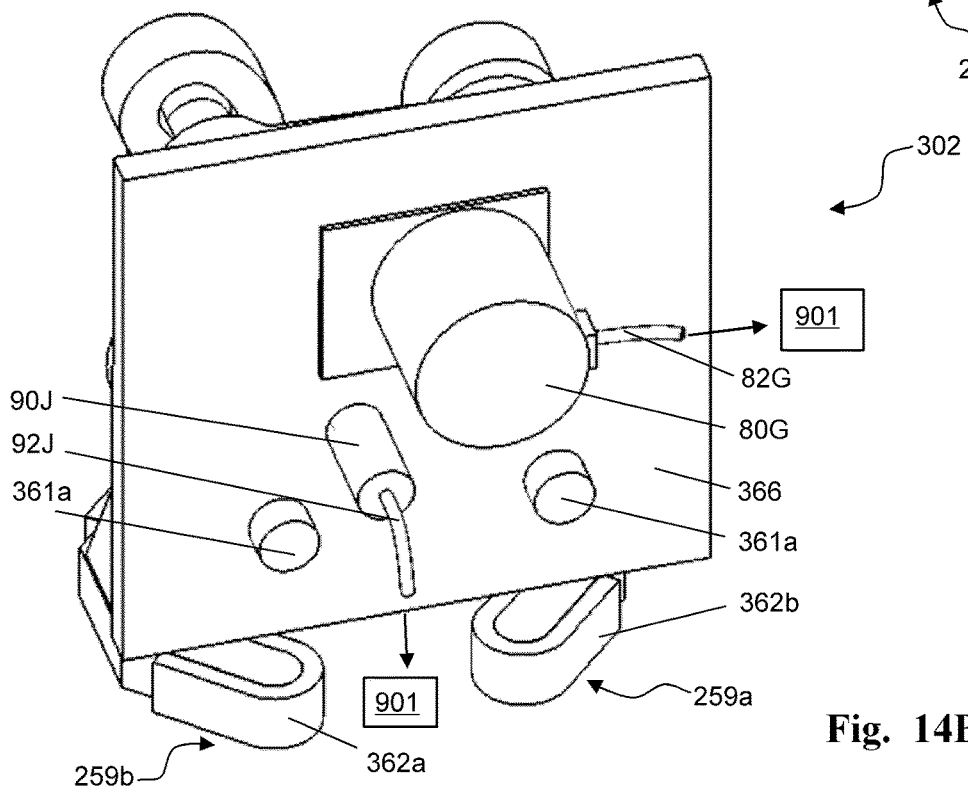

Referring to FIGS. 14A-14B, a cap gripping mechanism 302 comprises: a support component 366; gripping devices 259a and 259b; and shafts 361a and 361b each of which comprises a horizontal axis. The gripping device 259a (or 259b) comprises a curved hole 358a (or respectively 358b), a bearing housing 359a (or respectively 359b), and a gripper 258a (or respectively 258b). A part of the surface of the gripper 258a (or 258b) is in the shape of a part of a cylindrical surface. The gripping device 259a (or 259b) also comprises a rubber (or silica gel, or other similar elastic material) 362a (or respectively 362b) which is attached to the gripper 258a (or respectively, 258b). Both shafts 361a and 361b are rigidly connected to the support component 366. The bearing housing 359a of the gripping device 259a is constrained to rotate relative to the shaft 361a (or equivalently, relative to the support component 366) around the axis of the shaft 361a. Similarly, the bearing housing 359b of the gripping device 259b is constrained to rotate relative to the shaft 361b (or equivalently, relative to the support component 366) around the axis of the shaft 361b. The gripping device 259a (or 259b) is configured to be a rigid component.

The cap gripping mechanism 302 also comprises: shafts 357a, 357b and 364; a bearing housing 365; and a connector 363 configured to rigidly connect the shafts 357a, 357b and 364, wherein the axes of the shafts 357a, 357b and 364 are configured to be horizontal and parallel to each other; wherein the bearing housing 365 is rigidly connected to the support component 366. A pair of bearings are configured to connect the shaft 364 and the bearing housing 365, so that the shaft 364 is constrained to rotate relative to the bearing housing 365 (or equivalently relative to the support component 366) around the axis of the shaft 364, hence that the connector 363, and the shafts 357*a* and 357*b* are constrained to rotate relative to the bearing housing 365 (or equivalently relative to the support component 366) around the axis of the shaft 364. The shaft 357*a* is configured to be inserted into the curved hole 358*a* of the gripping device 259*a*, so that a movement of the shaft 357*a* may induce a rotation in the gripping device 259*a* around the axis of the shaft 361*a*. Similarly, the shaft 357*b* is configured to be inserted into the curved hole 358*b* of the gripping device 259*b*, so that a movement of the shaft 357*b* may induce a rotation in the gripping device 259*b* around the axis of the shaft 361*b*.

The cap gripping mechanism 302 also comprises a motor 80G comprising a shaft and a base component, targets 368*a* and 368*b*, and a proximity switch 90J. The base component of the motor 80G is fixedly connected to the support component 366 and the shaft of the motor 80G is fixedly connected to the shaft 364. When the motor 80G drives a rotation of the shaft 364, the shafts 357*a* and 357*b* are rotated around the axis of the shaft 364. The movements of the shafts 357*a* and 357*b* induce the gripping devices 259*a* and 259*b* to be simultaneously rotated toward or away from a vertical axis (referred to as the central axis of the cap gripping mechanism 302) so as to grip or release a cap of a capped container 109. The targets 368*a* and 368*b* are configured to be rigidly attached to the connector 363. The proximity switch 90J is configured to be fixedly connected to the support component 366. The proximity switch 90J is configured to monitor the targets 368*a* and 368*b* when the targets are rotated with the connector 363.

As shown in FIG. 14B, the motor 80G is connected to the computer 901 via wires 82G. The computer 901 is configured to dynamically control the timing and/or speed of the motor 80G. The proximity switch 90J is also connected to the computer 901 via wires 92J, so that the computer 901 may receive signals from the proximity switch 90J. The computer 901 may also send signals to the motor 80G to control the degree of rotation of the motor 80G. When the gripping devices 259*a* and 259*b* are rotated toward the said central axis to a first position where the proximity switch 90J senses the target 368*a*, the gripping devices 259*a* and 259*b* are configured to grip a cap 108. At the same time, the signals of the proximity switch 90J are sent to the computer 901, so that the computer 901 can figure out the position of the target 368*a*, and the position of the gripping devices 259*a* and 259*b*. Similarly, when the gripping devices 259*a* and 259*b* are rotated away from the said central axis to a second position where the proximity switch 90J senses the targets 368*b*, the gripping devices 259*a* and 259*b* are configured to release the cap 108. At the same time, the signals of the proximity switch 90J are sent to the computer 901. The computer 901 can figure out the position of the target 368*b*, and the position of the gripping devices 259*a* and 259*b*. Each time the gripping devices 259*a* and 259*b* are moved to the first position or second position, the motor 80G, under the control of the computer 901, is stopped for a time during which the cap gripping mechanism 302 completes a corresponding process. After this time, the motor 80G, under the control of the computer 901, may restart again and make a reverse rotation to rotate the gripping devices 259*a* and 259*b* to the second position or respectively the first position. Using the information sent by the proximity switch 90J, the computer 901 may accurately control the motion of the gripping devices 259*a* and 259*b* so as to grip or release a cap 108 or a capped container 109.

Figure 15A:
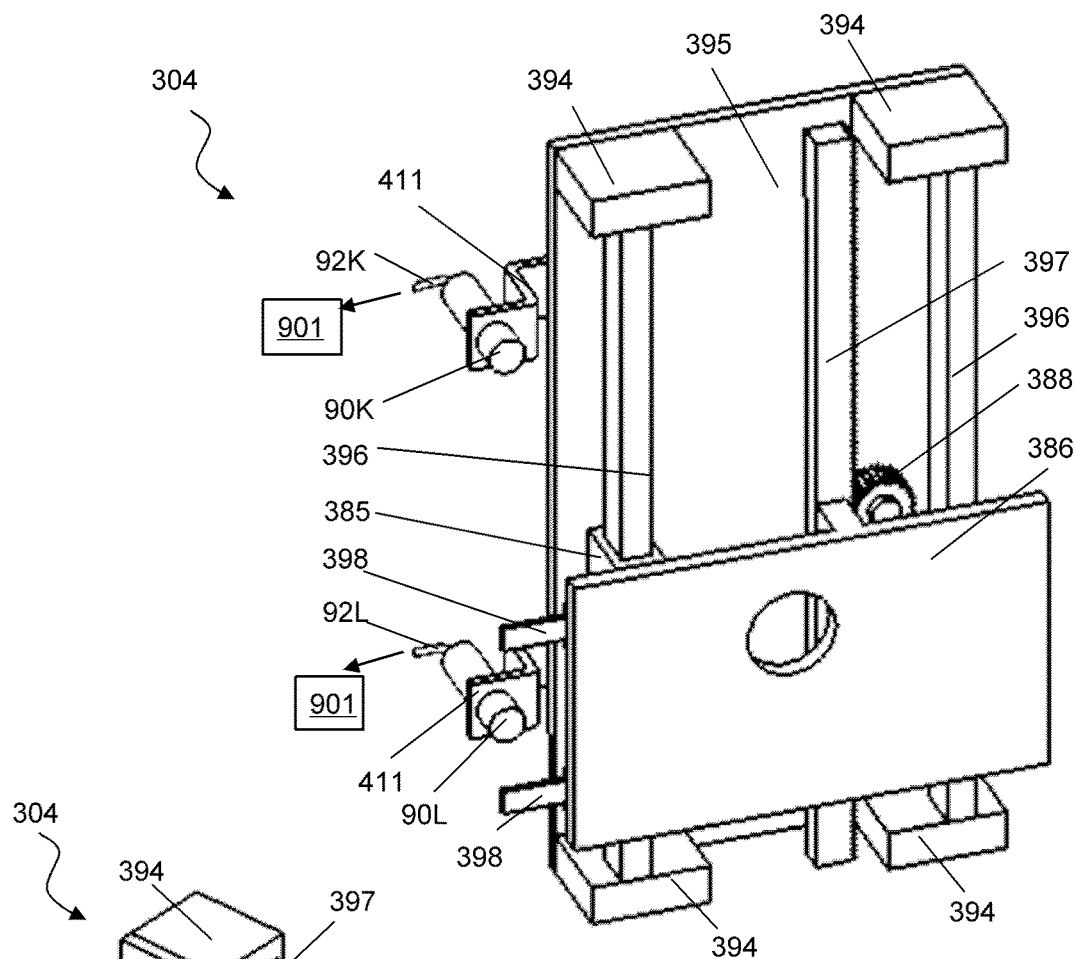
FIGS. 15A-15B show aerial views of a vertical motion mechanism.
Figure 15B:
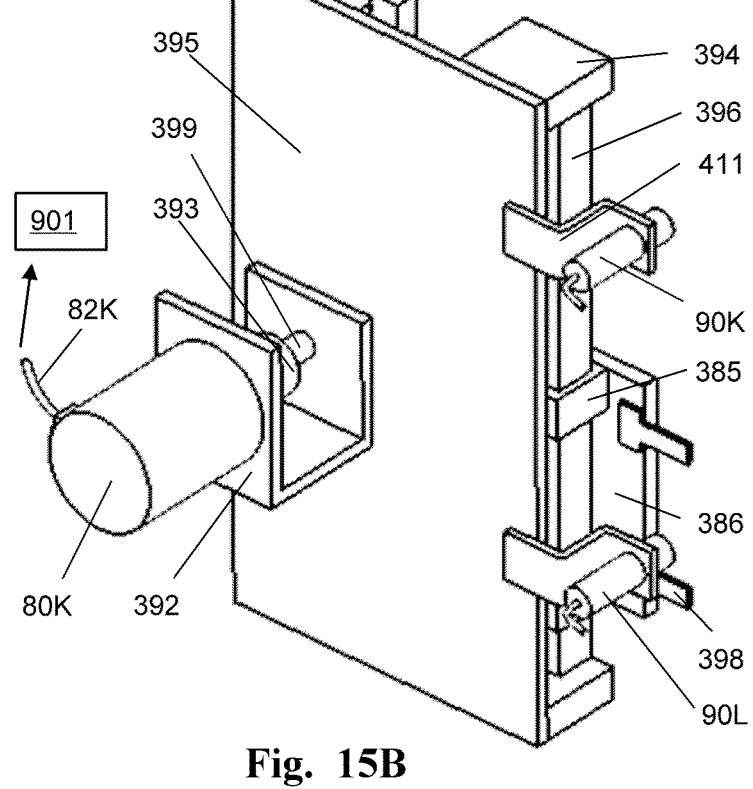

Referring to FIGS. 15A-15B, a vertical motion mechanism 304 comprises a support component 395 in the shape of a board, a pair of rails 396 both of which are configured to be positioned vertically, and four connectors 394. Each pair of the connectors 394 are configured to rigidly connect the ends of a corresponding rail 396 to the support component 395. The vertical motion mechanism 304 also comprises a support component 386 in the shape of a board, and four sliders 385 which are fixedly connected to the support component 386. Each pair of the four sliders 385 are engaged with a rail 396, so that the sliders 385 are constrained to slide linearly relative to the corresponding rails 396. Thus, the support component 386 is constrained to slide linearly relative to the rails 396. The vertical motion mechanism 304 also comprises a gear 388, a shaft 399 with a horizontal axis, a rack 397 configured to be fixedly connected to the support component 386 and parallel to the pair of rails 396, a motor 80K comprising a shaft and a base component, and a connecting component 392 configured to connect the base component of the motor 80K and the support component 395. The gear 388 is configured to be fixedly connected to the shaft 399, and the axis of the gear 388 is the same as axis of the shaft 399. The shaft of the motor 80K is fixedly connected to the shaft 399 via a coupling 393, so that the motor 80K may drive a rotation of the shaft 399 around the axis of the shaft 399, hence the gear 388 is rotated around the axis of the shaft 399. Since the gear 388 is engaged with the rack 397, when the motor 80K drives a rotation of the gear 388, the rack 397 moves linearly relative to the support component 395 in the vertical direction. Thus, the support component 386 is configured to be constrained to move linearly relative to the support component 395 in the vertical direction.

The vertical motion mechanism 304 also comprises two proximity switches 90K and 90L, two connectors 411 each of which is configured to connect the proximity switches 90K and 90L to the support component 395, and two targets 398 both of which are rigidly attached to the support component 386 wherein one of the targets 398 is configured to be positioned higher than the other. The proximity switch 90K (or 90L) monitors the upper target 398 (or respectively the lower target 398) when the targets are slid with the support component 386. As shown in FIGS. 15A-15B, the motor 80K is connected to the computer 901 via wires 82K. The computer 901 is configured to dynamically control the timing and/or speed of the motor 80K. The proximity switches 90K and 90L are also connected to the computer 901 via wires 92K and 92L, so that the computer 901 may receive signals from the proximity switches 90K and 90L. The computer 901 may also send signals to the motor 80K to control the degree of rotation of the motor 80K. When the support component 386 is moved to a first position, the proximity switch 90K can sense the upper target 398, and signals of the proximity switch 90K are sent to the computer 901. The computer 901 can figure out the position of the target, and the position of the support component 386. Similarly, when the support component 386 is moved to a second position, the proximity switch 90L can sense the lower target 398, and signals of the proximity switch 90L are sent to the computer 901, the computer 901 can figure out the position of the target, and the position of the support component 386. Each time the support component 386 is slid to the first or second position, the computer 901 sends electric and electronic signals to the motor 80K to stop the motor 80K at the position for a time period during which the vertical motion mechanism 304 is configured to complete a cap opening process (to be described below). After this time period, the motor 80K, under the control of the computer 901, may restart and make a reverse rotation to move the support component 386 to the second position or respectively the first position.

Figure 16:
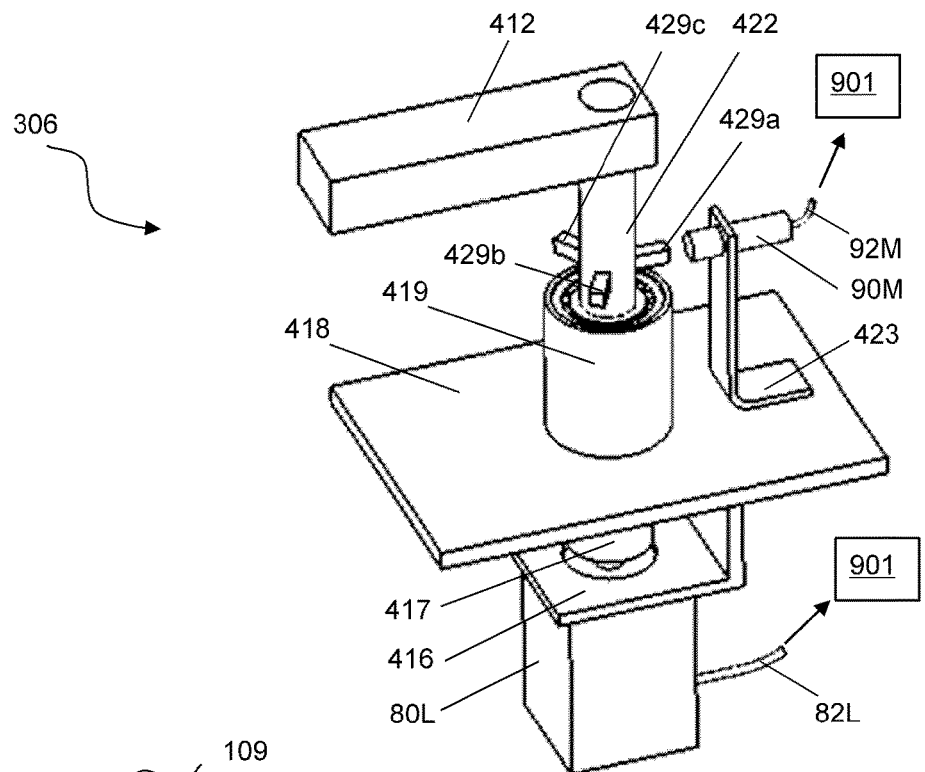
FIG. 16 shows an aerial view of a horizontal motion mechanism.

Referring to FIG. 16, a horizontal motion mechanism 306 comprises a support component 418 in the shape of a board, a bearing housing 419 rigidly connected to the support component 418, a shaft 422 with a vertical axis, a connector 412 rigidly connected to the shaft 422, a motor 80L comprising a shaft and a base component, and a connecting component 416. The shaft 422 is configured to be constrained to rotate relative to the bearing housing 419 (or equivalently, relative to the support component 418) around the axis of the shaft 422. The base component of the motor 80L is mounted on the connecting component 416, and the connecting component 416 is configured to be fixedly connected to the support component 418. The shaft of the motor 80L is fixedly connected to the shaft 422 by a coupling 417, so that the motor 80L may drive a rotation of the shaft 422 relative to the support component 418 around the axis of the shaft 422, and hence the connector 412 is rotated relative to the support component 418 around the axis of the shaft 422.

The horizontal motion mechanism 306 also comprises: a proximity switch 90M with a horizontal axis; a connector 423 configured to connect the proximity switch 90M to the support component 418; and three targets 429*a*, 429*b* or 429*c* all of which are configured to be rigidly connected to the shaft 422. The proximity switch 90M is configured to monitor the targets 429*a*, 429*b* and 429*c* when the targets are rotated with the shaft 422. As shown in FIG. 16, the motor 80L is connected to the computer 901 via wires 82L. The computer 901 is configured to dynamically control the timing and/or speed of the motor 80L. The proximity switch 90M is also connected to the computer 901 by a wire 92M, so that the computer 901 may receive signals from the proximity switch 90M. The computer 901 may also send signals to the motor 80L to control the degree of rotation of the motor 80L. When the shaft 422 is rotated to a first position (relative to the support component 418, same below), the proximity switch 90M can sense the target 429*a*, and signals from the proximity switch 90M are sent to the computer 901. The computer 901 can figure out the position of the target 429*a*, and the position of the connector 412. Similarly, when the shaft 422 is rotated to a second (or third) position, the proximity switch 90M can sense the target 429*b* (or respectively 429*c*), and signals from the proximity switch 90M are sent to the computer 901. The computer 901 can then figure out the position of the target 429*b*, and the position of the connector 412. Each time the shaft 422 is rotated to the first, second or third position, the motor 80L, under the control of the computer 901, is stopped for a time during which the horizontal motion mechanism 306 is configured to complete a corresponding process. After this time, the motor 80G, under the control of the computer 901, may restart again to rotate the shaft 422 to the next position.

Figure 17:
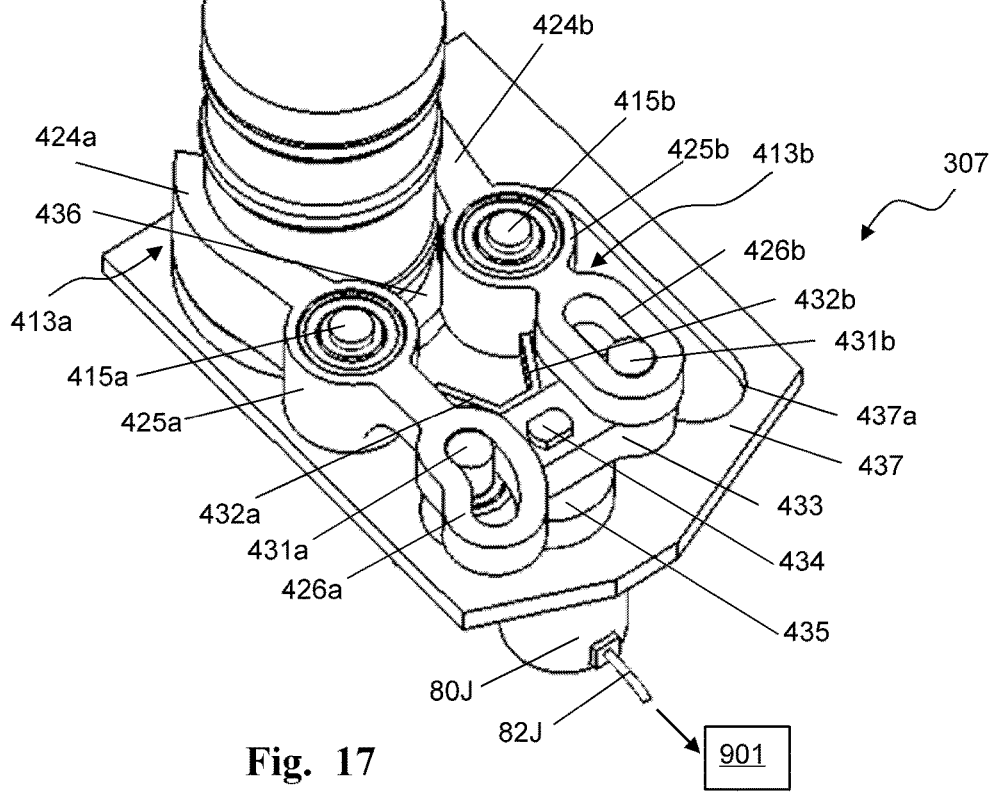
FIG. 17 shows an aerial view of a container gripping mechanism.
Figure 18:
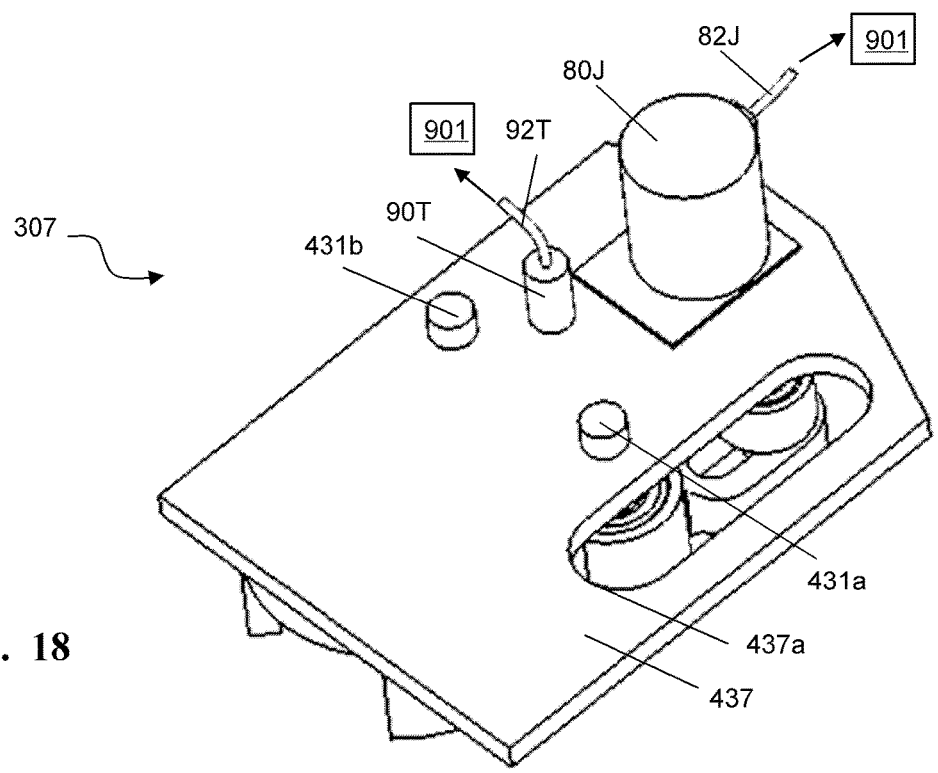
FIG. 18 shows an aerial view of the container gripping mechanism.

Referring to FIGS. 17-18, a container gripping mechanism 307 comprises: a support component 437 comprising a slotted hole 437*a*; two gripping devices 413*a* and 413*b*; and two shafts 415*a* and 415*b* each of which comprises a vertical axis. The gripping device 413*a* (or 413*b*) comprises a curved hole 426*a* (or respectively 426*b*), a bearing housing 425*a* (or respectively 425*b*), and a gripper 424*a* (or respectively 424*b*). A part of the surface of the gripper 424*a* (or 424*b*) is in the shape of a part of a cylindrical surface. Each of the gripping devices 413*a* and 413*b* also comprises a rubber (or silica gel, or other similar elastic material) which is attached to the gripper 424*a* (or respectively, 424*b*). Both shafts 415*a* and 415*b* are rigidly connected to the support component 437. The bearing housing 425*a* of the gripping device 413*a* is constrained to rotate relative to the shaft 415*a* (or equivalently, relative to the support component 437) around the axis of the shaft 415*a*. Similarly, the bearing housing 425*b* of the gripping device 413*b* is constrained to rotate relative to the shaft 415*b* (or equivalently, relative to the support component 437) around the axis of the shaft 415*b*. The gripping device 413*a* (or 413*b*) is configured to be a rigid component.

The container gripping mechanism 307 also comprises: shafts 431*a*, 431*b* and 434; a bearing housing 435; a holder 436 comprising a flat bottom and a ring-shaped wall with a vertical axis, wherein the holder 436 is configured to position the ingredient container 107 of a capped ingredient container 109 in such a way that the axis of the ingredient container 107 coincides or nearly coincides with the axis of the ring-shaped wall, wherein the axis of the ring-shaped wall is referred to as the axis of the holder 436; and a connector 433 configured to rigidly connect the shafts 431*a*, 431*b* and 434, wherein the axes of the shafts 431*a*, 431*b* and 434 are configured to be vertical; wherein the bearing housing 435 is rigidly connected to the support component 437. A pair of bearings are configured to connect the shaft 434 and the bearing housing 435, so that the shaft 434 is constrained to rotate relative to the bearing housing 435 (or equivalently relative to the support component 437) around the axis of the shaft 434, hence that the connector 433, the shaft 431*a* and 431*b* are constrained to rotate relative to the bearing housing 435 (or equivalently relative to the support component 437) around the axis of the shaft 434. The shaft 431*a* is configured to be inserted into and be constrained by the curved hole 426*a* of the gripping device 413*a*, so that a movement of the shaft 431*a* may induce a rotation in the gripping device 413*a* around the axis of the shaft 415*a*. Similarly, the shaft 431*b* is configured to be inserted into and be constrained by the curved hole 426*b* of the gripping device 413*b*, so that a movement of the shaft 431*b* may induce a rotation in the gripping device 413*b* around the axis of the shaft 415*b*. The holder 436 is configured to be rigidly connected to the support component 437.

The container gripping mechanism 307 also comprises: a motor 80J comprising a shaft and a base component; targets 432*a* and 432*b*; and a proximity switch 90T. The base component of the motor 80J is fixedly connected to the support component 437 and the shaft of the motor 80J is fixedly connected to the shaft 434. When the motor 80J drives a rotation of the shaft 434, the shafts 431*a* and 431*b* are rotated around the axis of the shaft 434. The movement of the shafts 431*a* and 431*b* induces simultaneous rotations in the gripping devices 413*a* and 413*b* toward or away from the axis of the holder 436 (referred to as the central axis of the container gripping mechanism 307) so as to grip or release a container 107 or a capped container 109 which is placed on the holder 436. The targets 432*a* and 432*b* are configured to rigidly attach to the connector 433. The proximity switch 90T is configured to fixedly connect to the support component 437. The proximity switch 90T is configured to monitor the targets 432*a* and 432*b* when the targets are rotated with the connector 433.

As shown in FIG. 18, the motor 80J is connected to the computer 901 via wires 82J. The computer 901 is configured to dynamically control the timing and/or speed of the motor 80J. The proximity switch 90T is connected to the computer 901 via wires 92T, so that the computer 901 may receive signals from the proximity switch 90T. The computer 901 may also send signals to the motor 80J as to control the degree of rotation of the motor 80J. When the gripping devices 413a and 413b are rotated toward the central axis of the container gripping mechanism 307 to a first position where the proximity switch 90T senses the target 432a, the gripping devices 413a and 413b are configured to grip a container 107. At the same time, the signals of the proximity switch 90T are sent to the computer 901, the computer 901 can figure out the position of the target 432a, and the position of the gripping devices 413a and 413b. Similarly, when the gripping devices 413a and 413b are rotated away from the said central axis to a second position where the proximity switch 90T senses the targets 432b, the gripping devices 413a and 413b are configured to be moved away from the container 107. At the same time, the signals of the proximity switch 90T are sent to the computer 901. The computer 901 can figure out the position of the target 432b, and the position of the gripping devices 413a and 413b.

Each time the gripping devices 413a and 413b are moved to the first or second position, the motor 80J, under the control of the computer 901, is stopped for a time period during which the container gripping mechanism 307 completes a cap opening process (to be described below). After this time, the motor 80J, under the control of the computer 901, may restart again and make a reverse rotation to rotate the gripping devices 413a and 413b to the second position or respectively the first position. Using the information sent by the proximity switch 90T, the computer 901 may accurately control the motion of the gripping devices 413a and 413b to grip or release a container 107 or a capped container 109.

Figure 19:
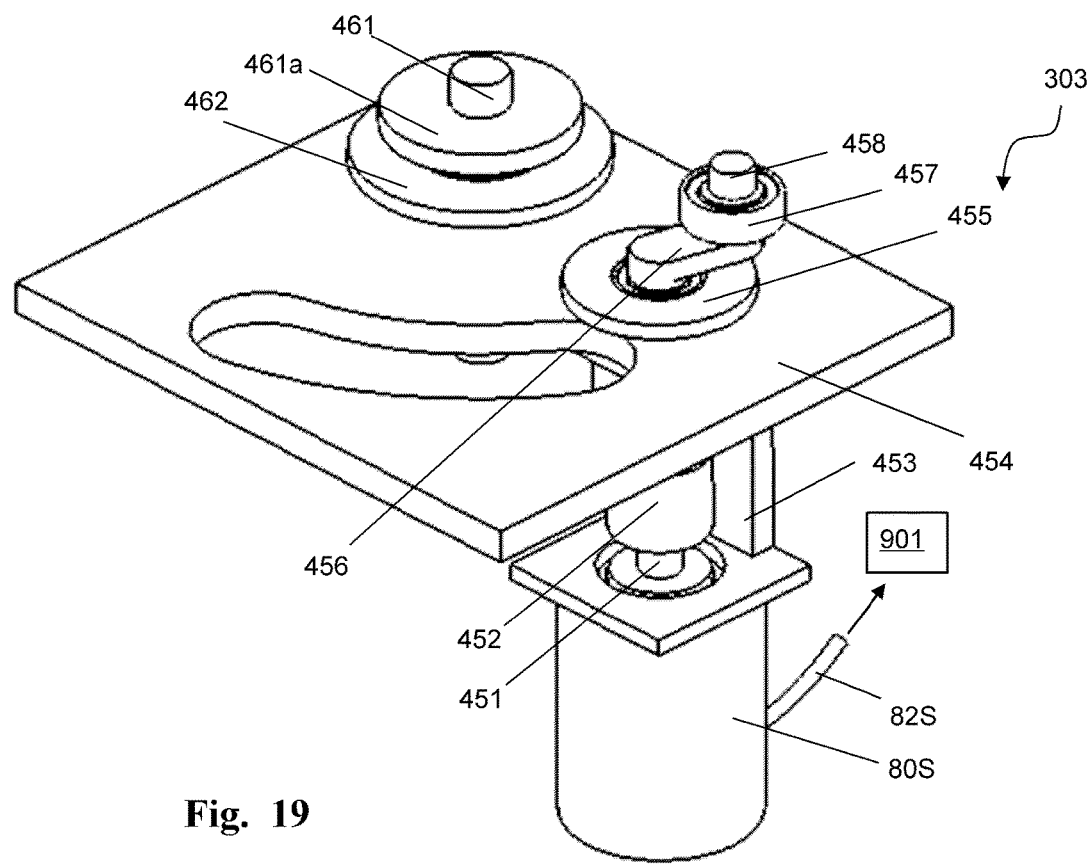
FIG. 19 shows an aerial view of a rotational motion mechanism.

Referring to FIG. 19, a rotational motion mechanism 303 comprises: a support component 454 in the shape of a board; bearing housings 455 and 462 both of which are rigidly connected to the support component 454; a shaft 461 comprising a flange 461a; a wheel 457; a shaft 451; and an eccentric shaft 458. A connector 456 is configured to rigidly connect the shafts 451 and 458. The wheel 457 is mounted on the eccentric shaft 458 so that the wheel 457 is constrained to rotate freely relative to the eccentric shaft 458, around the axis of the wheel, wherein the axis of the wheel 457 coincides with the axis of the eccentric shaft 458. A pair of bearings are configured to connect the shaft 451 and the bearing housing 455, so that the shaft 451 is constrained to rotate relative to the bearing housing 455 (or equivalently, relative to the support component 454), around the axis of the shaft 451, hence the eccentric shaft 458 and the wheel 457 are constrained to rotate relative to the bearing housing 455 (or equivalently, relative to the support component 454) around the axis of the shaft 451. Another pair of bearings are configured to connect the shaft 461 and the bearing housing 462, so that the shaft 461 is constrained to rotate relative to the bearing housing 462 (or equivalently, relative to the support component 454), around the axis of the shaft 461. The rotational motion mechanism 303 also comprises a motor 80S comprising a base component and a shaft, a connecting component 453, and a coupling 452. The base component of the motor 80S is rigidly connected to the support component 454 via the connecting component 453 and the shaft of the motor 80S is fixedly connected to the shaft 451 via the coupling 452, so that the motor 80S can drive a rotation of the shaft 451, the eccentric shaft 458 and the wheel 457 relative to the support component 454 around the axis of the shaft 451. As shown in FIG. 19, the motor 80S is connected to the computer 901 via wires 82S. The computer 901 is configured to dynamically control the timing and/or speed of the motor 80S.

Figure 20:
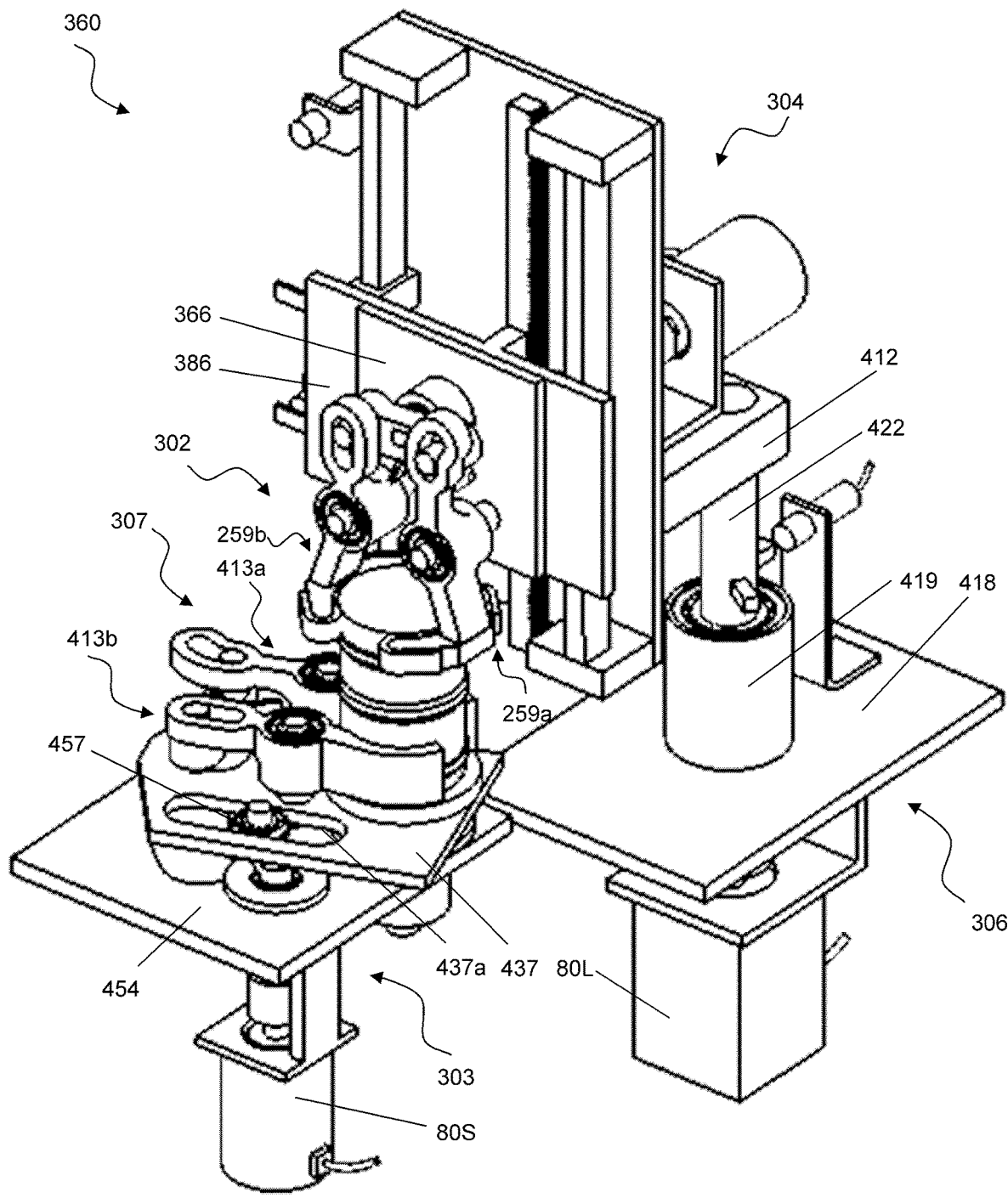
FIG. 20 shows an aerial view of a cap opening apparatus.
Figure 21:
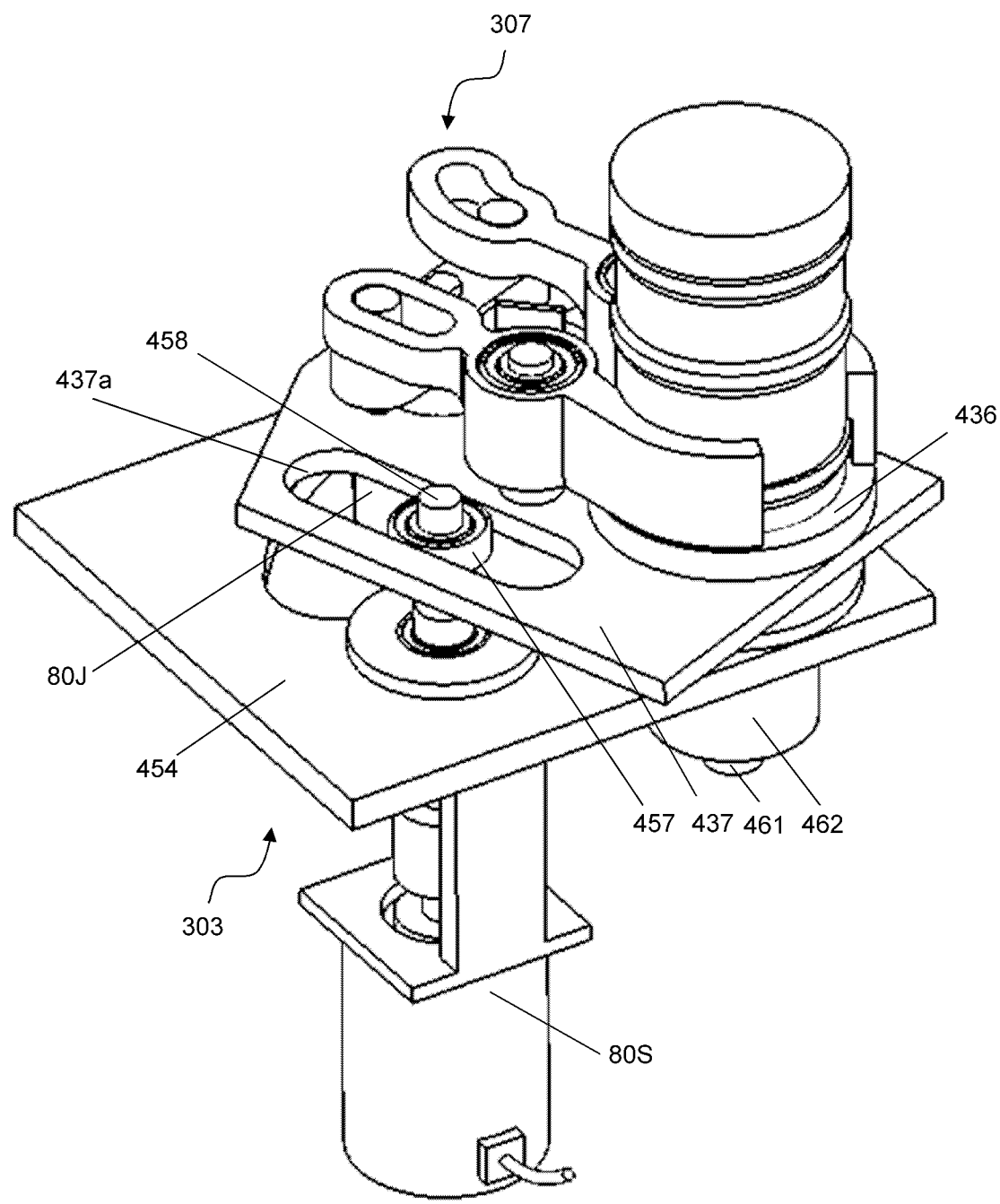
FIG. 21 shows an aerial view of parts of the cap opening apparatus.

Referring to FIGS. 20-21, a cap opening apparatus 360 comprises the cap gripping mechanism 302, the vertical motion mechanism 304, the horizontal motion mechanism 306, the container gripping mechanism 307 and the rotational motion mechanism 303. The support component 366 of the cap gripping mechanism 302 is configured to be rigidly connected to the support component 386 of the vertical motion mechanism 304. Thus, the support component 366 of the cap gripping mechanism 302 is constrained to move linearly in the vertical direction, relative to the support component 395 of the vertical motion mechanism 304 in a certain range, hence a cap 108 gripped by the cap gripping mechanism 302 is constrained to move linearly in the vertical direction relative to the support component 395. The connector 412 of the horizontal motion mechanism 306 is configured to be rigidly connected to the support component 395 of the vertical motion mechanism 304. Thus, under the control of the computer 901, the support component 395 of the vertical motion mechanism 304 can be rotated relative to the support component 418 around the axis of the shaft 422 to a first, second or third position corresponding to the first, second or third position of the shaft 422 of the horizontal motion mechanism 306, hence the support component 366 and the cap 108 gripped by the gripping devices 259a and 259b are rotated relative to the support component 418 around the axis of the shaft 422 to the first, second or third position. As shown in FIG. 21, the support component 437 of the container gripping mechanism 307 is configured to be fixedly connected to the flange 461a of the shaft 461 of the rotational motion mechanism 303, wherein the central axis the container gripping mechanism 307 is concentric with the axis of the shaft 461 of the rotational motion mechanism 303. Thus, the support component 437 is constrained to rotate relative to the support component 454 around the axis of the shaft 461 (or equivalently the central axis of the container gripping mechanism 307). The wheel 457 is configured to be positioned in the slotted hole 437a of the support component 437 of the container gripping mechanism 307, so that the rotation of the eccentric shaft 458 around the axis of the shaft 461 may induce an oscillatory rotation of the support component 437 of the container gripping mechanism 307 relative to the support component 454 around the axis of the shaft 461, hence the holder 436 and a container 107 gripped by the gripping devices 413a and 413b are rotated in an oscillating manner relative to the support component 454 around the axis of the shaft 461.

The support component 418 of the horizontal motion mechanism 306 and the support component 454 of the rotational motion mechanism 303 are configured to be rigidly connected to a support component by a connector which is hidden in the figures. Thus, the distance of the axis of the shaft 461 of the rotational motion mechanism 303 and the axis of the shaft 422 of the horizontal motion mechanism 306 is a constant. The support component 418 is referred to as the base component of the cap opening apparatus 360. When the connector 412 of the horizontal motion mechanism 306 is at the first position, the central axis of the cap gripping mechanism 302 is configured to coincide with the central axis of the container gripping mechanism 307. Under the control of the computer 901, the cap opening apparatus 360 can open a capped container 109 which is centrally placed on the holder 436, roughly in seven steps, as follows.

At step 1, the connector 412 of the horizontal motion mechanism 306 is rotated to the first position relative to the support component 418 as mentioned above.

At step 2, the support component 386 of the vertical motion mechanism 304 is moved down to the second position where the proximity switch 90L can sense the lower target 398 as described above, and at this position the cap opening apparatus 360 is configured so that the gripping devices 259a and 259b of the cap gripping mechanism 302, if rotated towards the central axis, can grip the cap 108 of the capped container 109.

At step 3, the gripping devices 259a and 259b of the cap gripping mechanism 302 are rotated towards the central axis to the position where the proximity switch 90J of the cap gripping mechanism 302 senses the target 368a so as to grip and hold the cap 108 of the capped container 109.

At step 4, the gripping devices 413a and 413b of the container gripping mechanism 307 are rotated towards the central axis of the container gripping mechanism 307 to the position where the proximity switch 90T senses the target 432a so as to grip and hold the container 107 of the capped container 109.

At step 5, the support component 386 is moved upward relative to the support component 395 in the vertical motion mechanism 304, as driven by the motor 80K. At the same time, the gripped container 107 and gripping devices 413a and 413b are constrained to make an oscillatory rotation relative to the support component 454 (or equivalently, relative to the cap 108 fixedly held by the gripping devices 259a and 259b) by the motor 80S, to make it easy open the cap 108 from the container 107.

At step 6, together with the gripped cap 108, the support component 386 of the vertical motion mechanism 304 is moved up to the said second position that the proximity switch 90K senses the upper target 398, as driven by the motor 80K.

At step 7, the connector 412 of the horizontal motion mechanism 306 is rotated from the first position to the second position wherein the proximity 90M senses the target 429b, as driven by the motor 80L. At this position, the gripped cap 108 can be ungripped by the gripping devices 259a and 259b, to be placed at a specific place (i.e., a container holder of a cyclic transport apparatus 800, to be disclosed below).

It should be noted that the motor 80L may be substituted by a motorized mechanism configured to drive an intermittent rotation of the shaft 422.

When the connector 412 of the horizontal motion mechanism 306 is rotated to the first position relative to the support component 418, and when the support component 386 of the vertical motion mechanism 304 is moved down to the second position relative to the support component 395, the support component 366 of the cap gripping mechanism 302 is said to be at a matching position with respect to the support component 454 of the rotational motion mechanism 303. It should be noted that the matching positions of the support component 366 is not unique, as the support component 366 can be rotated around the central axis relative to the support component 418, while in matching positions relative to the support component 418.

The central position for an ingredient container 107 or capped ingredient container 109 at the container gripping mechanism 307 will be referred to as a central position for the ingredient container 107 or respectively 109 at the cap opening apparatus 360. The cap opening apparatus 360 can uncap a capped ingredient container 109 placed on the central position.

The support component 366 will be referred to as a first support component of the cap opening apparatus 360; the support component 395 will be referred to as a second support component of the cap opening apparatus 360; and the support component 418 will be referred to as a third support component of the cap opening apparatus 360.

It should be noted that the cap opening apparatus 360 comprises: the cap gripping mechanism 302 comprising the first support component 366 configured to grip a cap 108 of a capped container 109; the container gripping mechanism 307 comprising the support component 437, the said container gripping mechanism 307 configured to grip a container 107 of a capped container 109; and a motion sub-apparatus configured to produce a relative motion between the support component 437 of the container griping mechanism 307 and the support component 366 of the cap gripping mechanism 302, wherein the said motion sub-apparatus comprises the following:

(1) the vertical motion mechanism 304 comprising the second support component 395, the vertical motion mechanism 304 referred to as a first motion mechanism, configured to produce a linear motion in the vertical direction in the first support component 366 of the cap gripping mechanism 302, relative to the second support component 395;

(2) the horizontal motion mechanism 306 comprising the third support component 418, the horizontal motion mechanism 306 referred to as a second motion mechanism, configured to produce a rotation around a vertical rotational axis, in the second support component 395 relative to the third support components 418;

(3) the rotational motion mechanism 303 comprising the support component 454, the said rotational motion mechanism 303 configured to drive an oscillatory rotation of the support component 437 of the container gripping mechanism 307 relative to the support component 454. It should be noted that the support component 454 is rigidly connected to the third support component 418. Thus, the rotational motion mechanism 303 produces a relative rotation between the third support component 418 and the support component 437 of the container gripping mechanism 307.

The rotational motion mechanism 303 is referred to as a third motion mechanism of the cap opening apparatus 360.

The cap opening apparatus 360 also comprises the proximity switches 90J, 90K, 90L, 90M, 90T, and other electrical or electronic devices (not shown in the figures), wherein the said sensors are connected via wires to the computer 901; wherein the said sensors are used to detect the degree of rotation of the shafts of the motors, the relative position of two components, etc., of cap opening apparatus 360 and then send signals to the computer 901 through the input/output ports. Thus the computer 901 can control the above described mechanisms and apparatuses, especially the timing and/or speed of the motors 80G in the cap gripping mechanism 302 so that the cap gripping mechanism 302 can accurately grip a cap 108; the timing and/or speed of the motors 80K of the vertical motion mechanism 304 so that sliding distance of the support component 366 of the cap gripping mechanism 302 relative to the support component 395 can be accurately controlled; the timing and/or speed of the motors 80L of the horizontal motion mechanism 306 so that the support component 366 as well as a gripped cap 108 can be accurately rotated from a special position to another special position; the timing and/or speed of the motor 80S of the rotational motion mechanism 303 so that the cap gripping mechanism 302 can easily open the cap 108 from the container 107; As a result, the process of opening a cap 108 from a capped container 109 by the cap opening apparatus 360 can be accurately controlled by the computer 901.

It should also be noted that the second motion mechanism in the motion sub-apparatus, as described in the previous paragraph, may be substituted by a motion mechanism configured to produce a linear movement or a curved sliding or other type of movement in the second support component 395 relative to the third support component 418.

Figure 22:
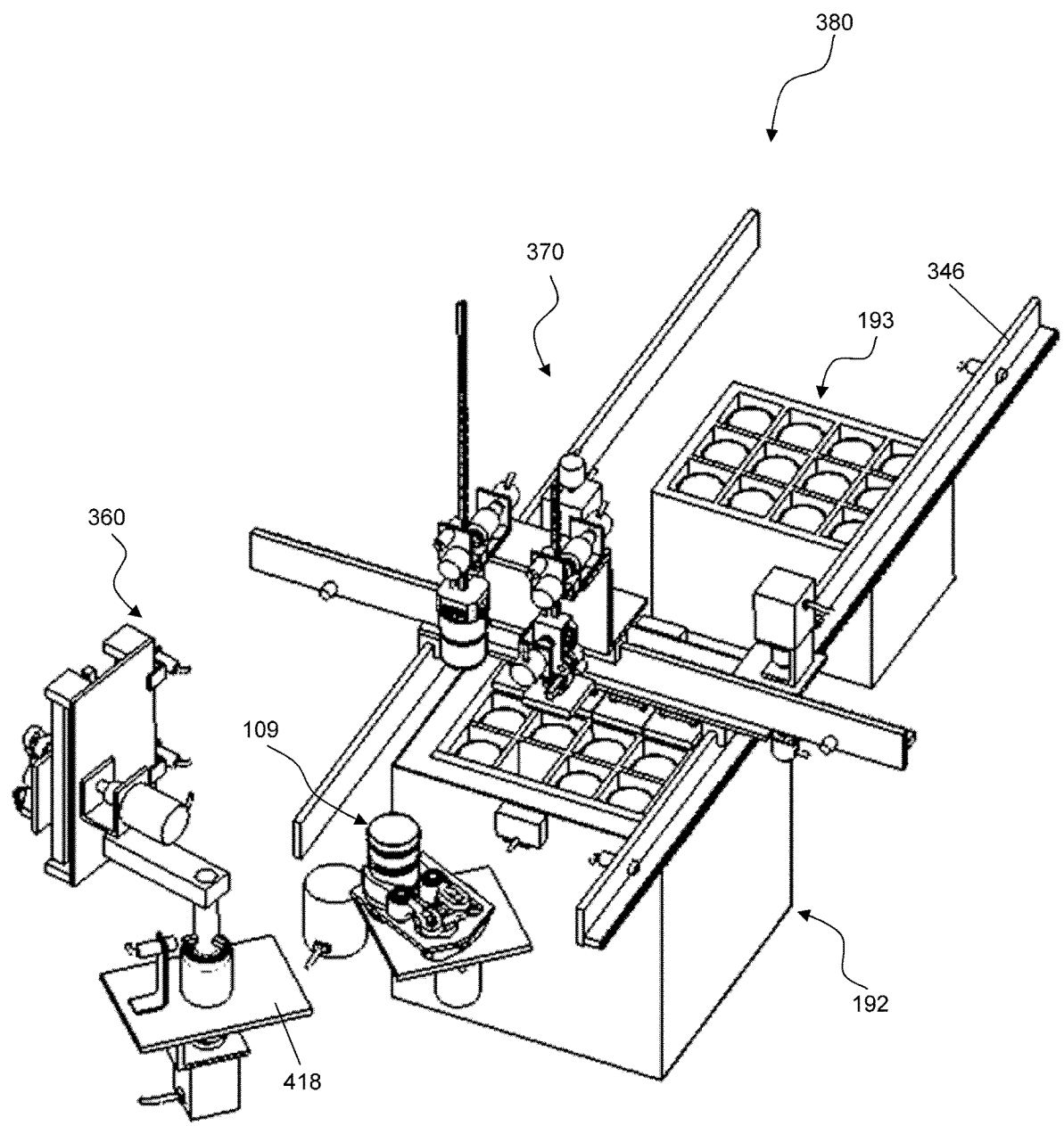
FIG. 22 shows an aerial view of a kitchen sub-system.

Referring to FIG. 22, a kitchen sub-system 380 comprises the first transfer system 370, and the cap opening apparatus 360. The rail 346 of the first transfer system 370 and the support component 418 of the cap opening apparatus 360 may be configured to be rigidly or fixedly connected to a support component, or to the ground, by known techniques, so that their positions are fixed with respect to each other. The holder 436 is configured to be positioned so that the first transfer system 370 may release a gripped capped container 109 on the holder 436, so that the axis of the released capped container 109 coincides with the central axis of the container gripping mechanism 307 of the cap opening apparatus 360. As explained before, the computer 901 may control the transfer apparatus 340 in the first transfer system 370 to transfer the highest positioned capped container 109 from any compartment of storage apparatus 192 to be placed atop the holder 436 of the cap opening apparatus 360. Once the capped container 109 is placed on the holder 436, the computer 901 may control the cap opening apparatus 360 to remove the cap 108 from the capped container 109 and move the cap 108 away (and the cap may be transferred by a further cap transfer apparatus to a transport box) according the steps as explained before.

Figure 23:
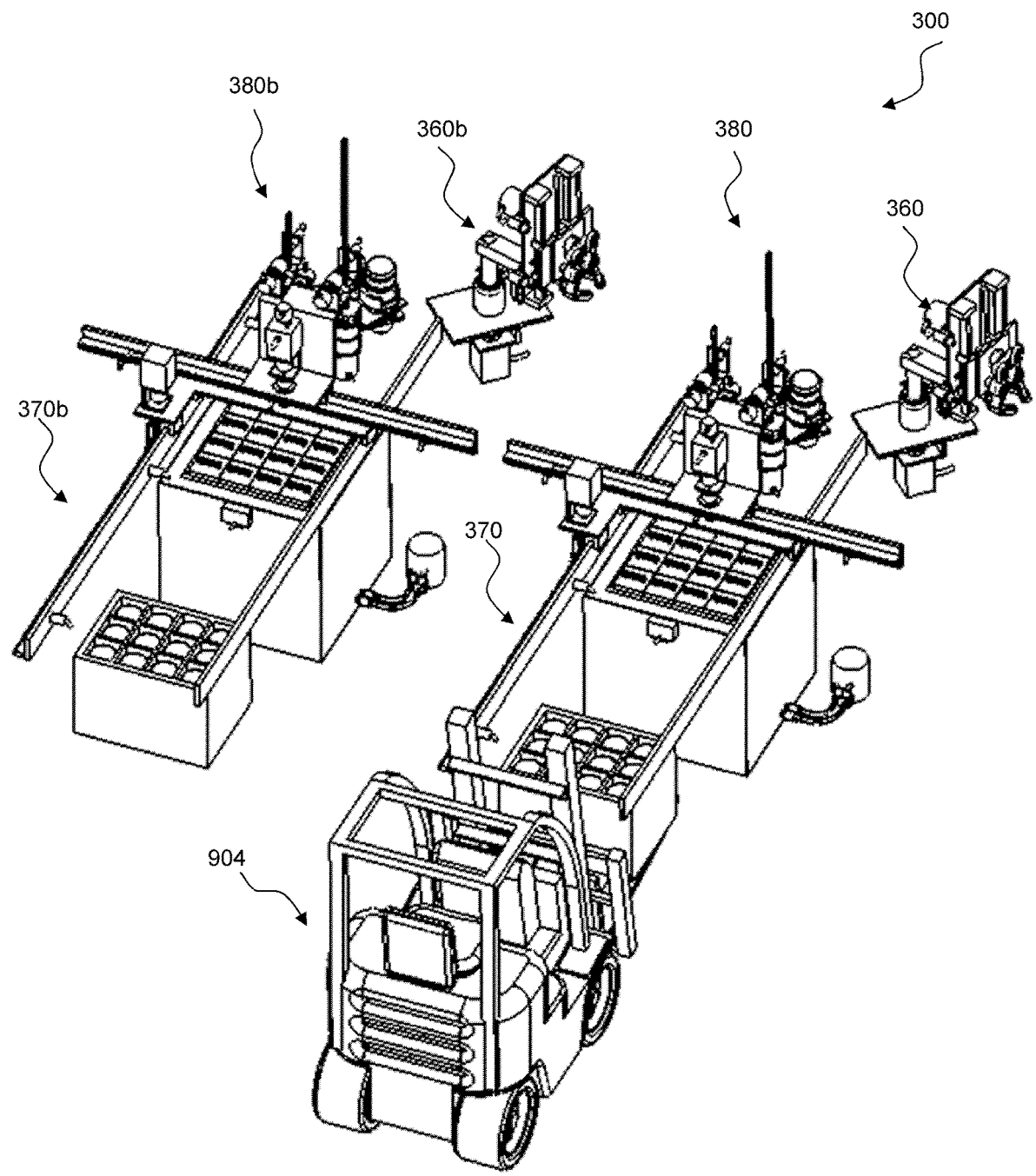
FIG. 23 shows an aerial view of a kitchen sub-system.

Referring to FIG. 23, a kitchen sub-system 300 comprises the kitchen sub-system 380, a kitchen sub-system 380b and the forklift 904; wherein the kitchen sub-system 380b is a kitchen sub-system which is configured in the same way as the kitchen sub-system 380 except that: (1) the capped containers 109 are substituted by capped containers of a different size, hereby denoted by the symbol 109b; and (2) the transport boxes 193 and storage apparatus 192 are substituted by transport boxes 193b and storage apparatus 192b which are configured to hold capped containers 109b. (Please note that the symbol "109b" is solely used for the textual description here, and does not appear in the figures.) The forklift 904 may also transfer a transport box 193b of the kitchen sub-system 380b which can contain a plurality of capped containers 109b, from and to the location of the kitchen sub-systems 380b.

Figure 24A:
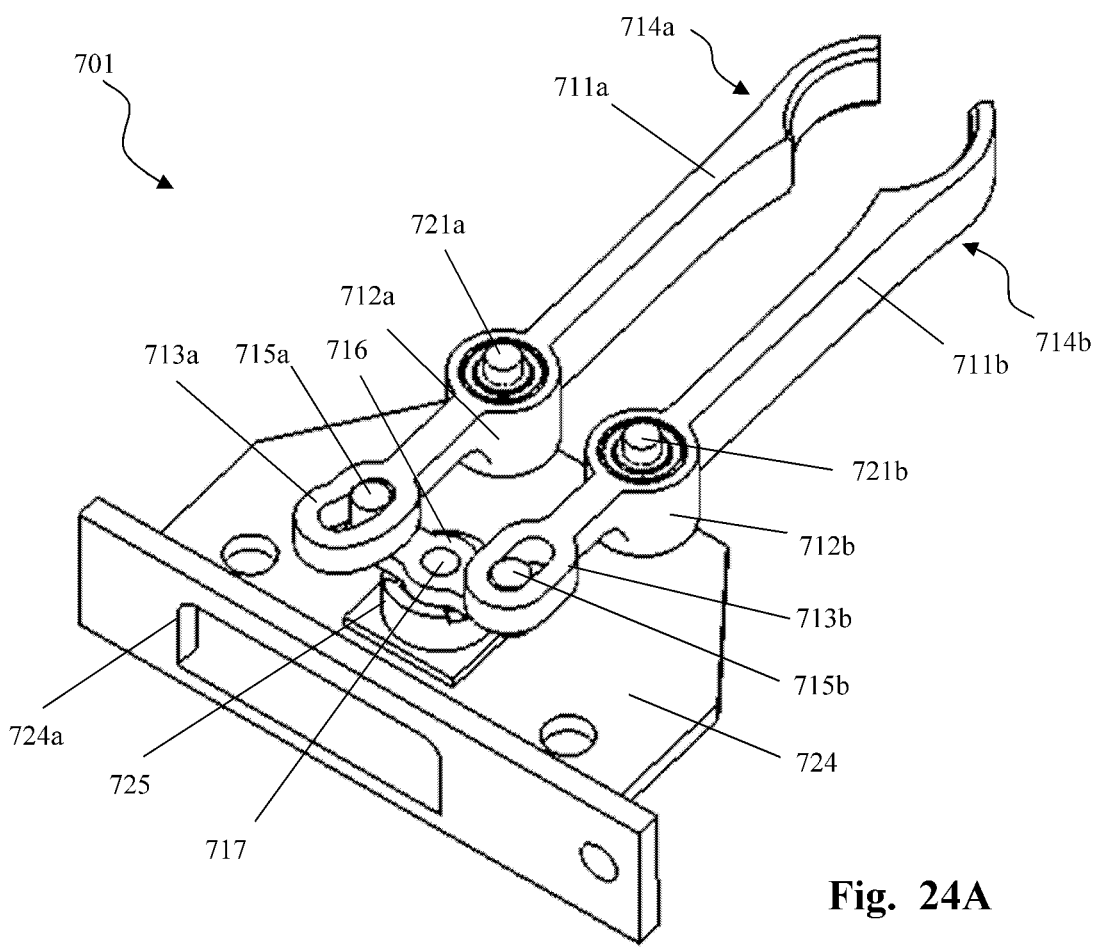
FIGS. 24A-24B show aerial views of a container gripping mechanism.
Figure 24B:
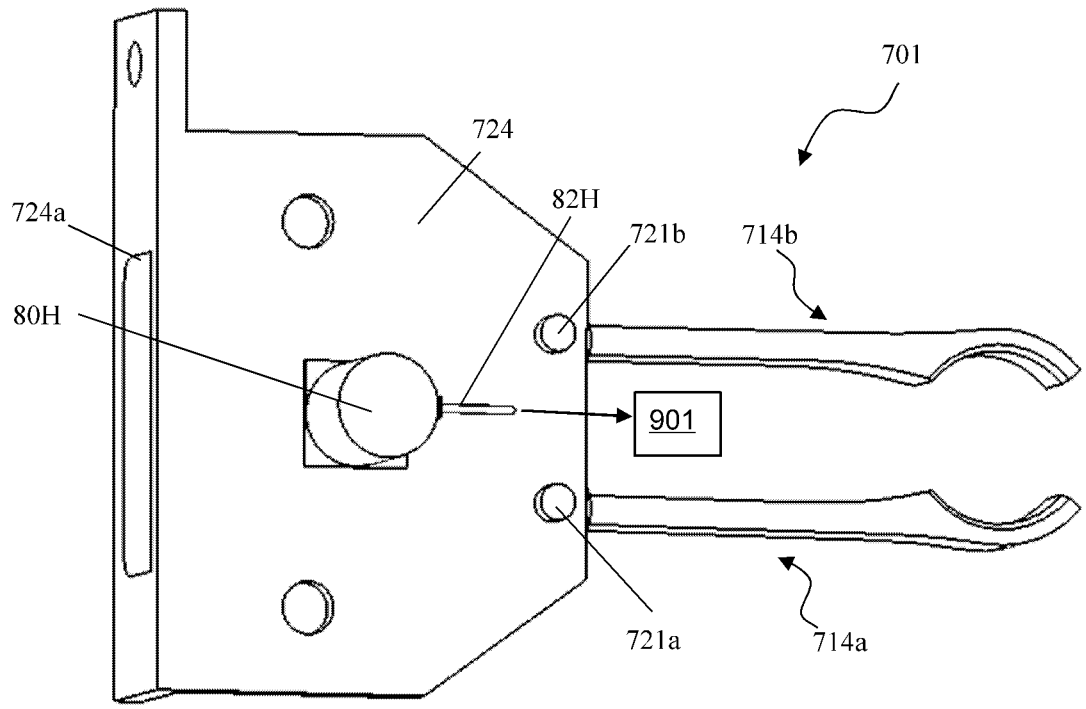

Referring to FIGS. 24A-24B, a container gripping mechanism 701 comprises gripping devices 714a and 714b, shafts 715a, 715b and 717, and a connector 716 configured to rigidly connect the shafts 715a, 715b and 717. The axes of the shafts 715a, 715b and 717 are configured to be vertical. The gripping device 714a or 714b comprises a curved hole 713a or respectively 713b, a bearing housing 712a or respectively 712b, a gripper 711a or respectively 711b, wherein the gripper 711a or 711b comprises a part of a cylindrical surface. The curved hole 713a and the gripper 711a are configured to be rigidly connected to the bearing housing 712a; and the curved hole 713b and the gripper 711b are configured to be rigidly connected to the bearing housing 712b. The gripping device 714a or 714b may comprise a rubber or silica gel or other elastic material which is attached to the cylindrical part of the gripper 711a or respectively 711b.

The container gripping mechanism 701 also comprises: shafts 721a and 721b; an L-shaped support component 724 comprising a vertical board and horizontal board, with a slotted hole 724a on the vertical board, wherein the slotted hole comprises a top horizontal surface and a bottom horizontal surface. The container gripping mechanism 701 further comprises a bearing housing 725 comprising a flange. The shafts 721a and 721b and the flange of the bearing housing 725 are all configured to be fixedly connected to the horizontal board of the support component 724; and the axes of the shafts 721a, 721b and the axis of the bearing housing 725 are configured to be vertical. The bearing housing 721a of the gripping device 714a is configured to be constrained to rotate relative to the shaft 721a around the axis of the shaft 721a. Similarly, the bearing housing 721b of the gripping device 714b is configured to be constrained to rotate relative to the shaft 721b around the axis of the shaft 721b. The shaft 717 is configured to be constrained to rotate relative to the bearing housing 725 around the axis of the bearing housing 725.

The container gripping mechanism 701 also comprises a motor 80H comprising a shaft and a base component, wherein the base component of the motor is configured to be fixedly connected to the support component 724. The shaft of the motor 80H is connected to the shaft 717, so that the motor 80H can drive a rotation of the shaft 717 relative to the bearing housing 725, or equivalently, relative to the support component 724 around the axis of the shaft 717. When the shaft 717 is rotated by the motor 80H, the connector 716 is also rotated relative to the bearing housing 725 around the axis of the shaft 717, and then the shafts 715a and 715b are rotated around the axis of the shaft 717. The shaft 715a is configured to be inserted into the curved hole 713a of the gripping device 714a, so that a movement of the shaft 715a may induce a rotation in the gripping device 714a around the axis of the shaft 721a. Similarly, the shaft 715b is configured to be inserted into the curved hole 713b of the gripping device 714b, so that a movement of the shaft 715b may induce a rotation in the gripping device 714b, around the axis of the shaft 721b. As the gripping devices 714a and 714b are rotated in one direction, the grippers 711a and 711b may grip and hold an ingredient container 107; and the grippers 711a and 711b may be rotated in the other direction to release a gripped ingredient container 107. In summary, the rotation produced by the motor 80H may induce rotations of the grippers 711a and 711b so as to grip or release an ingredient container 107. When an ingredient container 107 is gripped by the gripping devices 714a and 714b of the container gripping mechanism 701, the axis of the ingredient container 107 is configured to be vertical, and parallel to the axes of the shafts 721a and 721b. As shown in FIG. 24B, the motor 80H is connected to the computer 901 via wires 82H. The computer 901 is configured to dynamically control the timing and/or speed of the motor 80H. Thus, the computer 901 may send signals to the motor 80H to control the angle of rotation of the motor 80H, to accurately control the gripping device 714a and 714b to grip or release an ingredient container 107. The motor 80H may be a stepper motor or a servo motor.

Figure 24C:
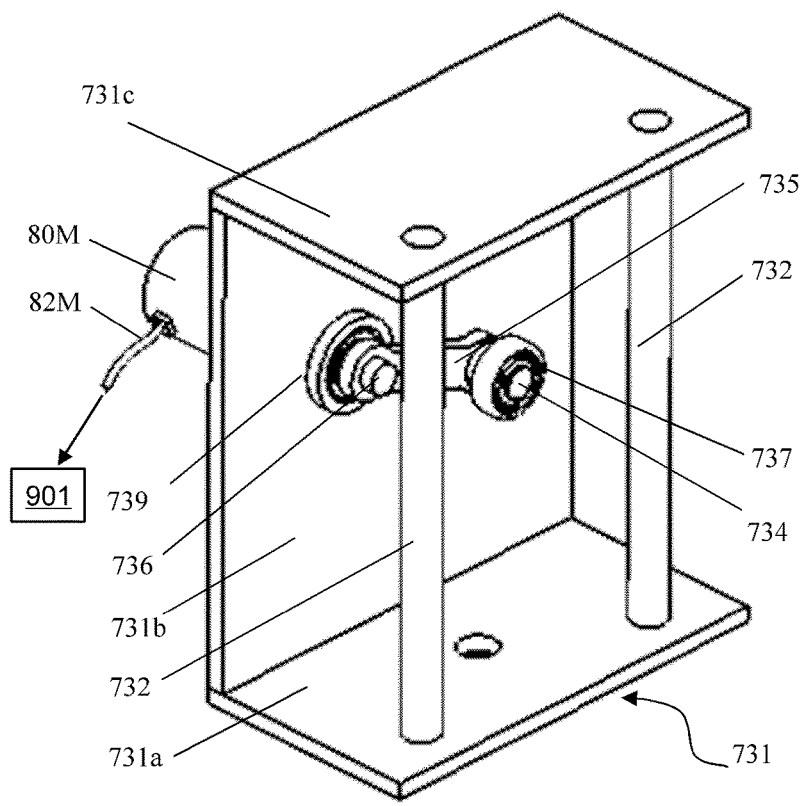
FIG. 24C shows an aerial view of parts of a transfer sub-mechanism.
Figure 24D:
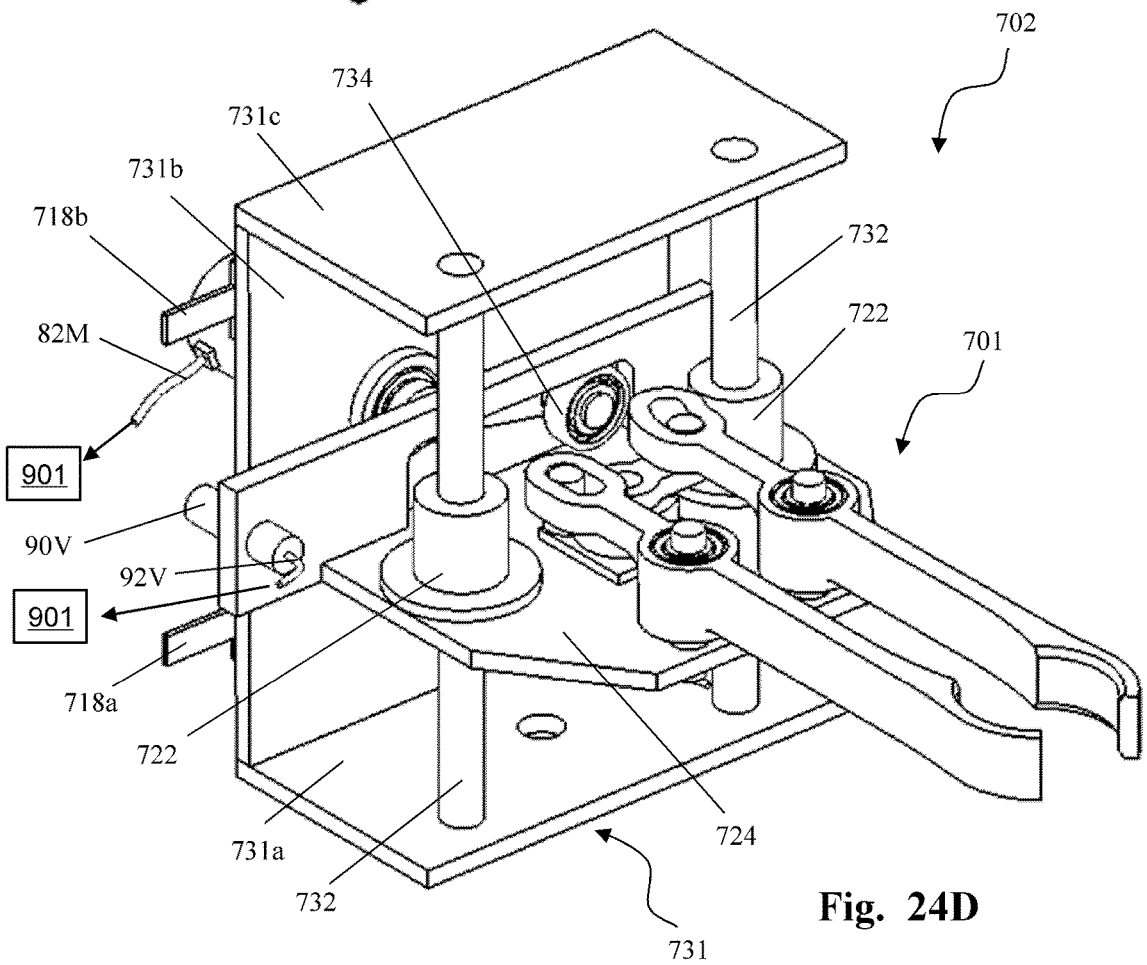
FIG. 24D shows an aerial view of the transfer sub-apparatus.

Referring to FIGS. 24C-24D, a transfer sub-mechanism 702 comprises: a pair of shafts 732; a support component 731 comprising a vertical board 731b and two horizontal boards 731a and 731c wherein the vertical board 731b is configured to rigidly connect the two horizontal boards 731a and 731c. Each shaft 732 is configured to be fixedly connected to the horizontal boards 731a and 731c, wherein the axes of the pair of shafts 732 are configured to be vertical. The transfer sub-mechanism 702 further comprises: a bearing housing 739 with a horizontal axis; two shafts 734 and 736; a connector 735 configured to fixedly connect the shaft 734 and 736; and a motor 80M comprising a base component and a shaft. The bearing housing 739 is configured to be rigidly or fixedly connected to the vertical board 731b of the support component 731. The shaft 736 is configured to be constrained to rotate relative to the bearing housing 739 around the axis of the shaft 736, hence the connector 735 and the shaft 734 are constrained to rotated relative to the bearing housing 739 around the axis of the shat 736. The axes of the two shafts 734 and 736 are configured to be horizontal and parallel to each other. A wheel 737 is mounted on the shaft 734 so that the wheel 737 is constrained to rotate freely relative to the shaft 734, around the axis of the wheel 737; wherein the axis of the wheel 737 coincides with the axis of the shaft 734. The base component of the motor 80M is fixedly connected to the vertical board 731*b*, and the shaft of the motor 80M is fixedly connected to the shaft 736. When the shaft 736 is rotated by the motor 80M, the connector 735, the shaft 734 and the axis of the wheel 737 are also rotated around the axis of the shaft 736.

The transfer sub-mechanism 702 further comprises the container gripping mechanism 701 (see FIG. 24D), two linear motion bearings 722 both of which comprise a vertical axis. The pair of the linear motion bearings 722 are both fixedly connected to the horizontal board of the support component 724 of the container gripping mechanism 701. Each linear motion bearing 722 is configured to be engaged with a corresponding shaft 732 so that the linear motion bearing 722 is constrained to slide along the corresponding shaft 732 along the axis of the shaft 732. Since the support component 724 is configured to be fixedly connected to the flanges connected to the outer shells of the linear motion bearings 722, the support component 724 of the container gripping mechanism 701 is configured to be constrained to slide vertically relative to the support component 731. On the other hand, the wheel 737 is configured to be positioned between the top horizontal surface and the bottom horizontal surface of the slotted hole 724*a* of the support component 724 of the container gripping mechanism 701, so that the rotation of the shaft 734 around the axis of the shaft 736 may induce a vertical linear movement of the support component 724 of the container gripping mechanism 701. The range of the vertical linear movement of the support component 724 can be equal to (or nearly equal to) two times the distance between the axes of the shafts 734 and 736.

The transfer sub-mechanism 702 also comprises a proximity switch 90V fixedly connected to the vertical board of the support component 724; and two targets 718*a* and 718*b*. Both targets 718*a* and 718*b* are configured to be rigidly or fixedly connected to the vertical board 731*b* of the support component 731, wherein the target 718*b* is positioned upper than the target 718*a*. The proximity switch 90V may monitor the target 718*a* or 718*b* when the targets are slid with the support component 724. As shown in FIG. 24C-24D, the motor 80M is connected to the computer 901 via wire 82M. The computer 901 is configured to dynamically control the timing and/or speed of the motor 80M. The proximity switch 90V is also connected to the computer 901 via wires 92V, so that the computer 901 may receive signals from the proximity switch 90V. The computer 901 may also send signals to the motor 80M as to control the degree of rotation of the motor 80M. When the support component 724 is moved to a first position where the proximity switch 90V senses the target 718*a*, the signals of the proximity switch 90V are sent to the computer 901. The computer 901 can figure out the position of the target 718*a*, and the position of the support component 724. Similarly, when the support component 724 is moved to a second position where the proximity switch 90V senses the target 718*b*, the signals of the proximity switch 90V are sent to the computer 901. The computer 901 can figure out the position of the target 718*b*, and the position of the support component 724. Each time the support component 724 is moved to the first or second position, the motor 80M under the control of the computer 901, is stopped for a time during which the transfer sub-mechanism 702 is configured to complete a corresponding process. After this time, the motor 80M, under the control of the computer 901, may restart again and make a reverse rotation to move the support component 724 to the second position or respectively the first position.

Figures 24E, 24F:
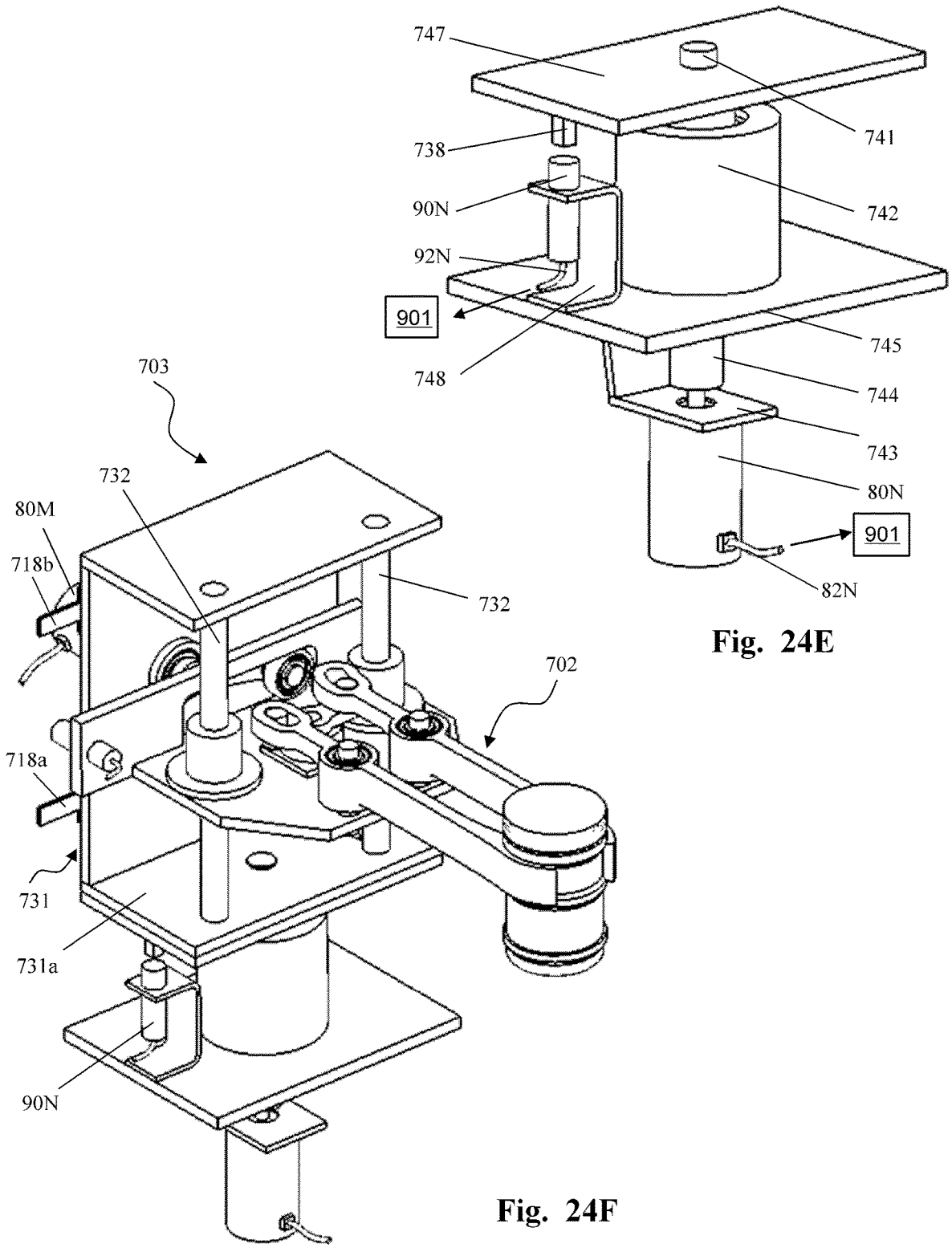
FIG. 24E shows an aerial view of a rotational mechanism.
FIG. 24F shows an aerial view of a transfer apparatus which comprises the transfer sub-mechanism and the rotational mechanism.

Referring to FIGS. 24E-24F, a transfer apparatus 703 comprises: the transfer sub-mechanism 702; a shaft 741 comprising a vertical axis; a rigid component 747 rigidly connected to the shaft 741; a support component 745 in the shape of a board; a bearing housing 742; a motor 80N comprising a shaft and a base component; a connecting component 743 configured to fixedly connect the base component of the motor 80N to the support component 745. The bearing housing 742 is configured to be rigidly connected to the support component 745 and the axis of the bearing housing 742 is configured to be vertical. The shaft 741 is configured to be constrained to rotate relative to the bearing housing 742, around the axis of the shaft 741. The horizontal board 731*a* of the support component 731 of the transfer sub-mechanism 702 is configured to be fixedly connected to the rigid component 747. Therefore, the support component 731 (or the transfer sub-mechanism 702) is configured to be constrained to rotate relative to the support component 745, around the axis of the shaft 741. The shaft of the motor 80N is fixedly connected to the shaft 741 via a coupling 744, so that the motor 80N may drive a rotation of the shaft 741 relative to the support component 745, around the axis of the shaft 741, hence the support component 731 is rotated relative to the support component 745 around the axis of the shaft 741.

The transfer apparatus 703 also comprises a proximity switch 90N, a connector 748 configured to connect the proximity switch 90N to the support component 745, and two targets 738 (one of which is hidden in the figure) both of which are configured to be rigidly connected to the rigid component 747. The proximity switch 90N may monitor the targets 738 when the targets are rotated with the rigid component 747. As shown in FIG. 24E-24F, the motor 80N is connected to the computer 901 via wires 82N. The computer 901 is configured to dynamically control the timing and/or speed of the motor 80N. The proximity switch 90N is also connected to the computer 901 via wires 92N, so that the computer 901 may receive signals from the proximity switch 90N. The computer 901 may also send signals to the motor 80N to control the degree of rotation of the motor 80N. When the rigid component 747 is rotated to a first position where the proximity switch 90N senses one of the targets 738, the signals of the proximity switch 90N are sent to the computer 901. The computer 901 can figure out the position of the target 738, and the position of the rigid component 747. Similarly, when the rigid component 747 is rotated to a second position where the proximity switch 90N senses the other target 738, the signals of the proximity switch 90N are sent to the computer 901. The computer 901 can figure out the position of the target 738, and the position of the rigid component 747. Each time the rigid component 747 is rotated to the first or second position, the motor 80N under the control of the computer 901 is stopped for a time during which the transfer apparatus 703 is configured to complete a corresponding process. After this time, the motor 80N, under the control of the computer 901, may restart again to rotate the rigid component 747 to the second position or respectively the first position.

It should be noted that the transfer apparatus 703 comprises the following:

(1) the container gripping mechanism 701 configured to grip or release a container 107, wherein the container gripping mechanism 701 comprises the support component 724, to be referred to as the base component of the container gripping mechanism 701, or the first support component of the transfer apparatus 703. The container gripping mechanism 701 also comprises two gripping devices 714a and 714b which are constrained to rotate relative to the first support component 724 by a motorized mechanism; and each gripping device comprise a gripper, wherein the grippers are configured to fit the ingredient container 107;

(2) the support component 731, referred to as a second support component of the transfer apparatus 703;

(3) the support component 745, referred to as a third support component, or the base component of the transfer apparatus 703;

(4) a vertical motion mechanism, referred to as a first motion mechanism, configured to produce a vertical linear motion in the first support component 724 relative to the second support component 731, wherein the first motion mechanism comprises the motor 80M, shafts 736 and 734, connector 735, bearing housing 739, slotted hole 724a, two parallel shafts 732, and two linear motion bearings 722, etc.; and their connections to each other, if any, and their connections to the other components of the transfer apparatus 703, if any;

(5) a rotational motion mechanism, referred to as a second motion mechanism, configured to produce a rotation of the second support component 731 relative to the third support component 745, around a vertical axis (i.e., the axis of the shaft 741), wherein the second motion mechanism comprises the motor 80N, connecting component 743, coupling 744, bearing housing 742, shaft 741, rigid component 747 etc.; and their connections with each other, if any, and their connections to the other components of the transfer apparatus 703, if any.

The distance between the axis of the shaft 741 and the axis of an ingredient container 107 is configured to be a constant, when the ingredient container 107 is gripped by the container gripping mechanism 701 of the transfer apparatus 703, as in FIG. 24F. The said constant is referred to as the radius of the transfer apparatus 703. The transfer apparatus 703 can be positioned to grip an ingredient container 107, when the axis of the ingredient container 107 is positioned vertically, and the distance from the axis of the ingredient container 107 to the axis of the shaft 741 is equal to the radius of the transfer apparatus 703, and when the height of the ingredient container 107 is within a certain limit. The transfer apparatus 703 may grip an ingredient container 107, and may move it linearly in vertical direction, or horizontally by a rotation around the axis of the shaft 741, or by a combination of both, and then it may release the ingredient container 107 at a position which is different from the previous position.

We note that the second motion mechanism of the transfer apparatus 703 may be substituted by a motion mechanism configured to move the second support component 731 relative to the third support component 745 by a horizontal translation, or more generally, by a horizontal planar motion.

The transfer apparatus 703 also comprises the proximity switches 90N, 90V and other electrical or electronic devices (not shown in the figures), wherein the said sensors are connected via wires to the computer 901; wherein the said sensors are used to detect the angle of rotation of the motors, the relative position of two components, etc., of the transfer apparatus 703 and send signals to the computer 901. Thus, the computer 901 can control the above described mechanisms and apparatuses.

Referring to FIG. 25A, a chain wheel sub-mechanism 810 comprises a bearing housing 813 comprising a flange, a shaft 817 with a vertical axis, two chain wheels 811 and a ring 812. The two chain wheels 811 are configured to be fixedly connected to the shaft 817 wherein the axes of the two chain wheels 811, and the axis of the shaft 817 are configured to be coincide. The ring 812 is on the shaft 817 and is positioned between the two chain wheels 811. The shaft 811 is configured to be constrained to rotate relative to the bearing housing 813 around the axis of the shaft 817, hence the two chain wheels 811 are constrained to rotate relative to the bearing housing 813 around the axis of the shaft 817.

Referring to FIG. 25B, a chain driving mechanism 801 comprises the chain wheel sub-mechanism 810, a support component 814 in the shape of a board, a motor 80P comprising a shaft and a base component, a connecting component 815 configured to fixedly connect the base component of the motor 80P to the support component 814. The flange of the bearing housing 813 of the chain wheel sub-mechanism 810 is configured to be fixedly connected to the support component 814. The shaft of the motor 80P is fixedly connected to the shaft 817 of the chain wheel sub-mechanism 810 via a coupling 816. Thus, the motor 80P may drive a rotation of the shaft 817 relative to the bearing housing 813 (or equivalently, relative to the support component 814) around the axis of the shaft 817, hence the two chain wheels 811 are rotated relative to the support component 814 around the axis of the shaft 817.

Referring to FIG. 25C, a chain wheel sub-mechanism 802 comprises the chain wheel sub-mechanism 810 and a support component 821 in the shape of a board. The flange of the bearing housing 813 of the chain wheel sub-mechanism 810 is configured to be fixedly connected to the support component 821. The shaft 817 as well as the two chain wheels 811 are configured to be constrained to rotate relative to the support component 821 around the axis of the shaft 817 wherein the axis of the shaft 817 is configured to be vertical.

Referring to FIG. 25D, a chain wheel sub-mechanism 803 comprises two chain wheel sub-mechanism 810 and a support component 822 in the shape of a board. The flange of the bearing housings 813 of the chain wheel sub-mechanisms 810 are configured to be fixedly connect to the support component 822. The shaft 817 as well as the two chain wheels 811 of each the chain wheel sub-mechanisms 810 are configured to be constrained to rotate to the support component 822 around the corresponding axis of the shaft 817. The shafts 817 of the chain wheel sub-mechanism 803 are configured to be vertical. The higher chain wheels 811 of the chain wheel sub-mechanisms 810 are configured to be positioned at the same height. Similarly, the lower chain wheels 811 of the chain wheel sub-mechanisms 810 are configured to be positioned at the same height.

Figure 26:
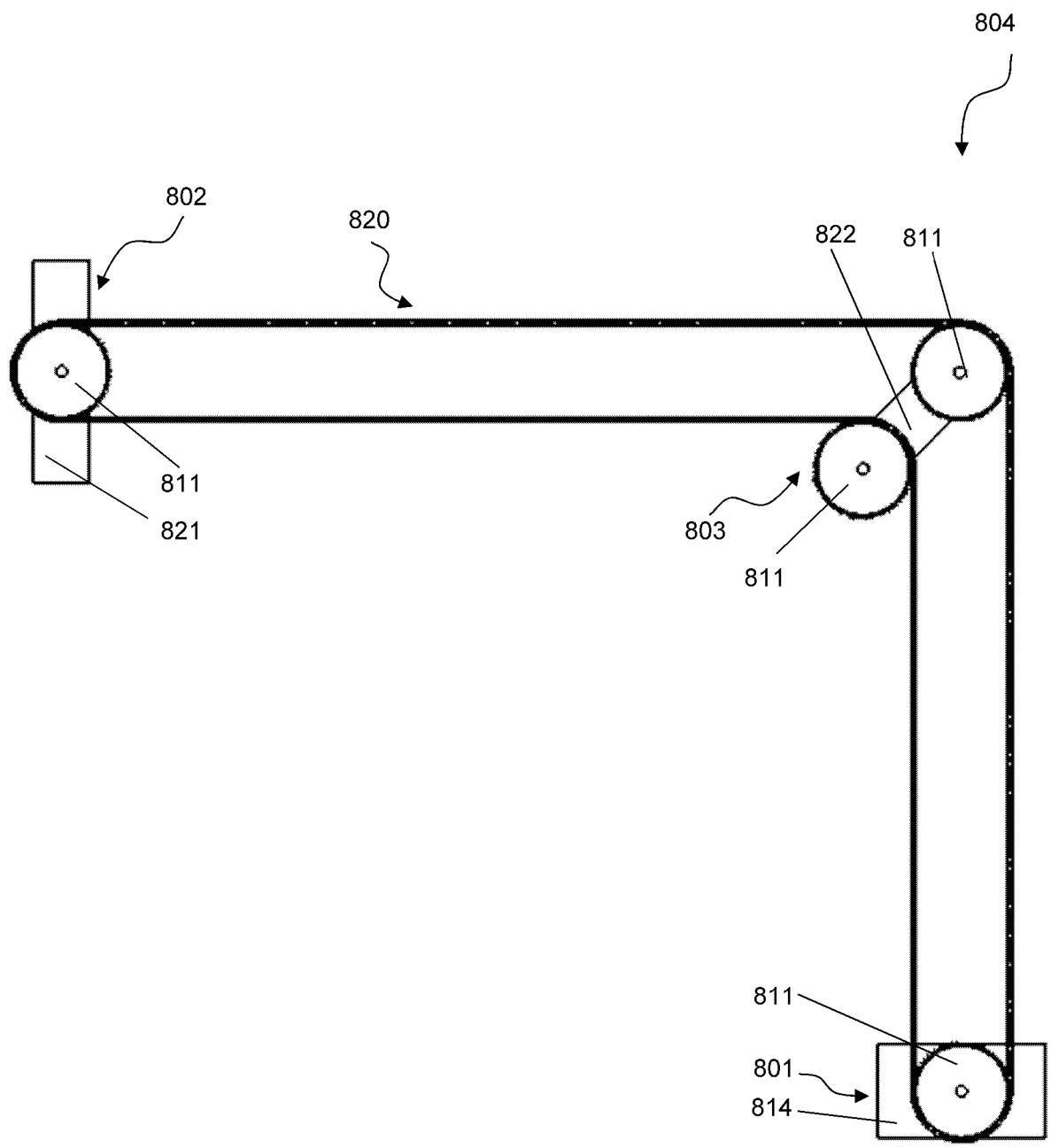
FIG. 26 shows a plane view of a chain apparatus.

Referring to FIG. 26, a chain apparatus 804 comprises the chain driving mechanism 801, the chain wheel sub-mechanism 802, the chain wheel sub-mechanism 803 and a pair of roller chains 820 which are configured to be parallel to each other. The support component 814 of the chain driving mechanism 801, the support component 821 of the chain wheel sub-mechanism 802 and the support component 822 of the chain wheel sub-mechanism 803 are configured to be rigidly or fixedly connected to a support component by known techniques. The higher chain wheels 811 of the chain driving mechanism 801, and that of the chain wheel sub-mechanisms 802 and 803 are configured to be positioned at the same height. Similarly, the lower chain wheels 811 of the chain driving mechanism 801, and that of the chain wheel sub-mechanisms 802 and 803 are configured to be positioned at the same height. One of the roller chains 820 is configured to be positioned above the other. The upper roller chain 820 is configured to be engaged with the upper chain wheels 811 of the chain apparatus 804. Similarly, the lower roller chain 820 is configured to be engaged with the lower chain wheels 811 of the chain apparatus 804. When the motor 80P drives rotations of the chain wheels 811 of the chain driving mechanism 801, the pair of roller chains 820 are configured to be moved synchronously and the chain wheel 811 of the chain wheel sub-mechanisms 802 and 803 are configured to be constrained to rotate around their corresponding axes.

It should be noted that a pair of tension chain wheels may be added to the chain apparatus 804, to stretch the roller chains 820, using known techniques.

Figure 27A:
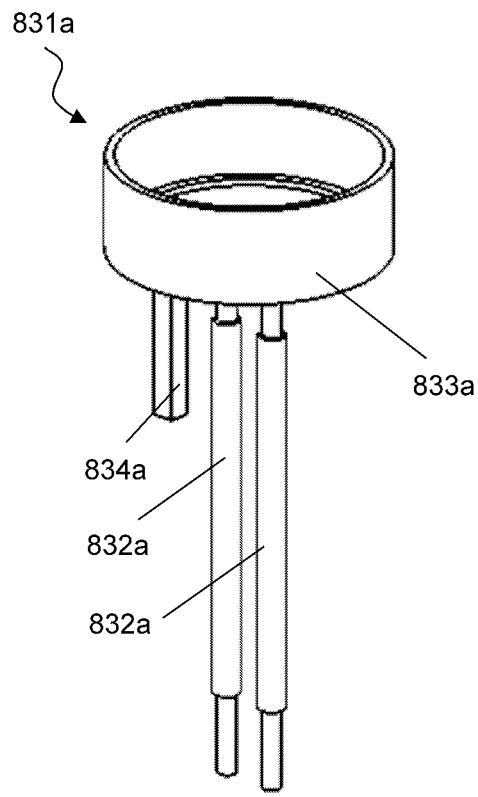
FIG. 27A shows an aerial view of a holding device.

Referring to FIG. 27A, a holding device 831a comprises a container holder 833a and two shafts 832a. The container holder 833a comprises a disk-shaped bottom and a cylindrical wall which are configured to be rigidly connected. The disk-shaped bottom of the container holder 833a is configured to be placed horizontally. The axis of the cylindrical wall is called the axis of container holder 833a, or the axis of the holding device 831a. The shafts 832a are configured to be fixedly connected to the bottom of the container holder 833a. The axes of the two shafts 832a and the axis of the container holder 833a are configured to be vertical. The holding device 831a also comprises a target 834a which is configured to be rigidly connected to the bottom of the container holder 833a. The container holder 833a is configured to position and hold an ingredient container 107.

Figure 27B:
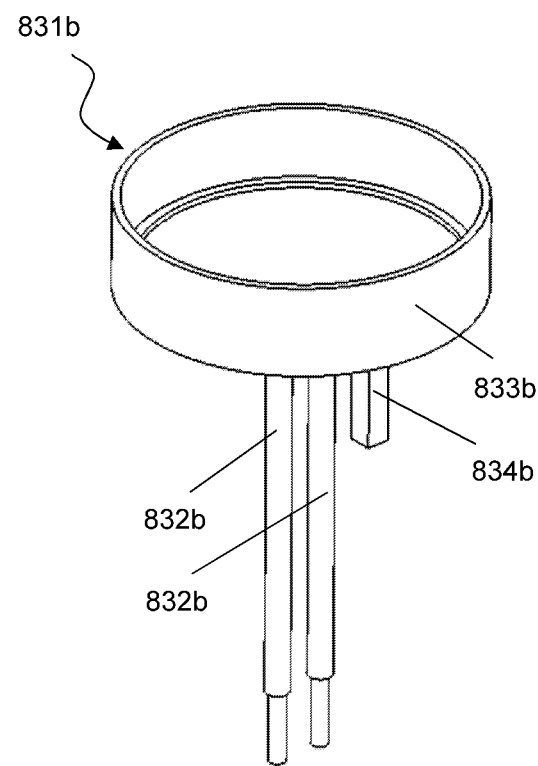
FIGS. 27B-27C each shows an aerial view of a holding device of a distinct size.
Figure 27C:
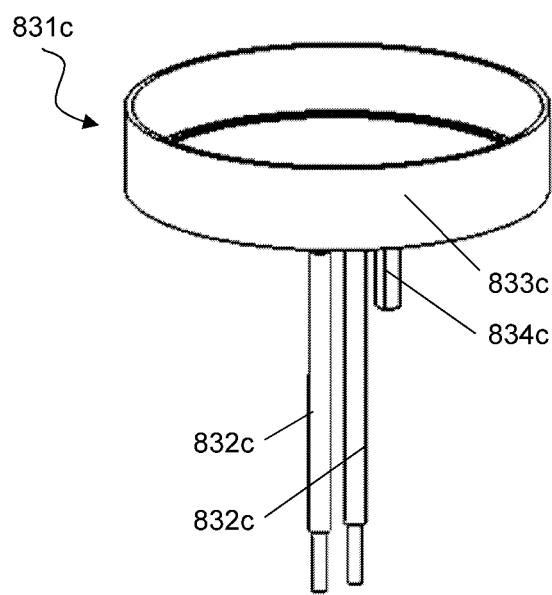

Similarly, referring to FIGS. 27B-27C, a holding device 831b (or 831c) comprises a container holder 833b (or respectively, 833c), two shafts 832b (or respectively, 832c), and a target 834b (or respectively 834c). The container holder 833b (or 833c) comprises a disk-shaped bottom and a cylindrical wall which are rigidly connected. The disk-shaped bottom of the container holder 833b (or 833c) is configured to be placed horizontally. The axis of the cylindrical wall is called the axis of container holder 833b (or 833c), or the axis of the holding device 831b (or 831c). The shafts 832b (or 832c) are configured to be fixedly connected to the bottom of the container holder 833b (or respectively 833c). The axes of the two shafts 832b (or 832c) and the axis of the container holder 833b (or respectively, 833c) are configured to be vertical. The target 834b (or 834c) is configured to be rigidly connected to the bottom of the container holder 833b (or respectively, 833c).

It should be noted that the holding devices 831a, 831b and 831c have similar structures. In fact, the shafts 832a, 832b and 832c may be configured to be identical in shape. However, the container holders 833a, 833b and 833c may have different sizes.

It should be noted that the container holder 833c may hold a cylinder-shaped or round-shaped container of a matching diametrical size. Similarly, the container holder 833b may hold a cylinder-shaped or round-shaped container of a matching diametrical size.

Figure 28A:
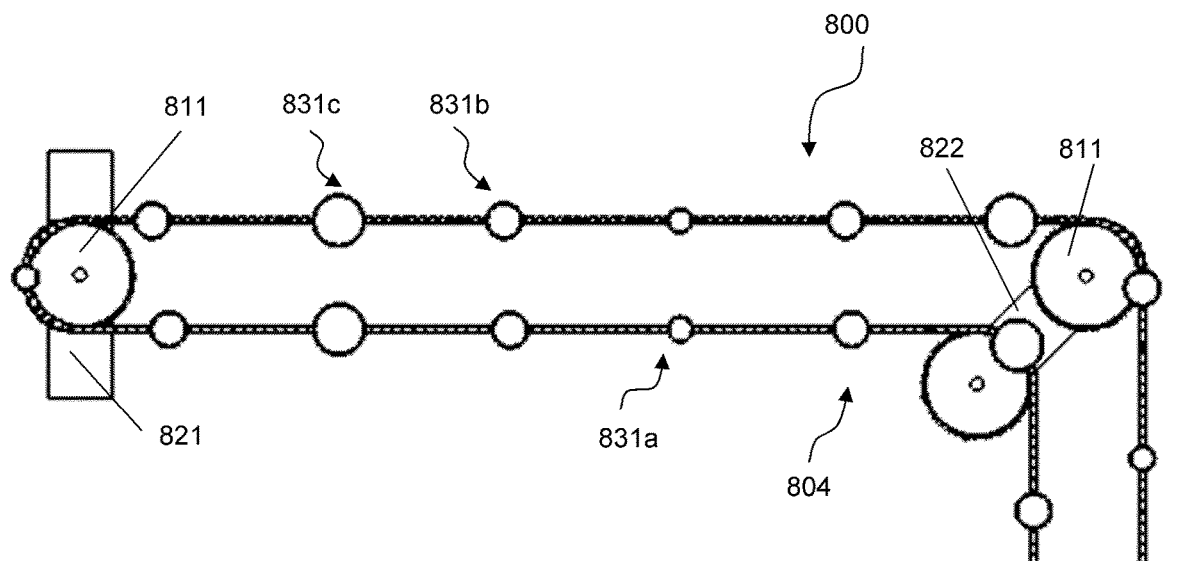
FIG. 28A shows a plane view of a cyclic transport apparatus.
Figure 28B:
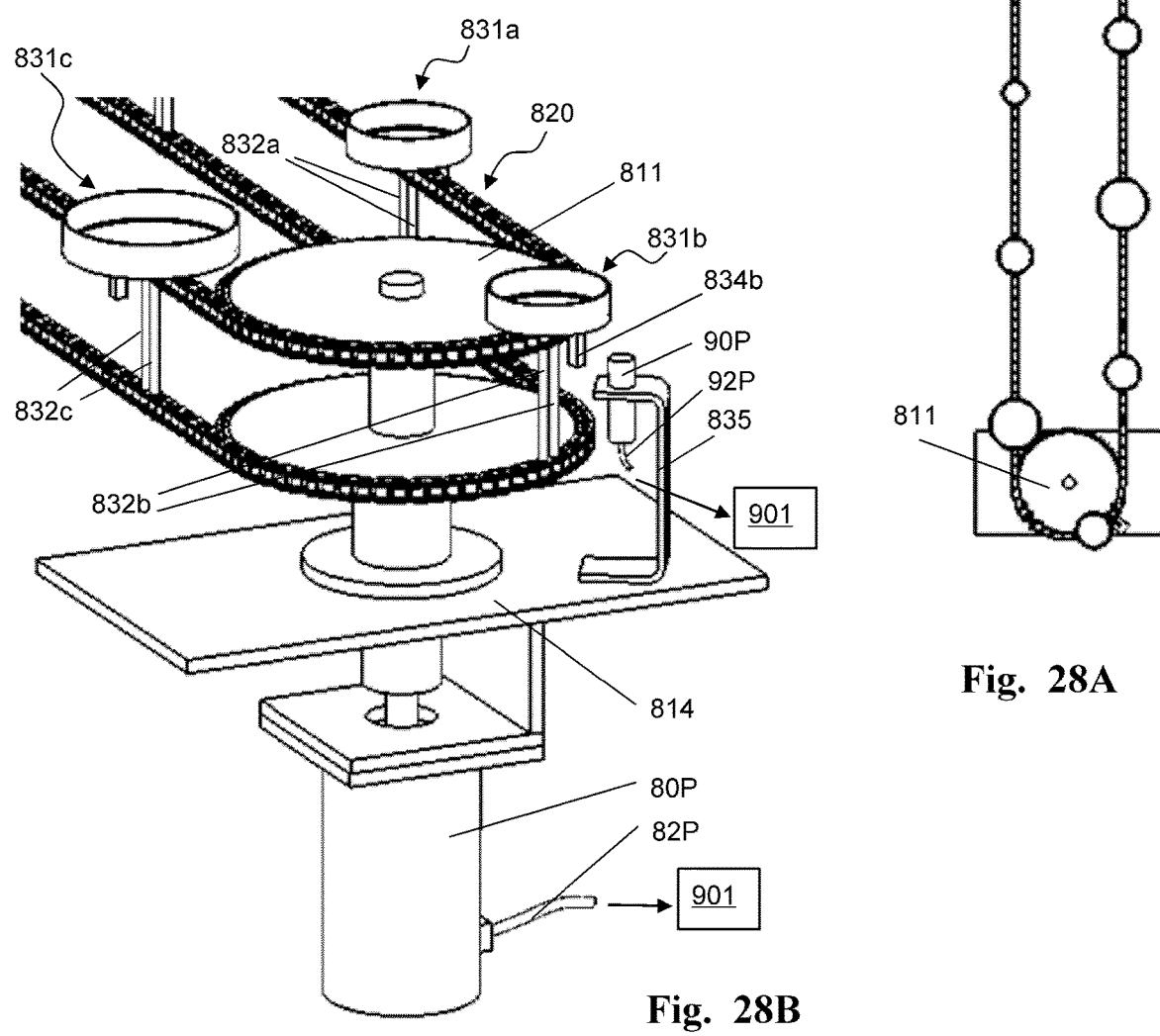
FIG. 28B shows an aerial view of parts of the cyclic transport apparatus.

Referring to FIGS. 28A-28B, a cyclic transport apparatus 800 comprises the chain apparatus 804, and a plurality of holding devices 831a, 831b, or 831c. Each holding device 831a, 831b or 831c is configured to be attached to the pair of roller chains 820 as follows. Each shaft 832a (or 832b, 832c) in each holding device 831a (or respectively 831b, 831c) substitutes a pin in the upper roller chain 820 and a pin in the lower roller chain 820. In other words, each shaft 832a (or 832b, 832c) is inserted into two inner boards, two outer boards, a bushing, and a roller, of the upper roller chain 820; and similarly, each shaft 832a (or 832b, 832c) is inserted into two outer boards, two inner boards, a bushing, and a roller of the lower roller chain 820. In particular, the radius of the shaft 832a (or 832b, 832c) in the middle section is configured to be identical to the radius of a pin in the roller chain 820. The distance between the axis of a holding device (831a, or 831b, or 831c) and the axis of a neighboring holding device is the same.

The cyclic transport apparatus 800 also comprises a proximity switch 90P, and a connecting component 835 configured to rigidly connect the proximity switch 90P to the support component 814 of the chain driving mechanism 801 (see FIG. 28B). The proximity switch 90P may monitor the targets 834a, 834b and 834c, when the targets 834a, 834b and 834c are moved with the chains 820. As shown in FIG. 28B, the motor 80P is connected to the computer 901 via wires 82P. The computer 901 is configured to dynamically control the timing and/or speed of the motor 80P. The proximity switch 90P is also connected to the computer 901 via wires 92P, so the computer 901 may receive signals from the proximity switch 90P. The computer 901 may also send signals to the motor 80P as to control the degree of rotation of the motor 80P. When the chains 820 are rotated to a position where the proximity switch 90P senses one of the targets 834a, 834b and 834c, the signals are sent to the computer 901. The computer 901 then sends signals to the motor 80P as to stop the motor 80P for a time-period, during which: either a container in another mechanism is moved and be placed one of the holding devices 831a, 831b; or a container on one of the holding devices (831a or 831b, 831c) is moved out of the holding device, and placed on another mechanism by a transfer apparatus (i.e., transfer apparatus 703). After this period of time, the motor 80P, under the control of the computer 901, may restart to move the container holders 833a, 833b and 833c so that the containers 107 held on the holding devices 831a, 831b and 831c of the transfer apparatus 800 are moved intermittently by the chain driving mechanism 801 of the transfer apparatus 800. The distance traveled in any one period of an intermittent movement is the same.

Figure 28C:
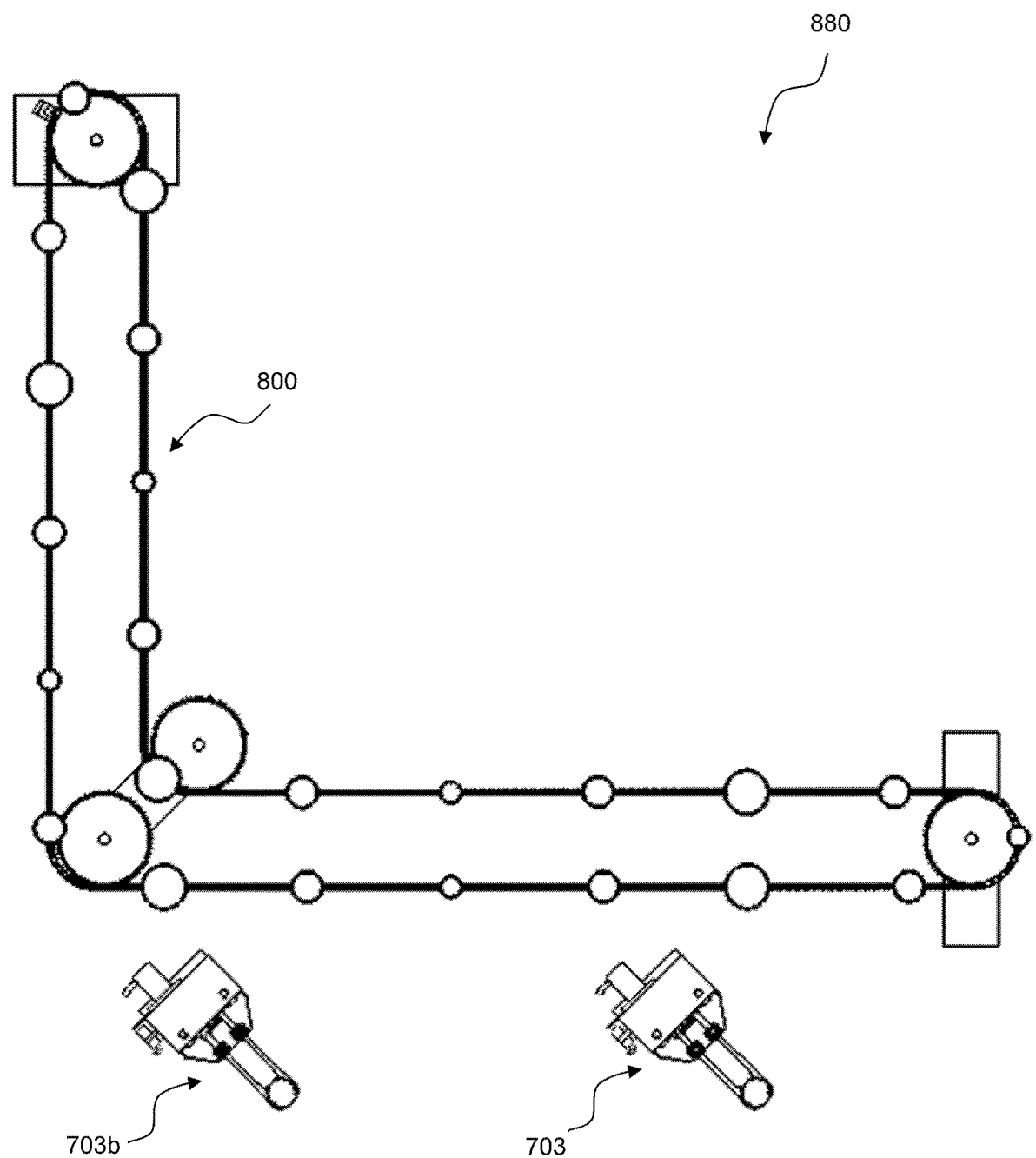
FIG. 28C shows a plane view of a second transfer system comprising the cyclic transport apparatus.

Referring to FIG. 28C, a second transfer system 880 comprises the cyclic transfer apparatus 800, the transfer apparats 703 and a transfer apparatus 703b wherein the transfer apparatus 703b is identically configured to the transfer apparatus 703 except size, wherein the transfer apparatus 703b is configured to grip and transfer a container 107 of the corresponding size. The transfer apparatus 703b comprises a support component 745b which is similarly constructed to the support component 745 of the transfer apparatus 703. The support component 745 of the transport apparatus 703 and the support component 745b of the transfer apparatus 703b are configured to be fixedly or rigidly connected to the base component of the cyclic transfer apparatus 800. The connection is not shown in the figures, but it can be easily done. The relative positions of the support components 745 and 745b and the base component of the cyclic transfer apparatus 800 are configured so that the transfer apparatus 703 or 703b can move a container of respective size from another location and to place the container on a holder of respective size of the cyclic transfer apparatus 800.

Figure 29:
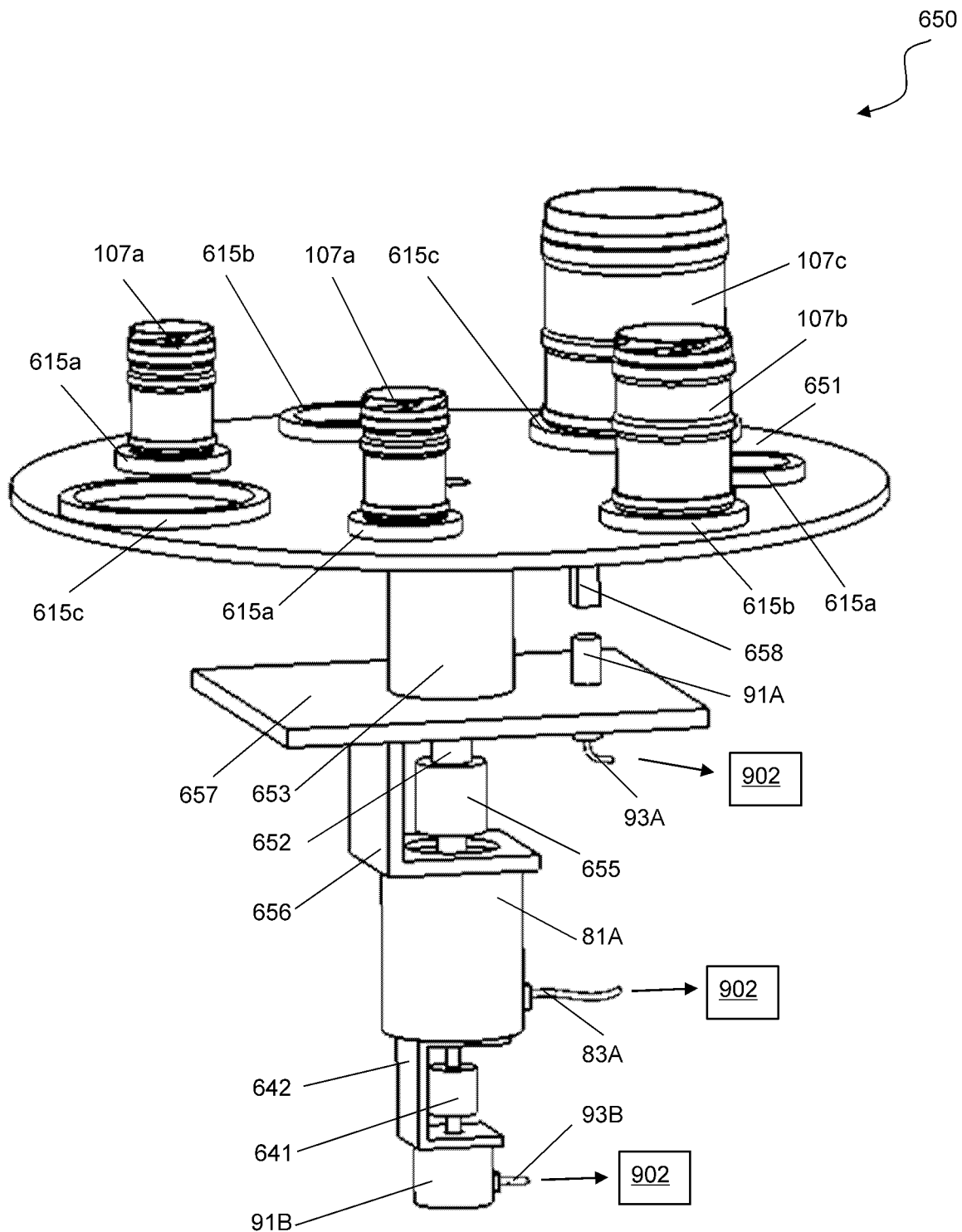
FIG. 29 shows an aerial view of a cyclic transport apparatus.

Referring to FIG. 29, a cyclic transport apparatus 650 comprises a turntable 651 comprising a rotational axis, a shaft 652, a support component 657, a bearing housing 653 rigidly connected to the support component 657, a motor 81A comprising a shaft and a base component, a connecting component 656 and a plurality of holding cups 615a, 615b and 615c, wherein each holding cup 615a, 615b or 615c comprises an axis. Each holding cup, 615a, 615b or 615c, is configured to hold an ingredient container 107 of a specific diametrical size; and the axes of the holding cups 615a, 615b or 615c are configured to be evenly positioned on a cylindrical surface centered at the axis of the turntable 651. In particular, the axes of all the holding cups 615a, 615b or 615c are parallel to the axis of the turntable 651. The turntable 651 is configured to be rigidly connected to the shaft 652 wherein the axis of the turntable 651 is the same as the axis of the shaft 652. The shaft 652 is configured to be constrained to rotate relative to the bearing housing 653 (or equivalently, relative to the support component 657), around the axis of the shaft 652, so that the turntable 651 and the components attach on it are constrained to rotate relative to the support component 657 around the axis of the shaft 652. The base component of the motor 81A is configured to be fixedly connected to the support component 657 by the connecting component 656. The shaft of the motor 81A is fixedly connected to the shaft 652 by a coupling 655. Thus, the motor 81A may drive a rotation of the shaft 652, and hence the turntable 651, the holding cups 615a, 615b and 615c and the ingredient containers 107 held in the holding cups 615a, 615b and 615c are cyclically rotated around the axis of the shaft 652.

The cyclic transport apparatus 650 also comprises: a proximity switch 91A; a target 658 rigidly connected to the turntable 651; an encoder 91B comprising a base component and a shaft; and a connecting component 642 configured to connect the base component of the encoder 91B to the motor 81A. The shaft of the encoder 91B is fixedly connected to the shaft of the motor 81A via a coupling 641, so that the encoder 91B can detect the degree of rotation of the shaft of the motor 81A. The proximity switch 91A monitors the target 658 when the target 658 is rotated with the turntable 651. The position may be used for calibration of the encoder 91B, when the angular degree of rotation as recorded by the computer 902 may be set to be a default number, overriding the numbers previously obtained partly by the information sent by the encoder 91B to the computer 902. As shown in FIG. 29, the motor 81A is connected to the computer 902 via wires 83A. The computer 902 is configured to dynamically control the timing and/or speed of the motor 81A. The proximity switch 91A and the encoder 91B are also connected to the computer 902 via wires 93A and 93B, so the computer 902 may receive signals from the proximity switch 91A and the encoder 91B as to be informed of the degree of rotation of the shaft of the motor 81A. The computer 902 may also send signals to the motor 81A as to control the degree of rotation of the motor 81A. Thus, using the information sent by the proximity switch 91A and the encoder 91B, the computer 902 may accurately control the angle of rotation of the turntable 651 of the cyclic transport apparatus 650.

The holding cups 615a, 615b and 615c are also referred to as container holders. It should be noted that the holding cups 615a, 615b and 615c in the cyclic transport apparatus 650 may be substituted by other types of container holders.

It should also be noted that the motor 81A (and the connection of the base component and shaft of the motor 81A to the support component 657 and respectively the shaft 652) may be substituted by a motorized mechanism comprising a Geneva mechanism comprising an input shaft, an output shaft, and a base component, wherein a continuous rotation of the input shaft relative to the base component is configured to produce an intermittent rotation of the output shaft relative to the base component; and a motor configured to drive the motion of the input shaft of the Geneva mechanism, wherein the base component of the motor is configured to be fixedly connected to the base component of the Geneva mechanism; wherein the output shaft of the Geneva mechanism is configured to be connected to the shaft 652, and the base component of the Geneva mechanism is configured to be fixedly connected to the bearing housing 653. In this case, the motorized mechanism may produce an intermittent rotation of the turntable 651. The motorized mechanism may be further configured so that the intermittent rotation of the container holders is cyclic.

Referring to FIGS. 30A-30C, a container gripping mechanism 905 comprises: gripping devices 916a and 916b; shafts 917a, 917b, 918a, 918b and 921; and a connector 917 configured to rigidly connect the shafts 917a, 917b, 918a, 918b and 921. The axes of the shafts 918a, 918b and 921 are configured to be parallel to each other; and the shafts 917a and 917b are both perpendicular to the axis of the shaft 921. The shaft 921 comprises a wedge-shaped component at one of the ends. The gripping device 916a (or 916b) comprises a curved hole 915a (or respectively 915b), a bearing housing 914a (or respectively 914b), and a gripper 913a (or respectively 913b). The surface of the gripper 913a or 913b comprises a part of a cylindrical surface. The curved hole 915a and the gripper 913a are configured to be rigidly connected to the bearing housing 914a; and the curved hole 915b and the gripper 913b are configured to be rigidly connected to the bearing housing 914b. The gripping device 916a (or 916b) also comprises a rubber (or silica gel) 912a (or respectively 912b) which is attached to the gripper 913a (or respectively 913b).

The container gripping mechanism 905 also comprises shafts 923a and 923b, a support component 924 in the shape of a board, a bearing housing 927 rigidly connected to the bottom of the support component 924, a shaft 931 comprising a horizontal axis, three targets 932a, 932b and 932c all of which are configured to be fixedly connected to the shaft 931, and two wheels 925a and 925b (see FIG. 30B). The shafts 923a and 923b are configured to be rigidly connected to the support component 924 wherein the axes of the two shafts 923a and 923b are configured to be perpendicular to the top surface of the support component 924. The shaft 921 is configured to be constrained to rotate relative to the bearing housing 927 (or equivalently, relative to the support component 924), around the axis of the shaft 921. As explained before, the connector 917 is configured to be rigidly connected to the shaft 921, so that the connector 917 and the components (the shafts 917a, 917b, 918a, 918b) attached on it are configured to be constrained to rotate relative to the support component 924 around the axis of the shaft 921. The axes of the shafts 923a, 923b, the axis of the shaft 921 and the axis of the bearing housing 927 are configured to be mutually parallel. The wheel 925a (or 925b) is mounted on the shaft 917a (or respectively 917b), and the wheel 925a (or 925b) is constrained to rotate relative to the shaft 917a (or respectively 917b) around the axis of the wheel 925a (or 925b). The gripping device 916a (or 916b) is configured to be constrained to rotate relative to the shaft 923a (or respectively 923b), around the axis of the shaft 923a (or respectively 923b) (see FIG. 30C). The shafts 918a (or 918b) is configured to be inserted into the curved hole 915a (or respectively 915b) of the gripping devices 916a (or respectively 916b), so that a movement of the shaft 918a (or 918b) can induce a rotation in the gripping device 916a (or respectively 916b) around the axis of the shaft 923a (or respectively 923b). Since the gripping devices 916a and 916b are rotated, the grippers 913a and 913b (and the rubbers 912a and 912b) may grip or release a container 107.

Figure 31:
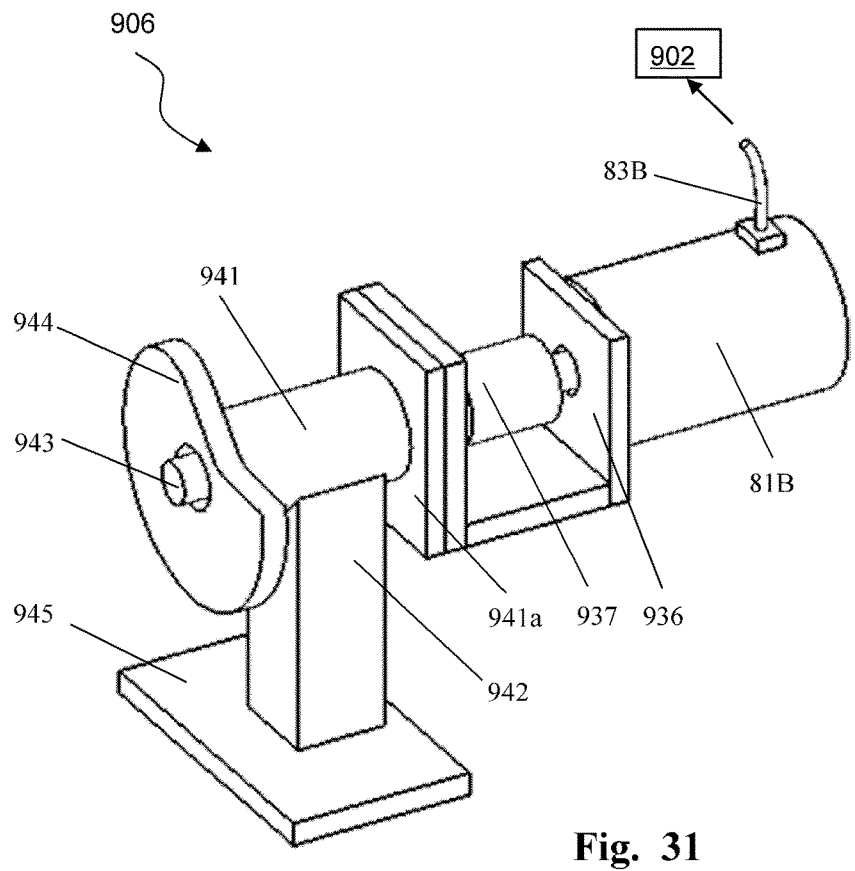
FIG. 31 shows an aerial view a first rotational mechanism, with a horizontal rotational axis.

Referring to FIG. 31, a rotational mechanism 906 comprises a support component 945, a bearing housing 941 comprising a flange 941a, a connector 942 configured to rigidly connect the bearing housing 941 to the support component 945, a shaft 943 with a horizontal axis, a cam 944, a motor 81B comprising a shaft and a base component, and a connecting component 936 configured to fixedly connect the base component of the motor 81B to the flange 941a of the bearing housing 941. The cam 944 is configured to be rigidly or fixedly connected to the bearing housing 941. The outer profile of the cam 944 comprises a circular arc and a straight arc. The shaft 943 is configured to be constrained to rotate relative to the bearing housing 941 (or equivalently, relative to the support component 945), around the axis of the shaft 943. The shaft of the motor 81B is connected to the shaft 943 by a coupling 937, so that the motor 81B may drive the rotation of the shaft 943 relative to the support component 945.

Figure 32:
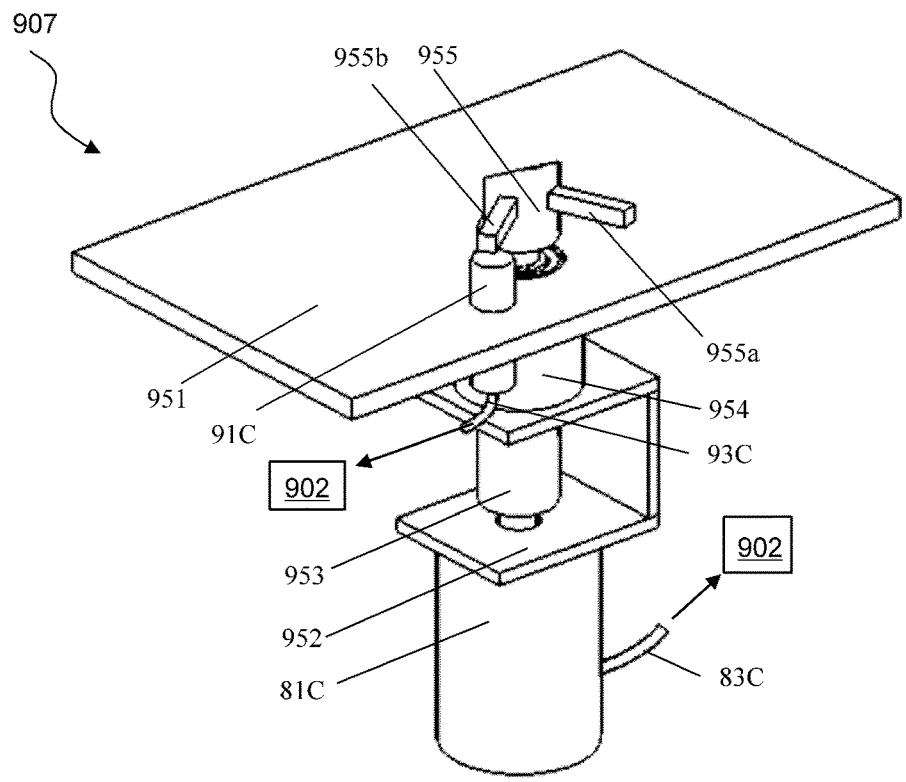
FIG. 32 shows an aerial view of parts of a second rotational mechanism, with a vertical rotational axis.

Referring to FIG. 32, a second rotational mechanism 907 comprises: a support component 951 in the shape of a board; a shaft 955 with a vertical axis; a bearing housing 954 rigidly connected to the support component 951; and a motor 81C comprising a shaft and a base component, a connecting component 952 configured to fixedly connect the base component of the motor 81C to the bearing housing 954. The shaft 955 comprises a wedge-shaped component at one of the ends. The shaft 955 is configured to be constrained to rotate relative to the bearing housing 954 (or equivalently, relative to the support component 951), around the axis of the shaft 955. The shaft of the motor 81C is concentric with, and connected to, the shaft 955 via a coupling 953, so that the motor 81C may drive the rotation of the shaft 955 relative to the support component 951.

The second rotational mechanism 907 also comprises a proximity switch 91C, two targets 955a and 955b both of which are configured to be rigidly connected to the shaft 955. The proximity switch 91C may monitor the targets 955a and 955b when the targets are rotated with the shaft 955. As shown in FIG. 32, the motor 81C is connected to the computer 902 via wires 83C. The computer 902 is configured to dynamically control the timing and/or speed of the motor 81C. The proximity switch 91C is also connected to the computer 902 via wires 93C, so that the computer 902 may receive signals from the proximity switch 91C. The computer 902 may also send signals to the motor 81C to control the degree of rotation of the motor 81C. When the shaft 955 is rotated to a first position where the proximity switch 91C senses the target 955a, the signals of the proximity switch 91C are sent to the computer 902. The computer 902 can figure out the position of the target 955a, and the position of the shaft 955. Similarly, when the shaft 955 is rotated to a second position where the proximity switch 91C senses the target 955b, the signals of the proximity switch 91C are sent to the computer 902. The computer 902 can figure out the position of the target 955b, and the position of the shaft 955. Each time the shaft 955 is rotated to the first or second position, the motor 81C, under the control of the computer 902, is stopped for a time during which the second rotational mechanism 907 is configured to complete a corresponding process. After this time, the motor 81C, under the control of the motor 902, may restart again and make a reverse rotation as to rotate the shaft 955 to the second position or respectively the first position. It should be noted that the angle of rotation of the shaft 955 relative to the support component 951 around the axis of the shaft 955 is strictly less than 90 degrees, e.g., 21 degrees or 24 degrees.

Figure 33:
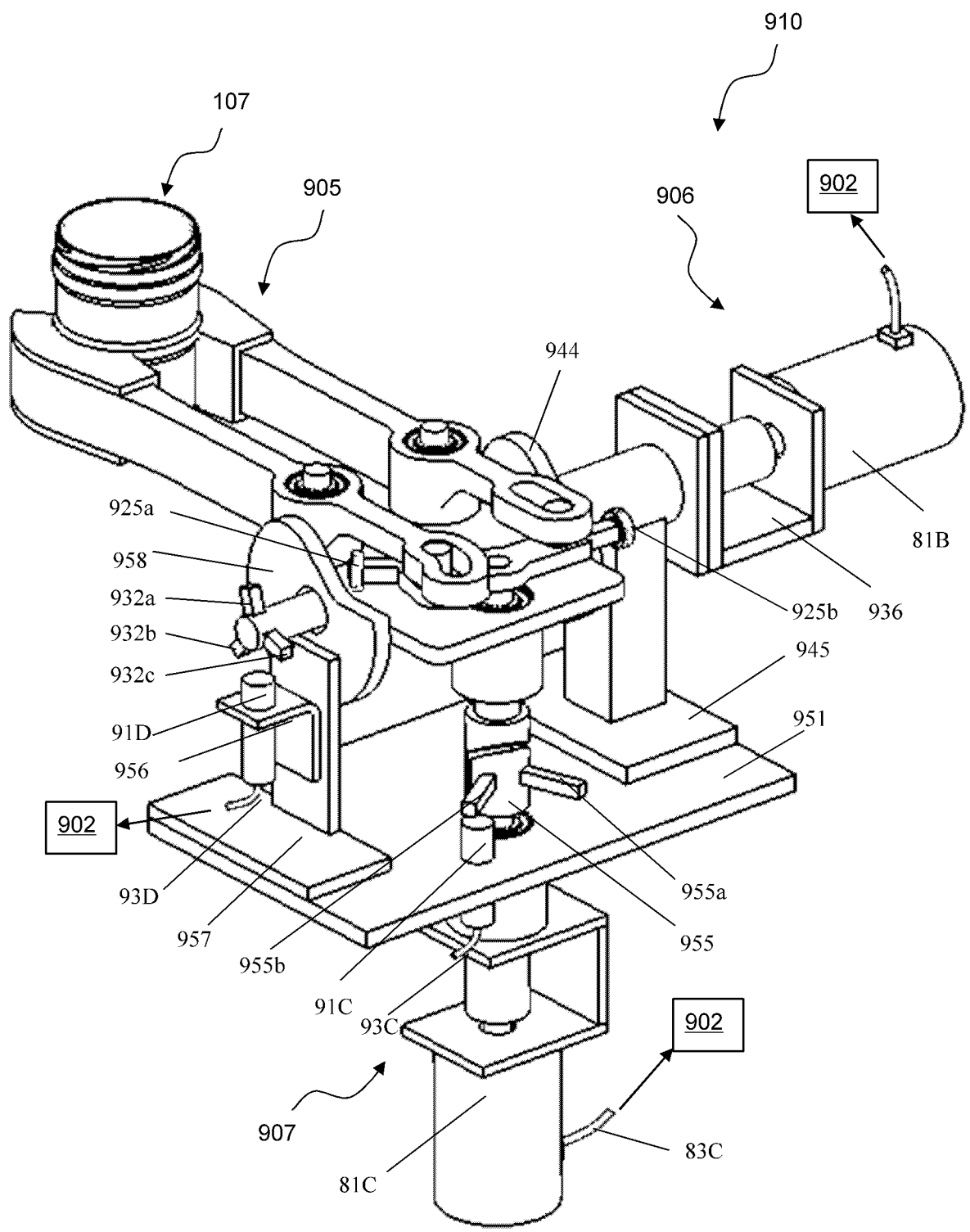
FIG. 33 shows an aerial view of an unloading apparatus configured to unload food ingredients from an ingredient container.

Referring to FIG. 33, an unloading apparatus 910 comprises the container gripping mechanism 905, the rotational mechanism 906 and the second rotational mechanism 907. The support component 945 of the rotational mechanism 906 is configured to be fixedly connected to the support component 951 of the second rotational mechanism 907. The shaft 943 of the rotational mechanism 906 is configured to be rigidly connected to the support component 924 in the container gripping mechanism 905, so that the motor 81B of the rotational mechanism 906 may drive a rotation of the support component 924 (or equivalently the container gripping mechanism 905) relative to the support component 951 around the axis of the shaft 943.

The unloading apparatus 910 also comprises: a connector 957 comprising a vertical board and a horizontal board; a cam 958 which is rigidly connected to the vertical side of the connector 956; a proximity switch 91D; and a connecting component 956 fixedly connected the proximity switch 91D to the vertical board of the connector 957. The cam 958 is similarly configured to the cam 944. In particular, the outer profile of the cam 958 comprises a circular arc and a straight arc. The axis of the shaft 931 of the container gripping mechanism 905 and the axis of the shaft 943 of the rotational mechanism 906 are configured to be concentric. The proximity switch 91D may monitor the three targets 932a, 932b, and 932c of the container gripping mechanism 905 when the targets are rotated with the shaft 931. As shown in FIG. 33, the motor 81B is connected to the computer 902 via wires 83B. The computer 902 is configured to dynamically control the timing and/or speed of the motor 81B. The proximity switch 91D is also connected to the computer 902 via wires 93D, so that the computer 902 may receive signals from the proximity switch 91D. The computer 902 may also send signals to the motor 81B to control the degree of rotation of the motor 81B. When the shaft 931 (or equivalently, the support component 924) is rotated by the motor 81B to a first position where the proximity switch 91D senses the target 932a, the signals of the proximity switch 91D are sent to the computer 902. The computer 902 can figure out the position of the target 932a, and the position of the support component 924. Similarly, when the shaft 931 (or equivalently, the support component 924) is rotated by the motor 81B to a second (or third) position where the proximity switch 91D senses the target 932b (or respectively 932c), the signals of the proximity switch 91D are sent to the computer 902. The computer 902 can figure out the position of the target, and the position of the support component 924.

When the support component 924 of the container gripping mechanism 905 is controlled by the computer 902 to rotate to the first position, the shaft 921 of the container gripping mechanism 905 is configured to be concentric with the shaft 955 of the second rotational mechanism 907. When the support component 924 of the container gripping mechanism 905 is controlled by the computer 902 to rotate to the second position, the axis of the shaft 921 is configured to be horizontal or nearly horizontal. When the support component 924 of the container gripping mechanism 905 is controlled by the computer 902 to rotate to the third position, the angle of rotation of the support component 924 relative to the first position may be a pre-assigned angle usually between 90 to 180 degrees, e.g., 135 degrees or 170 degrees. Each time the support component 924 is rotated to the first, second or third position, the motor 81B is controlled to be stopped for a time during which the unloading apparatus 910 is configured to complete a corresponding process.

When the support component 924 of the container gripping mechanism 905 is rotated to the said first position, and the shaft 955 is rotated to the position where the proximity switch 91C senses the target 955b, the axis of the shaft 921 and the axis of the shaft 955 are configured to be concentric. At this time, the wedge-shaped component of the shaft 921 and the wedge-shaped component of the shaft 955 are configured to be engaged with each other. Then a pre-assigned angle (explained before) of rotation of the wedge-shaped component of the shaft 955 (around the axis of the shaft 921), as produced by the motor 81C of the second rotational mechanism 907, induces the same angle of the shaft 921 around the axis of the shaft 921, hence the gripping devices 916a and 916b in the container gripping mechanism 905 are rotated by a corresponding angle, so as to grip a container 107 which may contain food or food ingredients. If a container 107 is thus gripped, the axis of the gripped container 107 is configured to be parallel to the axis of the shafts 923a, 923b and 921 (of the container gripping mechanism 905). After the container 107 is gripped, as shown in FIG. 33, the computer 902 would control the rotational mechanism 906 to drive a rotation of the support component 924 of the container gripping mechanism 905 to the third position. During this period, the wedge-shaped component of the shaft 921 and the wedge-shaped component of the shaft 955 are disengaged, and the wheel 925b is configured to be rolling on the outer edge of the cam 944, to prevent a rotation of the connector 917 relative to the support component 924. Thus, gripping devices 916a and 916b are relatively still with respect to the support component 924, and hence the container 107 is kept gripped by the gripping devices 916a and 916b. Therefore, the container 107 and the gripping devices 916a and 916b are rotated by the same angular degree as the support component 924, around the axis of the shaft 943 to the third position. In particular, the food or food ingredients contained in the container 107 can be unloaded as the container 107 is turned by over 90 degrees. (Optionally, the angle of rotation may be at least 135, or even 170 degrees.) After the unloading of food or food ingredients contained in the container 107, the container gripping mechanism 905 may be returned to the said first position, when the rotational mechanism 906 rotates the support component 924 backward.

When the support component 924 of the container gripping mechanism 905 is at the first position, and the wedge-shaped component of the shaft 921 and hence that the connector 917 are rotated to the position where the proximity 91C senses the target 955b, to induce the gripping devices 916a and 916b to rotate, and to release a container 107, the rotational mechanism 906 may also rotate the support component 924 of the container gripping mechanism 905, to move away the grippers of the gripping devices 916a and 916b to the third position. During this period, the wheel 925a may touch the outer edge of the cam 958, to be constrained by the cam 958, and to prevent a movement of the connector 917 and the gripping devices 916a and 916b. After a time (as needed), the container gripping mechanism 905 may be returned to the first position, when the rotational mechanism 906 rotates the support component 924 backward.

It should be noted that the unloading apparatus 910 comprises:

(1) the support component 924, referred to as a first support component of the unloading apparatus 910;

(2) the gripping devices 916a and 916b, each of which is rotatable relative to the first support component, wherein the axes of rotations of the said gripping devices relative to the first support component are configured to be mutually parallel;

(3) the support component 951, referred to as a second support component;

(4) a first motorized mechanism configured to rotate the first support component 924 relative to the second support component 951, around the (horizontal) axis of the shaft 943, the first motorized mechanism comprising the rotational mechanism 906, the connection of the shaft 943 and the support component 924, the connection of the component 945 and the second support component 951;

(5) a second motorized mechanism configured to rotate the gripping devices 916a and 916b relative to the first support component 924, when the axes of rotations of the gripping devices 916a and 916b relative to the first support component is positioned vertically; wherein the second motorized mechanism comprises the second rotational mechanism 907, the shaft 921, the connection of the shaft 921 with the second rotational mechanism 907 which constrains the motion of the shaft 921 to a rotation relative to the support component 924, the components 917, 918a and 918b and their connections with each other and with components of other parts of the unloading apparatus 910;

(6) a retaining mechanism configured to limit the rotation of the gripping device 916a and 916b relative to the support component 924, when the first motorized mechanism is actively moving the first support component 924 relative to the second support component 951, the retaining mechanism comprising the cams 944 and 958, and their connections to the second support component 951; the wheels 925a and 925b, and their connections to the component 917.

The unloading apparatus 910 also comprises the proximity switches 91C, 91D and other electrical or electronic devices (not shown in the figures), wherein the said proximity switches are configured to detect the angle of rotation of the motor in the unloading apparatus 910 and send the reading to the computer 902. Thus the computer 902 can control the above described mechanism and apparatus, especially the angle of the rotation of motor 81C in the second rotational mechanism 907 so that the gripping devices 916a and 916b of the container gripping mechanism 905 are configured to grip or release a container 107; the angle of rotation of the motor 81B so that the support component 924 of the container gripping mechanism 905 is configured to be rotated a pre-assigned angle (over 90 degrees) to unload the food or food ingredients contained in the container 107.

Figure 34:
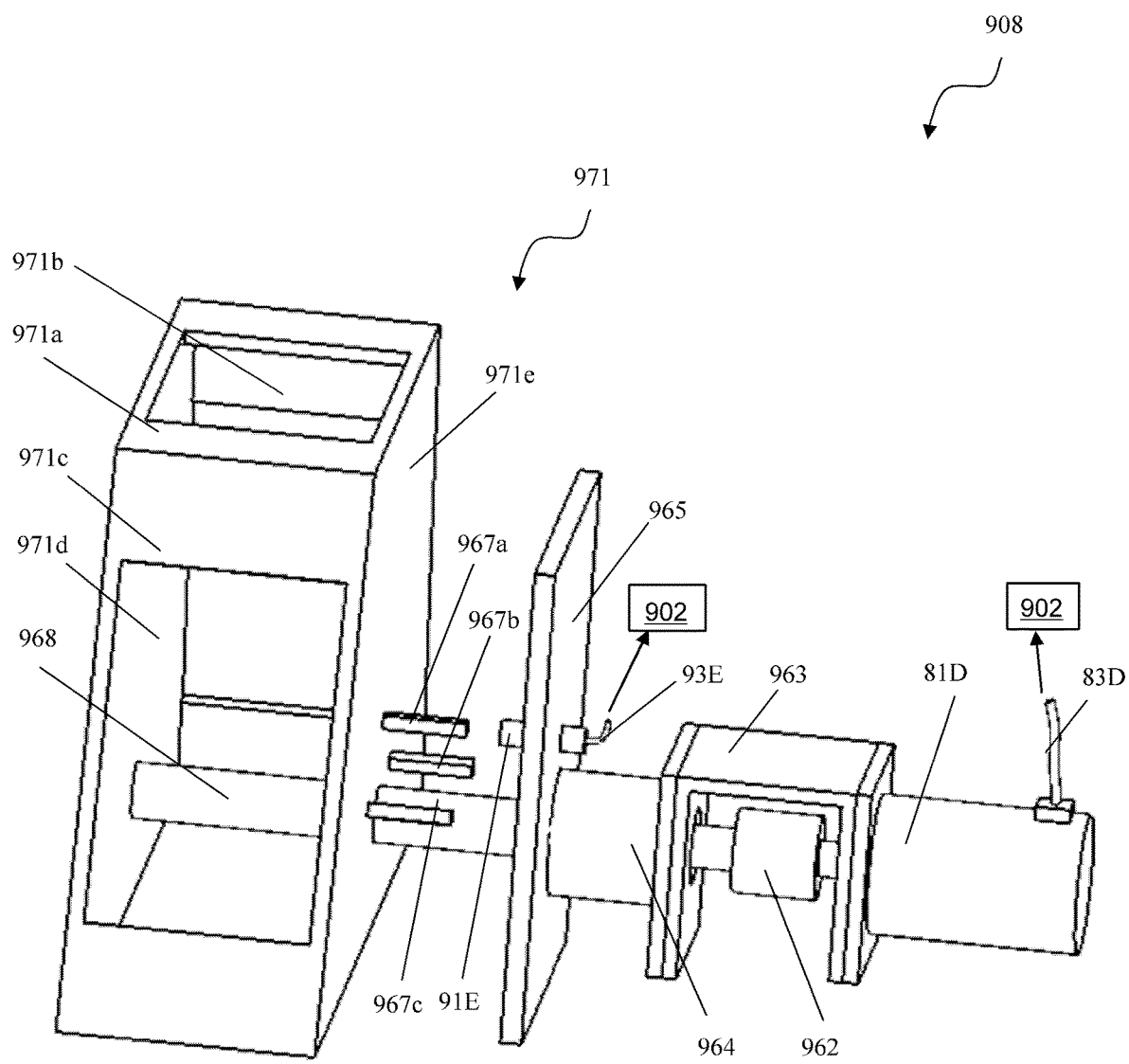
FIG. 34 shows an aerial view of a rotational mechanism.

Referring to FIG. 34, a rotational mechanism 908 comprises: a connecting component 971 comprising three boards 971a, 971b, 971c and other two vertical parallel boards 971d and 971e; a shaft 968 comprising a horizontal axis; a support component 965; a bearing housing 964 rigidly connected to the support component 965; and a motor 81D comprising a shaft and a base component; a connecting component 963 configured to connect the base component of the motor 81D to the bearing housing 964. The three boards 971a, 971b, and 971c of the connecting component 971 are all configured to be rigidly connected to the two vertical parallel boards 971d and 971e. The shaft 968 is configured to be constrained to rotate relative to the bearing housing 964 (or equivalently, relative to the support component 965) around the axis of the shaft 968. Since the two vertical parallel boards 971d and 971e of the connecting component 971 are configured to be rigidly or fixedly connected to the shaft 968, the connecting component 971 is configured to be constrained to rotate relative to the bearing housing 964 (or equivalently, relative to the support component 965) around the axis of the shaft 968. The shaft of the motor 81D is fixedly connected to the shaft 968 via a coupling 962. Thus, the motor 81D may drive a rotation of the shaft 968 around the axis of the shaft 968, hence the connecting component 971 is rotated around the axis of the shaft 968.

The rotational mechanism 908 also comprises a proximity switch 91E and three targets 967*a*, 967*b* and 967*c*. The three targets 967*a*, 967*b* 967*c* are all configured to be rigidly connected to the vertical board 971*e* of the connecting component 971. The proximity switch 91E may monitor the three targets 967*a*, 967*b* and 967*c* when the targets 967*a*, 967*b* and 967*c* are rotated with the connecting component 971. As shown in FIG. 34, the motor 81D is connected to the computer 902 via wires 83D. The computer 902 is configured to dynamically control the timing and/or speed of the motor 81D. The proximity switch 91E is also connected to the computer 902 via wires 93E, so that the computer 902 may receive signals from the proximity switch 91E. The computer 902 may also send signals to the motor 81D to control the degree of rotation of the motor 81D. When the connecting component 971 is rotated by the motor 81D to a first position where the proximity switch 91E senses the target 967*a*, the board 971*a* of the connecting component 971 is rotated to the top position. The computer 902 can figure out the position of the target 967*a*, and the position of the connecting component 971. Similarly, when the connecting component 971 is rotated by the motor 81D to a second (or third) position where the proximity switch 91E senses the target 967*b* (or respectively 967*c*), the board 971*b* (or respectively 971*c*) of the connecting component 971 is rotated to the top position. The computer 902 can figure out the position of the target 967*b* (or 967*c*), and the position of the connecting component 971. Each time the proximity switch 91E senses the target 967*a* or 967*b* or 967*c*, the computer 902 sends signals to the motor 81D as to stop the rotation of the motor 81D for a time during which the rotational mechanism 908 completes a corresponding process. After this time, the motor 81D, under the control of the motor 902, may restart again to rotate the support component 971 to the next position.

Figure 35A:
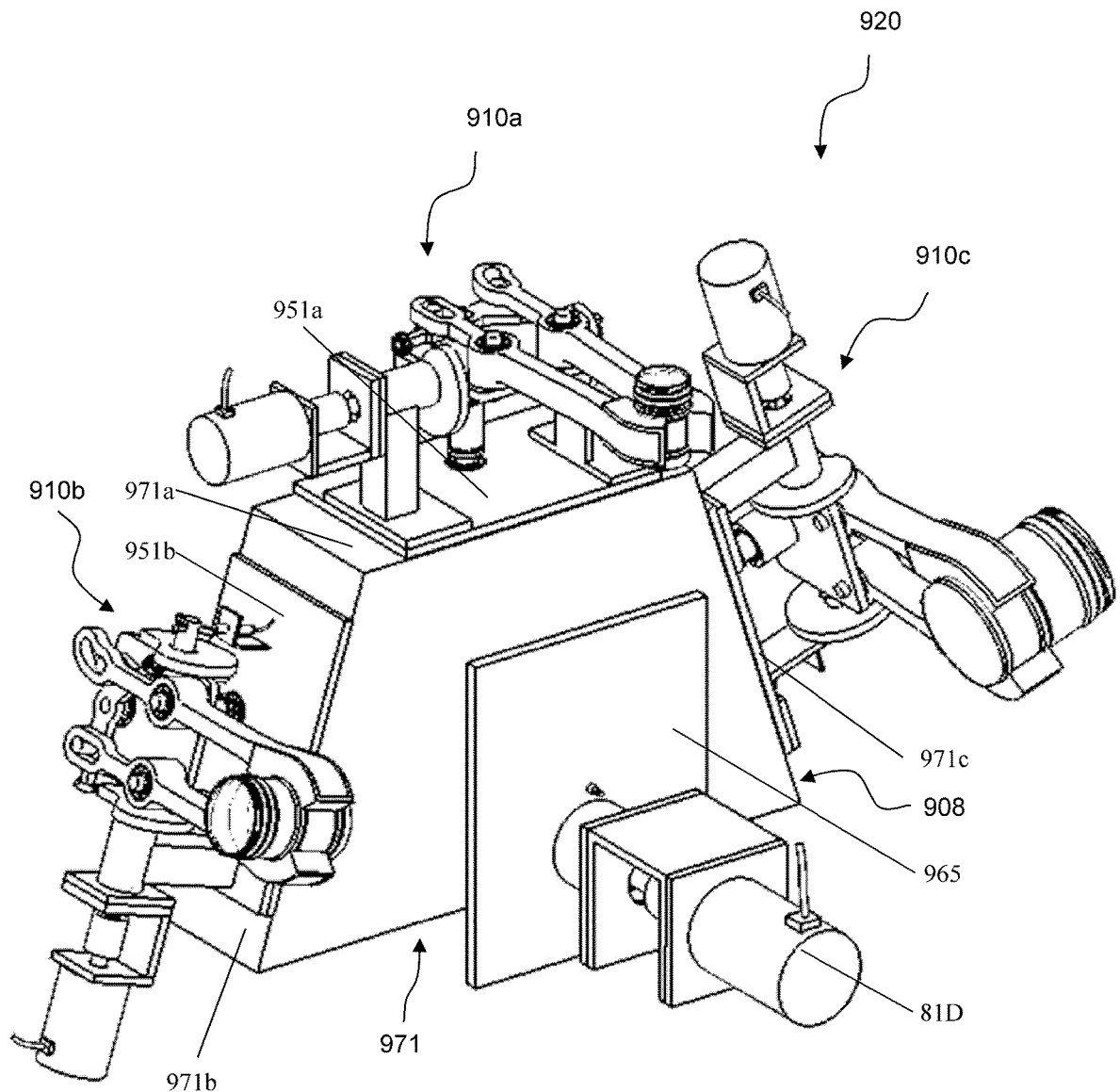
FIG. 35A shows an aerial view of a combination unloading apparatus, configured to unload food ingredients from an ingredient container which can be of one of a plurality of sizes.
Figure 35B:
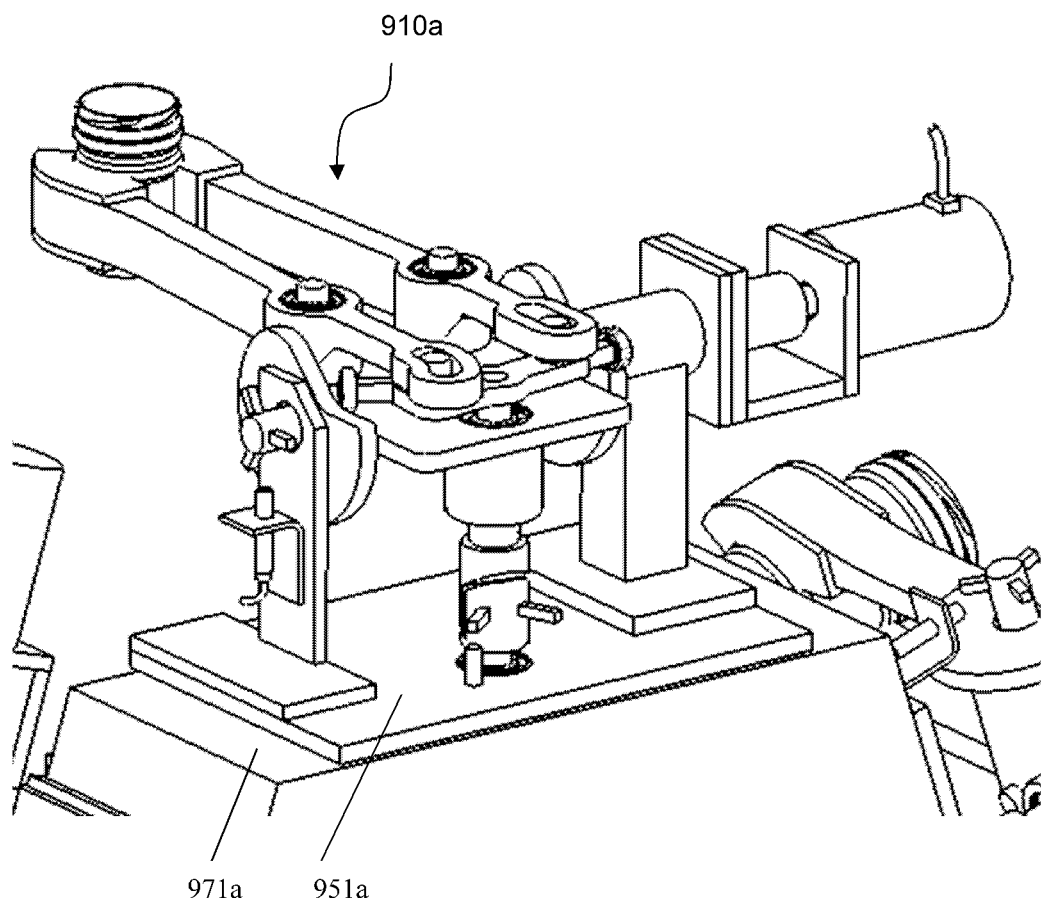
FIG. 35B shows an aerial view of parts of the combination unloading apparatus.

Referring to FIGS. 35A-35B, a combination unloading apparatus 920 comprises three unloading apparatuses 910*a*, 910*b* and 910*c*, wherein each of the unloading apparatuses is built the same way as the unloading apparatuses 910, except that the lengths or sizes of the various components may be different. In particular, the container gripping mechanism 905 in any of the unloading apparatuses 910*a*, 910*b* and 910*c* may be configured to grip a container which is similar to the container 107 in geometrical shape, of a specific size (esp. diametrical size of the cylinder shape). Thus, a different unloading apparatus may be configured to unload a container of food or food ingredients of a different size.

The combination unloading apparatus 920 further comprises the rotational mechanism 908. The support component 951*a* of the unloading apparatus 910*a* is configured to be fixedly connected to the board 971*a* of the connecting component 971 of the rotational mechanism 908. Similarly, the support component 951*b* (or 951*c*) is configured to be fixedly connected to the board 971*b* (or respectively 971*c*) of the connecting component 971 of the rotational mechanism 908. As explained before, the computer 902 may control the degree of rotation mechanism 908 to rotate the support component 951*a* (or equivalently, the unloading apparatus 910*a*) to the top position (as shown in FIG. 35A).

Similarly, the computer 902 may control the degree of rotation of mechanism 908 to rotate the support component 951*b* or 951*c* (or equivalently the unloading apparatus 910*b*, the unloading apparatus 910*c*) to rotate to a horizontal position. During the above process, the support component 924*a* (or 924*b*, or 924*c*) of the container gripping mechanism 905*a* (or respectively 905*b*, or respectively 905*c*) of the unloading apparatus 910*a* (or respectively 910*b*, or respectively 910*c*) has been configured to be rotated to the second position by the rotational mechanism 906*a* (or respectively 906*b*, or respectively 906*c*) controlled by the computer 902. The combination unloading apparatus 920 can be used to unload food or food ingredients from containers of several sizes, one at a time. When one of the three unloading apparatuses is controlled by the computer 902 to rotated to the top position, the specific unloading apparatus is controlled to grip a container of matching size and unload the food or food ingredients from the container as explained before.

Figure 36A:
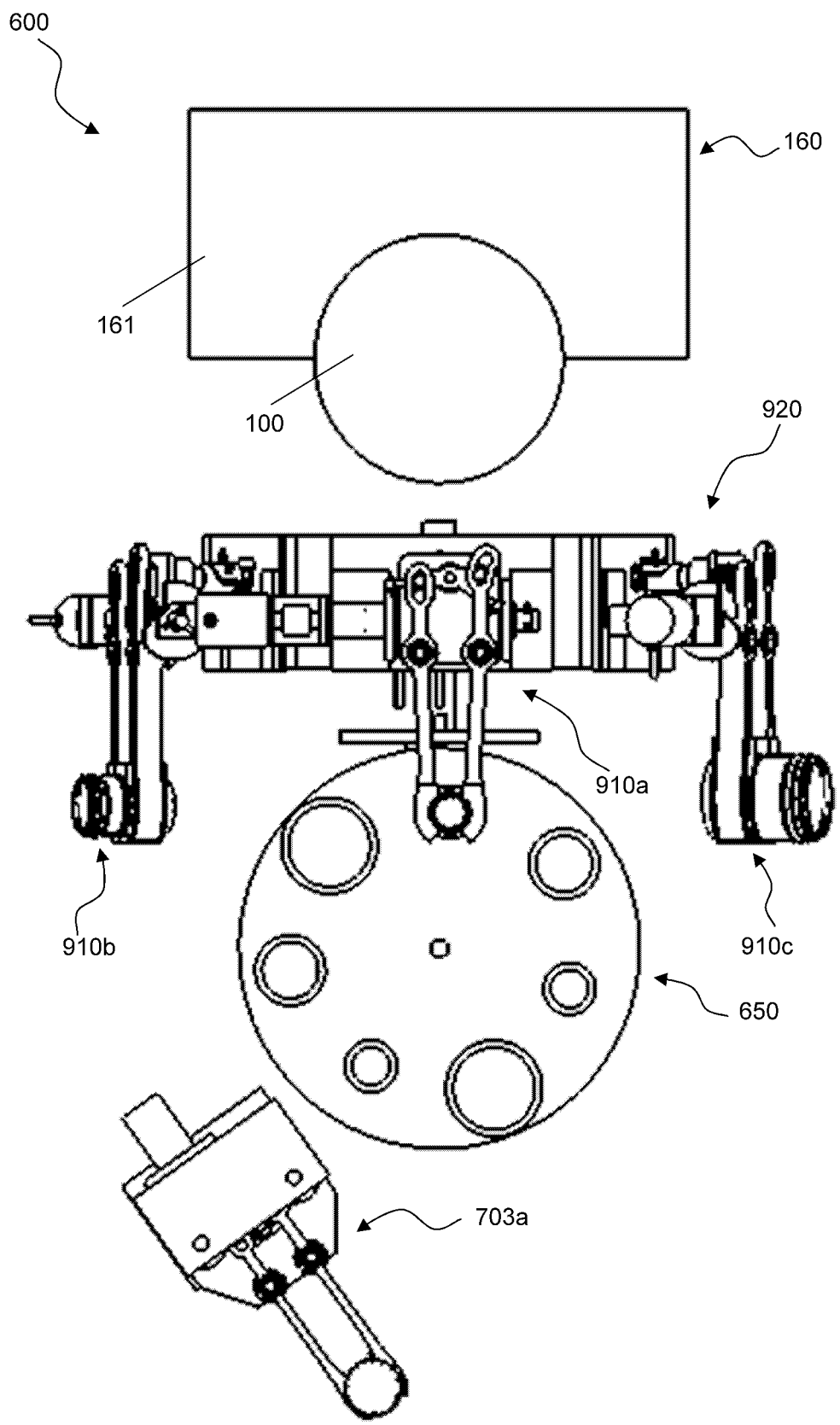
FIG. 36A shows a schematic view of a cooking system.

Referring to FIG. 36A, a cooking system 600 comprises the combination unloading apparatus 920, the cyclic transport apparatus 650, and a cooking sub-system 160. The cooking sub-system 160 comprises: a cooking apparatus comprising a cooking container 100 configured to hold food or food ingredients during cooking, and a stirring motion mechanism 161 configured to produce a motion in the cooking container 100 to stir, mix or distribute the food or food ingredients contained in the cooking container 100; a cleaning apparatus configured to clean the cooking container 100 after a food is cooked; a lid apparatus configured to limit passage of air from and towards the cooking container 100, or to limit the food or food ingredients from jumping out from the cooking container 100 during a cooking process; a receiving apparatus comprising a plurality of containers configured to receive cooked food from the cooking container 100; and an unloading apparatus configured to unload cooking food to a container of the receiving apparatus; etc. The cooking sub-system 160 also comprises a base component, and the cooking container 100 comprises an axis. The cooking sub-system 160 also comprises a plurality of encoders, proximity switches and temperature sensors or other sensors wherein the said sensors are connected via wires to input/output ports 902*a* of the computer 902; wherein the said sensors are used to detect the degree of rotation of the motors, the relative position of two components, etc., of the cooking sub-system 160 and then send data to the computer 902. Thus, the computer 902 may control the timing, direction or speed of the rotation of the shaft of the motors of the mechanism in the cooking sub-system 160. The details of the cooking sub-system 160 are presented in the U.S. Provisional Patent Application, Ser. No. 62/480,334, Filed Mar. 31, 2017, by the same inventor, the content of which is incorporated herein by reference in its entirety. The present patent application is shown in FIG. 11 in the cited Provisional Patent Application; the cooking sub-system 160, the cooking container 100, the clearing apparatus, the lid apparatus and the receiving apparatus of the present patent application are same as the cooking system, the cooking container 100, the cleaning apparatus, the lid apparatus and the receiving apparatus in the cited Provisional Patent Application.

The relative position of the support component 657 of the cyclic transport apparatus 650 and the support component 965 of the combination unloading apparatus 920 are configured to be properly fixed. The relative position of the base component of the cooking sub-system 160 and the support component 965 of the combination unloading apparatus 920 are configured to be properly fixed.

It should be noted the cooking apparatus in the cooking sub-system 160 may be substituted by other types of cooking apparatuses. In particular, the cooking container 100 and the stirring motion mechanism in the cooking sub-system 160 may be substituted by other types of cooking containers and stirring motion mechanisms. The same can be said of the lid apparatus, unloading apparatus, cleaning apparatuses of the cooking sub-system 160.

The cooking system 600 further comprises a transfer apparatus 703*a* configured to transfer containers of several different diametrical sizes, one at a time. The relative position of the base component of the transfer apparatus 703*a* and the support component 657 of the cyclic transport apparatus 650 is configured to be properly fixed. The transfer apparatus 703*a* is similarly configured to the transfer apparatus 703 with the same number and types of components, and comprises the following:

(1) a container gripping mechanism comprising a support component, to be referred to as a base component of the container gripping mechanism, or the first support component of the transfer apparatus. The container gripping mechanism also comprises a pair of gripping devices, and a motorized mechanism configured to rotate the gripping devices, wherein each gripping device comprises a gripper, wherein the grippers are configured to fit ingredient containers of several diametrical sizes, wherein the gripping devices can be rotated to different angular positions to grip containers of different diametrical sizes;

(2) a second support component;

(3) a third support component, referred to as a base component of the transfer apparatus 703*a*;

(4) a vertical motion mechanism, referred to as a first motion mechanism, configured to produce a vertical linear motion in the first support component relative to the second support component, wherein the first motion mechanism comprises a motor, some shafts, a connector, a bearing housing, a slotted hole, and two linear motion bearings, etc.;

(5) a rotational motion mechanism, referred to as a second motion mechanism, configured to produce a rotation of the second support component relative to the third component, around a vertical axis, wherein the second motion mechanism comprises a motor, a connecting component, a coupling, a bearing housing, a shaft, etc.;

(6) a plurality of proximity switches, encoders or other sensors wherein the said sensors are connected via wires to the computer 902; wherein the said sensors are used to monitor the angle of rotation of the motors, the relative position of two components, etc., of the transfer apparatus 703*a* and send signals to the computer 902.

The cooking system 600 can be controlled by the computer 902 to transfer and unload the food or food ingredients into a container as follows. At the first step, the transfer apparatus 703*a* is configured to grip an ingredient container from a position on another mechanism and transfer it to a corresponding holding cup of the cyclic transport apparatus 650. At step 2, the said ingredients container is rotated by the cyclic transport apparatus 650 to a special position where a corresponding unloading apparatus of the combination unloading apparatus 920 may grip the ingredients container. At the same time the corresponding unloading apparatus is rotated to the top position by the rotational mechanism 908 of the combination unloading apparatus 920. At step 3, the unloading apparatus of the combination unloading apparatus 920 is configured to grip the ingredient container that is positioned on the holding cup of the cyclic transport apparatus 650 and then turn it to unload the food ingredients into a cooking container 100 of the cooking sub-system 160 when the axis of the cooking container 100 is positioned vertically. Then the emptied ingredient container is rotated back and released to the same holding cup on the cyclic transport apparatus 650. At step 4, the emptied ingredient container is rotated back to the original position. At step 5, the emptied ingredient container is gripped and transferred to a position on another mechanism by the transfer apparatus 703*a*.

It should be noted that the transfer apparatus 703*a* is configured to move an ingredient container from a holding cup of the cyclic transport apparatus 650 to a container holder of another cyclic transfer apparatus, such as a cyclic transfer apparatus 800.

Figure 36B:
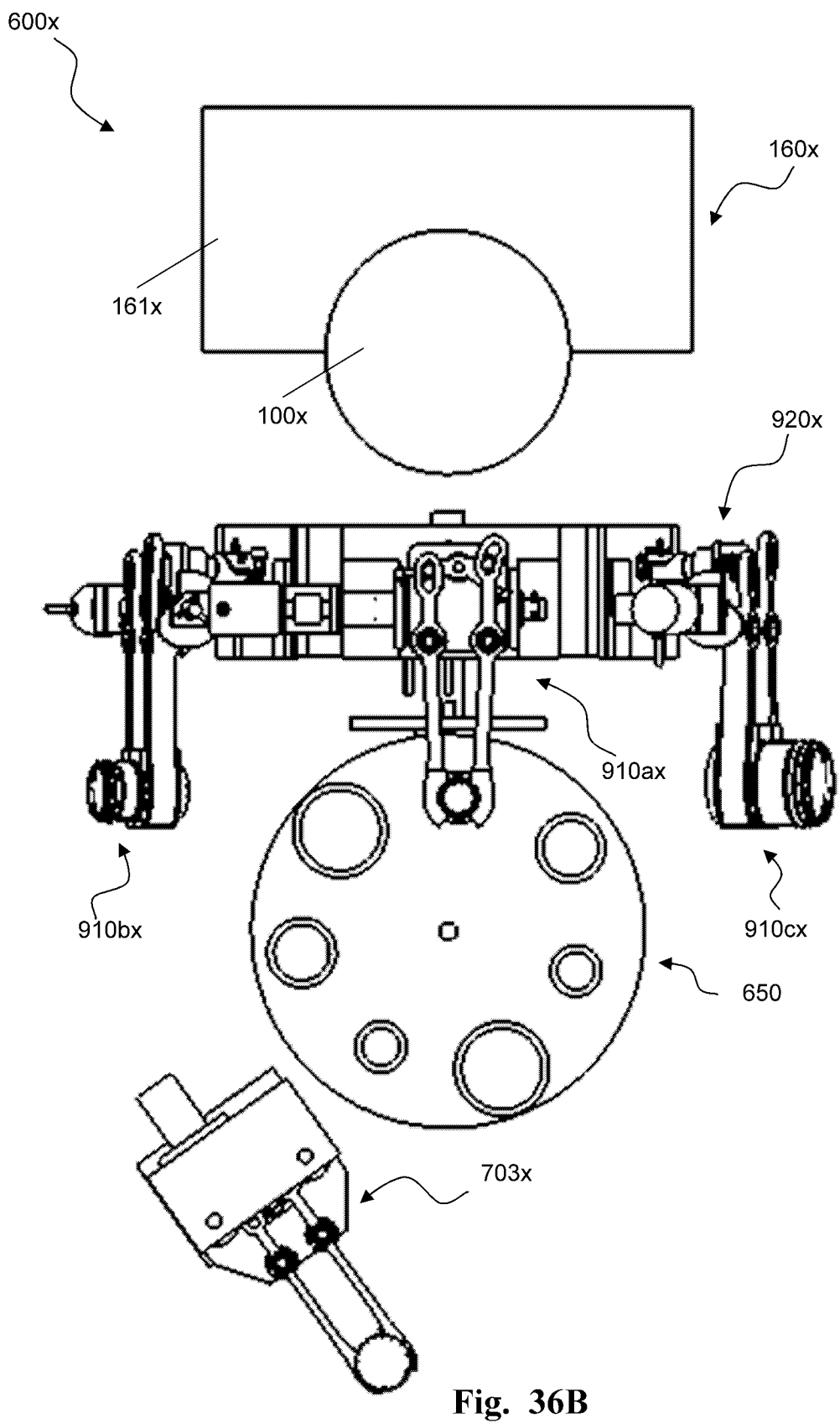
FIG. 36B shows a schematic view of another cooking system.

Referring to FIG. 36B, a cooking system 600*x* is configured the same way as the cooking system 600 wherein the sub-system 600*x* comprises: (1) a combination unloading apparatus 920*x* which is configured the same way as the combination unloading apparatus 920; (2) a cyclic transport apparatus 650; (3) a cooking sub-system 160*x*, which is similarly configured to the cooking sub-system 160, comprising a cooking container 100*x* and a stirring motion mechanism 161*x* configured to produce a motion in the cooking container 100*x* to stir, mix or distribute the food or food ingredients contained in the cooking container 100*x*; and (4) a transfer apparatus 703*x* which is configured the same way as the transfer apparatus 703*a*. The computer 902*x* is configured to control the timing, direction or speed of the rotation of the shaft of the motors in the mechanism in the cooking system 600*x*.

Under the control of the computer 902*x*, the cooking system 600*x* can transfer and unload the food or food ingredients in a container as follows. At the first step, the transfer apparatus 703*x* is configured to grip an ingredient container from another mechanism and transfer it to a corresponding holding cup of the cyclic transport apparatus 650. At step 2, the said ingredients container is rotated by the cyclic transport apparatus 650 to a special position where a corresponding unloading apparatus of the combination unloading apparatus 920*x* may grip the ingredients container rightly. At the same time the said corresponding unloading apparatus is rotated to the top position by the rotational mechanism 908*x* of the combination unloading apparatus 920*x*. At step 3, the unloading apparatus of the combination unloading apparatus 920*x* is configured to grip the ingredient container that is positioned on the holding cup of the cyclic transport apparatus 650 and then turn it to unload the food ingredients into a cooking container 100*x* of the cooking sub-system 160*x* when the axis of the cooking container 100*x* is positioned vertically. Then the emptied ingredient container is rotated back and released to the same holding cup on the cyclic transport apparatus 650. At step 4, the emptied ingredient container is rotated back to the original position. At step 5, the emptied ingredient container is gripped and transferred to other mechanism by the transfer apparatus 703*x*.

Figure 37:
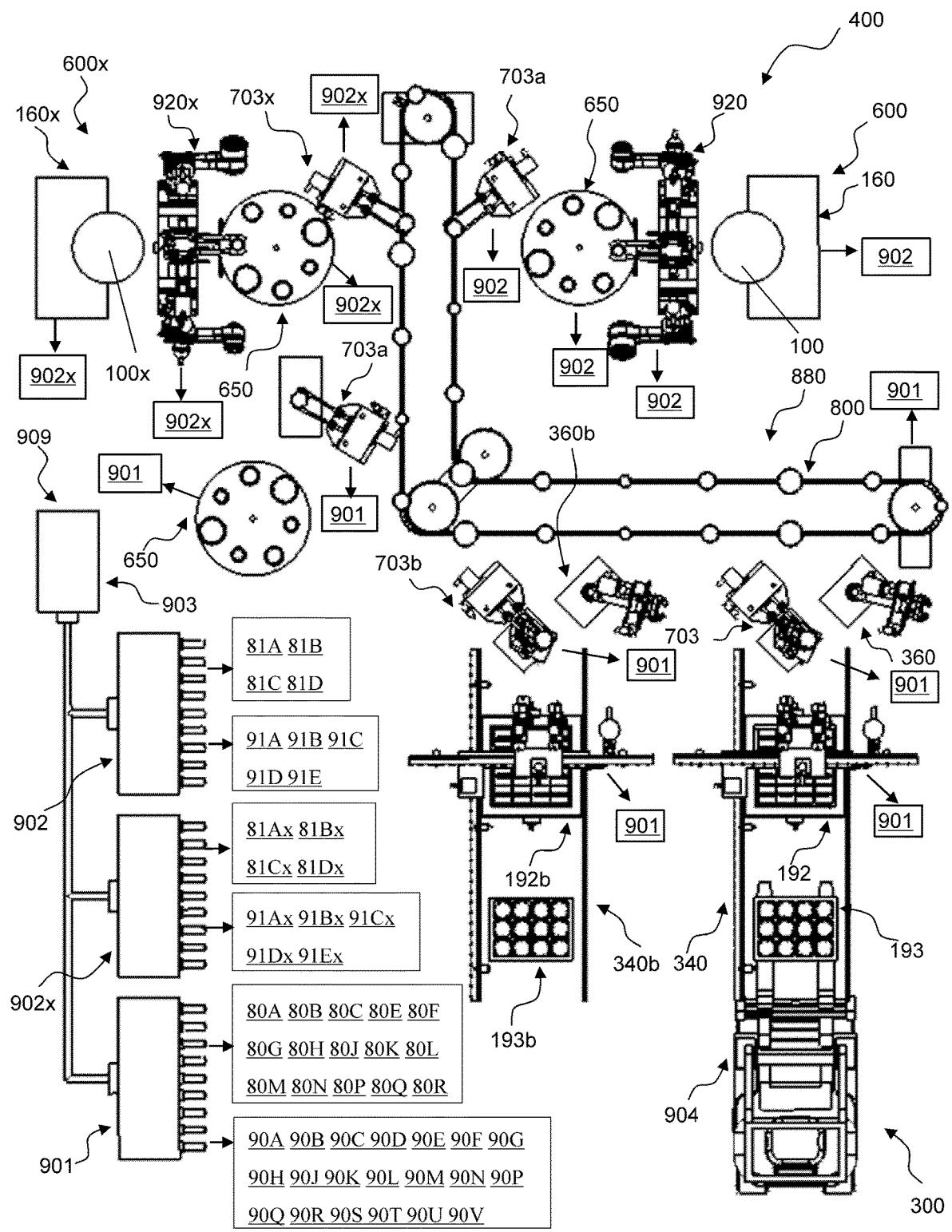
FIG. 37 shows a schematic view of a kitchen system which comprises the cooking system.

In some embodiments, referring to FIG. 37, an automated kitchen system 400 comprises a kitchen system comprising the kitchen sub-system 300, the second transfer system 880, a plurality of cooking system 600 and a plurality of cooking system 600*x*. As explained, the kitchen sub-system 300 comprises kitchen sub-systems 380 and 380*b*. As explained, the kitchen sub-system 380 comprises: a plurality of ingredient containers 107 and corresponding caps 108; the first transfer system 370 comprising the storage apparatus 192 and the transfer apparatus 340; the cap opening apparatus 360; etc. As explained, the kitchen sub-system 380b is similarly configured to the kitchen sub-system 380. A capped ingredient container in the kitchen sub-system 380b is denoted by the symbol 109b, as explained before. Similarly, an ingredient container (without a cap) in the kitchen sub-system 380b will be denoted by 107b; and a cap in the kitchen sub-system 380b will be denoted by 108b; the storage apparatus of the kitchen sub-system will be denoted by 192b; the transfer apparatus of the kitchen sub-system 380b will be denoted by 340b; the cap opening apparatus in the kitchen sub-system 380b will be denoted by 360b; and the container gripping mechanism of the cap opening apparatus 360b will be denoted by 307b.

Each holding cup 615a of the cyclic transport apparatus 650 may hold an ingredient container 107a; and each holding device 831a of the cyclic transport apparatus 800 may hold an ingredient container 107a. Similarly, each holding cup 615b of the cyclic transport apparatus 650 is configured to hold an ingredient container 107b; and each holding device 831b of the cyclic transport apparatus 800 may hold an ingredient container 107b.

The second transfer system 880 of the automated kitchen system 400 comprises the cyclic transport apparatus 800, the transfer apparatus 703 and the transfer apparatus 703b. The transfer apparatus 703 is configured to transfer an ingredient container 107 from the central position on the holder 436 of the container gripping mechanism 307 of the cap opening apparatus 360, to a certain position on a holding device 831a of the cyclic transport apparatus 800; wherein the relative position of the holder 436 and the support component 745 of the transfer apparatus 703 is configured to be properly fixed, and the relative position of the support component of the cyclic transport apparatus 800 and the base component of the transfer apparatus 703 is configured to be properly fixed. Similarly, the transfer apparatus 703b is configured to transfer an ingredient container 107b from a similar position of the cap opening apparatus 360b, to a certain position on a holding device 831b of the cyclic transport apparatus 800.

The transfer apparatus 703a (or 703x) of a cooking system 600 (or respectively 600x) is configured to move an ingredient container 107a or 107b between a holding device 831a or respectively 831b of the cyclic transport apparatus 800 and a holding cup 615a or respectively 615b of the cyclic transport apparatus 650 of the cooking system 600; wherein the relative position of the support component of the cyclic transport apparatus 800 and the base component of the transfer apparatus 703a (or 703x) is configured to be properly fixed. The automated kitchen system 400 further comprises an additional transfer apparatus 703a and an additional cyclic transport apparatus 650, which are not parts of the kitchen sub-systems 600, wherein the transfer apparatus 703a is configured to transfer an emptied ingredient container 107a or 107b from the position on a container holder 831a or respectively 831b of the cyclic transport apparatus 800 to the position on a holding cup 615a or respectively 615b of the cyclic transport apparatus 650.

The relative positions of the support component 745 of the transfer apparatus 703, the support component 418 of the cap opening apparatus 360 and the base component of the cyclic transport apparatus 800 are configured so that the transfer apparatus 703 can move a container from the holder 436 and to place the container on a holder of respective size of the cyclic transport apparatus 800. Similarly, the relative positions of the support component 745a of the transfer apparatus 703a of the cooking system 600, the support component 657 of the cyclic transport apparatus 650 of the cooking system 600 and the base component of the cyclic transport apparatus 800 are configured so that the transfer apparatus 703a can move a container on a holder of the cyclic transport apparatus 800 to a holder of the cyclic transport apparatus 650, and vice versa. Similar remarks apply to the relative positions of the base support components of the cyclic transport apparatus 800, the transfer apparatus 703x of the cooking system 600x and the cyclic transport apparatus 650 of the cooking system 600x, etc. In summary, the base support components of various apparatuses need to be properly positioned.

The automated kitchen system 400 further comprises the computer system 909. The computer 902 is connected via wires to sensors 91A, 91B, 91C, etc.; which can be encoders, proximity switches, and temperature sensors, etc., in the cooking system 600. The computer 902 is connected via wires to electrical or electronic devices, 81A, 81B, 81C, etc., which can be various of types of motors, inductive stoves or electric stoves, refrigeration apparatuses of the cooking system 600. In other words, the computer 902 is configured to control the functions of apparatuses of the cooking system 600 by sending signals to the electrical or electronic devices. Similarly, the computer 902x is connected via wires to sensors 91Ax, 91Bx, 91Cx, etc., which can be encoders, proximity switches, and temperature sensors, etc., in the cooking system 600x. The computer 902x is connected via wires to electrical or electronic devices, 81Ax, 81Bx, 81Cx, etc., which can be various of types of motors, inductive stoves or electric stoves, refrigeration apparatuses of the cooking system 600x. In other words, the computer 902x is configured to control the functions of apparatuses of the cooking system 600x by sending signals to the electrical or electronic devices. The input/output ports of the computer 901 are connected via wires to sensors 90A, 90B, 90C, etc., which can be encoders, proximity switches, and temperature sensors, etc., of the kitchen sub-mechanism 300, the cyclic transport apparatus 800, the additional transfer apparatus 703a and the additional cyclic transport apparatus 650. The computer 901 is connected via wires to sensors 90A, 90B, 90C, etc.; which can be encoders, proximity switches, and temperature sensors, etc., of the kitchen sub-system 300, the second transfer system 880, the additional transfer apparatus 703a and the additional cyclic transport apparatus 650. The input/output ports of the computer 901 are connected via wires to electrical or electronic devices, 80A, 80B, 80C, etc., which can be various of types of motors, inductive stoves or electric stoves, refrigeration apparatus of the kitchen sub-system 300, the second transfer system 880, the additional transfer apparatus 703a and the additional cyclic transport apparatus 650. In other words, the computer 901 is configured to control the functions of apparatuses of the kitchen sub-system 300, the second transfer system 880, the additional transfer apparatus 703a and the additional cyclic transport apparatus 650 by sending signals to the electrical or electronic devices.

In the automated kitchen system 400, the computer system 909 may control the transferring of an ingredient container 107 or capped ingredient container 109 by the following steps. (The automated kitchen system 400 may also transfer an ingredient container 107b or a capped container 109b by similar steps.)

Step 1, the capped ingredient container 109 containing food ingredients is put in a transport box 193, together with a plurality of other capped ingredient containers (usually of the same diametrical size), and the transport box 193 is moved to a loading position on the forklift 904.

Step 2, the forklift 904 driven by an employee may transfer the transport box 193 to an unloading location in the kitchen sub-system 380, so that the transfer apparatus 340 may successively grip the capped ingredient containers 109 from the transport box 193 and move them to the storage apparatus 192 of the kitchen sub-system 380, controlled by the computer 901. Then, the transport box 193 is moved away from the unloading location, by the forklift 904. At this point, the capped ingredient container 109 is stored in the storage apparatus 192.

Step 3, when the food ingredients held in the capped ingredient container 109 are needed for making a dish at a designated cooking sub-system 160, the transfer apparatus 340 grips the capped ingredient container 109 and moves it to be placed on the holder 436 of the container gripping mechanism 307 of the cap opening apparatus 360. This step is controlled by the computer 901.

Step 4, the cap opening apparatus 360 removes the cap 108 from the ingredient container 107 of the capped container 109 and transfers the cap 108 to a presented position in the holding device of the cyclic transport apparatus 800, but the ingredient container 107 is still positioned on the holder 436. This step is controlled by the computer 901.

Step 5, the transfer apparatus 703 grips the container 107 and moves it and then places it on a container holder of proper size of the cyclic transport apparatus 800; while the container holders of the cyclic transport apparatus 800 are not moved by the motorized mechanism of the cyclic transport apparatus 800. This step is controlled by the computer 901.

Step 6, the motorized mechanism of the cyclic transport apparatus 800 moves the ingredient container 107 (together with the container holders and the chains of the cyclic transport apparatus 800) to a loading/unloading location next to the cooking system 600 which comprises the designated cooking sub-system 160. This step is controlled by the computer 901.

Step 7, the transfer apparatus 703a (703x) of the cooking system 600 (or respectively 600x) grips the ingredient container 107 and moves it to be positioned on a holding cup of the cyclic transport apparatus 650 of the cooking system 600 (or respectively 600x). This step is controlled by the computer 902 (or respectively 902x).

Step 8, the said holding cup, together with the ingredient container 107, is rotated to a position which is accessible by a container gripping mechanism of an unloading apparatus in the combination unloading apparatus 920 (or 920x) of the cooking system 600 (or respectively 600x), controlled by the computer 902 (or respectively 902x)

Step 9, one of the unloading apparatuses of the combination unloading apparatus 920 (or 920b) grips the ingredient container 107, and turns it, to unload the food ingredients into the ingredient container 107 into the cooking container 100 (or respectively 100x) of the designated cooking sub-system 160 (or respectively 160x). Then the emptied ingredient container 107 is turned back and moved to be positioned on the holding cup of the cyclic transport apparatus 650 of the cooking system 600 (or respectively 600x). During this step, the holding cups of the cyclic transport apparatus 650 are not moved. This step is controlled by the computer 902.

Step 10, the emptied ingredient container 107 is then rotated by the cyclic transport apparatus 650, to be gripped by the transfer apparatus 703a (or respectively 703x), controlled by the computer 902 (or respectively 902x).

Step 11, the emptied ingredient container 107 is moved by the transfer apparatus 703a (or 703x) to be positioned on a container holder of the cyclic transport apparatus 800 when the container holders are kept still. This step is controlled by the computer 902 (or respectively 902x) and the computer 901.

Step 12, the emptied ingredient container 107 is moved with the chains of the cyclic transport apparatus 800 to another unloading location, where the emptied ingredient container 107 is moved by the "additional" transfer apparatus 703a to a holding cup 615a of the "additional" cyclic transport apparatus 650, controlled by the computer 901.

Then the emptied container 107 and the cap 108 are put together and stored in the same box, or in separate boxes.

Referring to FIG. 38, the following tasks are performed before the business opens.

In Step 760, some sub-programs are stored in each computer 902, wherein each sub-program comprises procedures for the second computer to control one or more motors and/or other electric or electronic devices which are connected to the second computer to perform specific functions, and/or procedures for the second computer to read the information of sensors or other electric or electronic devices, and then have the information sent to the first computer 901. The start time of a sub-program can be scheduled later, in accordance with needs. Also, a database is installed in the computer 901. The database will store some lists of data, including the lists as described in the following. Each cooking system (600 or 600x) is given an ID. The IDs of all cooking systems are stored in the computer 901. Each second computer 902 is given an ID. The IDs of the second computers 902 are stored in the computer 901.

In Step 761, a list of "container content types" is stored in the computer 901. For example, a container content type can be "20 oz. of sliced angus beef;" another container content type can be "1.5 oz. of minced onion and 2 oz. of minced garlic." In our applications, the content contained in an ingredient container comprises food ingredient(s) of a container content type. Then the computer 901 stores a menu, which is a list of (types of) foods that can be cooked at a cooking system.

In Step 762, for each food in the menu and corresponding to each cooking system (600 or 600x), the computer 901 stores in its database: (1) a "list of cooking sub-programs, second computer IDs and relative timings" wherein each cooking sub-program is a program run by a second computer 902 of a specific ID to control the functions of, and/or to receive information from some motor(s) and/or other electric or electronic device(s) in the cooking system (600 or 600x) that are connected to the second computer 902; and (2) a "list of container content types, numbers, and timings" comprising a list of container content types and the number of containers of the particular type that are needed for cooking the said food, and the relative timing for unloading each type of container content into the cooking container (100 or 100x) of the cooking system (600 or 600x), wherein the relative timing is relative to the start times of the sub-programs in the list of cooking sub-programs, second computer IDs and relative timings. For our applications, a single container of food ingredients is used for the cooking of one food of the menu; but the cooking of a single food may require one or more containers of food ingredients. The start time of a cooking sub-program in the "list of cooking sub-programs, second computer IDs and relative timings" may be fixed or limited relative to the start times of some or all of the other sub-programs in the same list, and the relations among various start times are included in the list; but the list does not include sub-programs controlling the cyclic transport apparatuses 650.

In Step 763, the information of the storage apparatuses 192 and 192b are stored, including a list of positions for storing containers of food ingredients, in the database of the computer 901. Also stored is the information of the positions of the cyclic transport apparatuses 800 in all cooking systems in the database of the computer 901.

In Step 764, for each position of the container in the storage apparatus 192 or 192b, and for each position of the cyclic transport apparatus 800, and for each cooking system (600 or 600x), the computer 901 stores in its database a "list of transfer and cap-opening sub-programs, second computer IDs and relative timings" for controlling functions of some motor(s) and/or other electric and electronic device(s) in the transfer apparatuses 340 or 340b, the cap opening apparatuses 360 or 360b, the cyclic transport apparatus 800, the transfer apparatuses 703, 703a, 703x or 703b, for the purpose that a container in the said position in the storage apparatus 192 or 192b is transferred out, and is uncapped by a cap opening apparatus 360 or 360b, and then is transferred to a position on the cyclic transport apparatus 650 of the said cooking system (600 or 600x). As before, a sub-program here may include procedures for reading the information of some of the sensors or other electric or electronic devices and have the information sent to the computer 901. The timing of a sub-program in the said list may be fixed or limited relative to the timings of some of the other sub-programs in the same list, and the relations among various timings are included in the list. In some applications, the start times of sub-programs controlling the cyclic transport apparatus 800 need to be limited, but not necessarily fixed relative to the start times of other sub-programs.

In Step 765, for each transport box 193 or 193b, the computer 901 stores in its database a "transport box content information" which includes the information of the containers of ingredients in the transport box 193 or 193b, including information of the bar code or QR code of the container, and the type of food ingredients contained in the container.

In Step 766, when a capped container 109 or 109x is moved by the transfer apparatus 340 or 340b from a transport box 193 or 193b to a position in the storage box 221 of the storage apparatus 192 or 192x, it passes through a position above the camera 90F so that the camera 90F can take an image of the QR code 121 or barcode 122 of the container, and then send the image to the computer 901 to decode the code. The computer 901 matches the code with the container in the "transport box content information," and adds the container to a "list of ingredient containers in storage," which lists the container code, container content type, position of the container in the storage apparatus 192 or 192x.

Referring to FIG. 39, the following tasks are performed by the computer 901.

In Step 770, the computer 901 is configured to dynamically record in its database the time dependent positions of all cyclic transport apparatuses 800 and 650. The cyclic transport apparatus 800 may optionally be run on a fixed schedule with exact timings, and in this case the information on the exact position of each container holder in the cyclic transport apparatus 800 at any time is stored in the database of the computer 901.

In Step 771, when an inquiry is made for availability of a food on the menu, usually by a person using another computer which is connected to the computer 901, the computer 901 is configured to read the "list of container content types and numbers" of the food and determine if there are enough containers containing the container content types and numbers in the "list of containers of food ingredient in the storage apparatus 192 or 192x" as required to cook the cooked food. If yes, then an order for the cooked food is allowed. If not, then an order for the cooked food is not allowed.

In Step 772, for a food ordered in Step 771, the computer 901 determines the positions of the (capped) ingredient containers 109 or 109b in the storage apparatus 192 or 192x which are needed for cooking the cooked food and these containers are removed from the "list of ingredient containers in storage." If facing multiple choices, the computer 901 may be programmed to prioritize the ingredient containers which are positioned above the other ingredient containers in the same compartment of the storage apparatus 192 or 192x.

In Step 773, following Step 772, for the food ordered, the computer 901 is configured to schedule the following: (1) the cooking of the next ordered food at a cooking system 600 or 600x, which can be a next available cooking system; (2) for each ingredient container containing the food ingredient that is needed for cooking the ordered food, the position of the capped ingredient container 109 or 109b in the storage apparatus 192, the cap opening apparatus 360 or 360b to uncap the capped container 109 or 109b, the position of the cyclic transport apparatus 800 at which position the uncapped container 107 or 107b can be transferred to the cyclic transport apparatus 800, and the position of cyclic transport apparatus 650 of the scheduled cooking system 600 or 600x at which position the uncapped ingredient container 107 or 107b can be transferred to; (3) numbers of intermittent motions of the cyclic transport apparatuses 800 and 650 in the process of transferring the ingredient containers to their destinations at which position the ingredients can be unloaded into the cooking container 100 or 100x of the cooking system. The above schedule includes the start time of each sub-program in the list of cooking sub-programs or in the list of transfer and cap-opening sub-programs. The schedule also includes the timings for the ingredient containers to be transferred to and transferred out of the cyclic transport apparatus 800. The schedule also includes timings of the motions of the cyclic transport apparatuses 650.

In Step 774, the database of the computer 901 comprises a "list of instructions," where each instruction includes a sub-program, the timing of the sub-program, and the identity of the computer 902 to run the sub-program. Following Step 773, the computer 901 adds the following to the list of instructions: (1) the "list of cooking sub-programs, second computer IDs and relative timings" of the ordered food item, with times and second computer ID scheduled in Step 773; (2) the "list of transfer and cap-opening sub-programs, second computer IDs and relative timings" with specified start times and second computer's ID as scheduled in Step 773; (3) sub-programs at second computers and timings, to produce the necessary intermittent motions of the cyclic transport apparatuses 800 and 650 as scheduled in Step 773; wherein the information of the IDs of the second computers are included in the schedule.

In Step 775, the computer 901 is configured to send the sub-program and timing in each new instruction in the "list of instructions" to the second computer 902 whose ID is listed in the instruction; and the information is stored by the computer 902. The computers 902 are configured to dynamically run the sub-programs at specified timings as sent to them by the computer 901. The computer 901 is configured to communicate with the computers 902, so that the instructions as described above can be sent by the first computer 901 to the second computers 902, and so that the information of the sensors and other electric or electronic devices received by the computers 902 can be sent to the computer 901 per instructions. There are known techniques to achieve such communications, whether by wires or by wireless means.

In the above discussed kitchen systems, the unloading apparatus is configured to dispense all the food ingredients in an opened ingredient container at once.

In the above discussed kitchen systems, a transfer apparatus may comprise: one or more container holders; a support component configured to be connected to the one or more container holders; and a motion mechanism configured to move the support component.

The motion mechanism described above may comprise a track and a slider moving on a track. The motion mechanism may alternatively comprise a rotational mechanism wherein the axis of rotational mechanism is configured to be vertical. The motion mechanism may alternatively comprise a mini-vehicle.

It should be noted that a motor in the present patent application may be a regular AC or DC motor, a stepped motor, or servo motor, or inverter motor, or variable speed motor, or other types of motor, possibly further comprising speed reducers. The degree of rotation of a motor, or of a shaft, may be further sensed by sensors, including encoders and/or proximity sensors.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A support component described in the present patent application can be any type of rigid component. A support component may be moved or fixed relative to the ground. A rigid component may comprise one or more of the following: a bar, a tube, a beam, a board, a frame, a structure, a bearing housing, a shaft. A rigid component can be made of metal such as steel or aluminum, or of other materials, or of a combination of several types of materials.

Only a few examples and implementations are described. Other implementations, variations, modifications and enhancements to the described examples and implementations may be made without deviating from the spirit of the present invention. For example, the term cooking container is used to generally refer to a device for containing or holding food ingredients during cooking. For the purpose of present patent application, a cooking container can be a wok, a pot, a pan, a cookware, a bowl, a container, a board, a rack, a net, etc. The cooking also is not limited to any particular ethnic styles. The cooking may include but is not limited to: frying (including stir frying), steaming, boiling, roasting, baking, smoking, microwaving, etc. The cooking apparatus may or may not use a heater.

What is claimed is:

1. A kitchen system, comprising:
a computer system comprising a first computer;
a plurality of ingredient containers, each said ingredient container being configured to contain one or more food ingredients;
a plurality of lids, each said lid being configured to cover a said ingredient container, wherein a pair consisting of a said ingredient container and a said lid which covers the ingredient container is referred to as a covered ingredient container;
a storage configured to store a plurality of said covered ingredient containers;
one or more cooking systems, each said cooking system comprising a cooking apparatus, wherein the cooking apparatus comprises:
a cooking container configured to contain or hold a food or a food ingredient; and
a motion mechanism configured to move the cooking container, the motion mechanism comprising a motor which is connected to the computer system; and
a first transfer system configured to move a said covered ingredient container from the storage, said first transfer system comprising a transfer apparatus, wherein the said transfer apparatus comprises:
a gripping mechanism comprising a first support component and one or more gripping devices, said gripping mechanism configured to grip the covered ingredient container; and
a first motion mechanism comprising a first motor and a second support component, said first motion mechanism being configured to produce a motion of the first support component relative to the second support component, wherein the first motor is configured to be connected to the computer system to allow the computer system to control the first motor.

2. The kitchen system of claim 1 wherein the computer system comprises a plurality of second computers which are configured to be connected to the first computer, the kitchen system further comprising connections between each said second computer to some of the motors and other mechanisms of the kitchen system.

3. The kitchen system of claim 1, wherein the computer system is configured to store a list of container content types, wherein each container content type comprises the information of the types of food ingredients that are contained in a said covered ingredient container and the weight of each type of food ingredient that is contained in the covered ingredient container.

4. The kitchen system of claim 3, wherein the computer system is configured to store:
a menu comprising a list of food items that can be cooked by at least one of the cooking systems; and
for each food item in the menu, a list of container content types and the information on the number of ingredient containers of every container content type in the list that are needed for cooking the food item.

5. The kitchen system of claim 4, wherein the computer system is configured to store for each said food item on the menu, a list of cooking commands and their relative timings for the cooking of the food item at a said cooking system, wherein each said cooking command is configured to control the functioning of the electric or electronic device(s) of the cooking system.

6. The kitchen system of claim 1, wherein the computer system is configured to store a list of transfer sub-programs, wherein each said transfer sub-program is configured to control the first transfer system.

7. The kitchen system of claim 1, wherein each said covered ingredient containers comprises a code that is printed on the ingredient container or on the lid, the kitchen system further comprising a camera or scanner configured to take an image of the code.

8. The kitchen system of claim 7, wherein the code on the container or on the lid comprises a QR code or a barcode.

9. The kitchen system of claim 7, wherein the kitchen system comprises a plurality of transport boxes, each said transport box being configured to contain or hold a number of said covered ingredient containers, wherein the computer system is configured to store a transport box content information for each said transport box, said transport box information comprising:
   a list of the covered ingredient containers which are contained or held by the transport box;
   the code of each covered ingredient containers of the list; and
   the container content type of the food ingredients that are contained in each covered ingredient container of the list.

10. The kitchen system of claim 7; wherein the computer system is configured to store:
    a list of the covered ingredient containers that are stored in the storage; and
    the information on the position of, the code of, and the container content type of the food ingredients contained in, each covered ingredient container in the list.

11. The kitchen system of claim 10; wherein the computer system is configured to store a menu comprising a list of food items that can be cooked by each said cooking system; wherein the computer system, upon receipt of an order of a food item on the menu, is configured to find a sub-list of covered ingredient containers from the list of covered ingredient containers in the storage in accordance with claim 10, the information on the position of, the code of, and the container content type of the food ingredients contained in, each covered ingredient container of the sub-list, such that the food ingredients contained in the covered ingredient containers of the sub-list can be used to cook the food item.

12. The kitchen system of claim 1; wherein the number of cooking systems is at least two; wherein each said cooking system comprises an ID; wherein the computer system is configured to store the ID of each of the cooking systems; wherein the computer system is configured to dynamically schedule, upon receipt of an order of a food item, the timing and the ID of the cooking system which is to cook the food item.

13. The kitchen system of claim 1, wherein the storage comprises a plurality of compartments, each said compartment being configured to store two or more said covered ingredient containers.

14. The kitchen system of claim 13, wherein a said compartment of the storage apparatus is configured to stack two or more said covered ingredient containers vertically.

15. The kitchen system of claim 1, wherein the storage further comprises a heat insulation member and a refrigeration apparatus.

16. The kitchen system of claim 1, wherein the refrigeration apparatus comprises one or more temperature sensors.

17. The kitchen system of claim 1, further comprising a cyclic transport apparatus configured to move a said ingredient container, said cyclic transport apparatus comprises:
    a plurality of holders, each said holder comprises a solid that is shaped to position or hold the ingredient container; and
    a motor configured to be connected to the computer system, said motor being configured to drive a cyclic motion of the holders.

18. The kitchen system of claim 17, further comprising a transfer apparatus configured to move a said ingredient container and to place the ingredient container on a said holder of the cyclic transport apparatus, the transfer apparatus comprising:
    a gripping mechanism comprising a support component and one or more gripping devices, said gripping mechanism being configured to grip the ingredient container; and
    a motion mechanism comprising a motor, said first motion mechanism being configured to produce a motion of the support component of the gripping mechanism.

19. The kitchen system of claim 1, wherein a said cooking system further comprises an unloading apparatus configured to move a said ingredient container to unload the food ingredients from the ingredient container into the cooking container of the cooking system, wherein the unloading apparatus comprises:
    a gripping mechanism comprising a support component and one or more gripping devices, said gripping mechanism being configured to grip the ingredient container; and
    a motion mechanism comprising a motor, said first motion mechanism being configured to produce a motion of the support component of the gripping mechanism.

20. The kitchen system of claim 1, further comprising a lid opening apparatus configured to remove the lid from a said covered ingredient container, said lid opening apparatus comprising:
    a container gripping mechanism comprising a first support component and one or more gripping devices, said container gripping mechanism being configured to grip the ingredient container of the covered ingredient container;
    a lid gripping mechanism comprising a second support component and one or more gripping devices, said lid gripping mechanism being configured to grip the lid of the covered ingredient container; and
    a motion mechanism comprising a motor, said motion mechanism being configured to produce a motion of the first support component and the second support component.

21. The kitchen system of claim 1, wherein the transfer apparatus of the first transfer system comprises a second motion mechanism comprising a motor, said second motion mechanism being configured to produce a motion of the support component of the first motion mechanism, wherein the motor is configured to be connected to the computer system as to allow the computer system to control the motor.

22. The kitchen system of claim 20, wherein the lid may be removed from the ingredient container of the covered ingredient container by linearly moving the lid away from the ingredient container.

23. The kitchen system of claim 1, wherein a said ingredient container comprises a rotationally symmetric surface, and a said lid comprises a rotationally symmetric surface, wherein the rotationally symmetric surface of the lid and the rotationally symmetric surface of the ingredient container are configured to be pressed onto each other when the ingredient container is covered by the lid.

24. The kitchen system of claim 1, wherein a said ingredient container comprises a conical surface, and a said lid comprises a conical surface, wherein the conical surface of the lid and the conical surface of the ingredient container are configured to be pressed onto each other when the ingredient container is covered by the lid.

25. A kitchen system, comprising:
a computer system comprising a first computer;
a plurality of ingredient containers, wherein each said ingredient container is configured to contain or hold one or more types of food ingredients;
a storage configured to store a number of said ingredient containers, said storage comprising a refrigeration mechanism configured to cool the temperature in the storage apparatus;
one or more cooking systems, each said cooking system comprising a cooking apparatus, said cooking apparatus comprising:
a cooking container configured to contain or hold a food or one or more food ingredients; and
a motion mechanism configured to move the cooking container, said motion mechanism comprising a motor, the motor being connected to the computer system as to allow the computer system to control the motor; and
a transfer apparatus configured to move a said ingredient container, the transfer apparatus comprising:
a gripping mechanism comprising a support component and one or more grippers, said gripping mechanism being configured to grip the ingredient container; and
a motion mechanism comprising a motor, said motion mechanism being configured to produce a motion of the support component of the gripping mechanism; wherein the motor is configured to be connected to the computer system as to allow the computer system to control the motor;
wherein the computer system is configured to store a list of food items which can be cooked by one of the cooking systems.

26. A kitchen system, comprising:
a computer system comprising a first computer, said computer system being configured to store:
a list of food items, and
for each food item, a list of food ingredients;
a plurality of ingredient containers, each said ingredient container, and each said ingredient container being configured to hold one or more food ingredients;
a storage apparatus configured to store a number of said ingredient containers;
one or more cooking systems, each said cooking system comprising a cooking apparatus, the cooking apparatus comprising:
a cooking container configured to hold a food or one or more food ingredients;
a motion mechanism configured to move the cooking container, the motion mechanism comprising a motor, the motor being configured to be connected to the computer system as to allow the computer to control the motor; and
an unloading apparatus configured to move a said ingredient container to unload the food ingredients from the ingredient container to the cooking container, the unloading apparatus comprising:
a gripping mechanism comprising a support component and one or more grippers, said gripping mechanism being configured to grip the ingredient container; and
a motion mechanism comprising a motor, said motion mechanism being configured to produce a motion of the support component of the gripping mechanism; wherein the motor is configured to be connected to the computer system as to allow the computer system to control the motor; and
a transfer apparatus configured to move an ingredient container from the storage apparatus, the transfer apparatus comprising:
a gripping mechanism comprising a support component and one or more grippers, said gripping mechanism being configured to grip the ingredient container; and
a first motion mechanism comprising a first motor and a support component, said first motion mechanism being configured to produce a motion of the support component of the gripping mechanism, wherein the first motor is configured to be connected to the computer system as to allow the computer system to control the first motor.

27. The kitchen system of claim 26, wherein the transfer apparatus comprises a second motion mechanism configured to produce a motion in the support component of the first motion mechanism, the second motion mechanism comprising a second motor, said second motor being configured to be connected to the computer system as to allow the computer system to control the second motor.

* * * * *